US011859120B2

(12) United States Patent
Yener et al.

(10) Patent No.: US 11,859,120 B2
(45) Date of Patent: *Jan. 2, 2024

(54) ABRASIVE PARTICLES HAVING AN ELONGATED BODY COMPRISING A TWIST ALONG AN AXIS OF THE BODY

(71) Applicant: SAINT-GOBAIN CERAMICS & PLASTICS, INC., Worcester, MA (US)

(72) Inventors: Doruk O. Yener, Bedford, MA (US); Jennifer H. Czerepinski, Framingham, MA (US); Sujatha K. Iyengar, Northborough, MA (US); Michael D. Kavanaugh, North Grafton, MA (US); Alan J. Brandes, Rutland, MA (US); Christopher Arcona, Northborough, MA (US); Ralph Bauer, Niagara Falls (CA); Yves Boussant-Roux, Avignon (FR); Tracy H. Panzarella, Norwood, MA (US)

(73) Assignee: SAINT-GOBAIN CERAMICS & PLASTICS, INC., Worcester, MA (*) Notice: Subject to any disclaimer, the term of this patent is extended or adjusted under 35 U.S.C. 154(b) by 0 days.

This patent is subject to a terminal disclaimer.

(21) Appl. No.: 17/447,078

(22) Filed: Sep. 8, 2021

(65) Prior Publication Data

US 2021/0395587 A1 Dec. 23, 2021
US 2023/0357617 A9 Nov. 9, 2023

Related U.S. Application Data

(63) Continuation of application No. 17/130,089, filed on Dec. 22, 2020, now Pat. No. 11,649,388, which is a
(Continued)

(51) Int. Cl.
*C09K 3/14* (2006.01)
*B01J 2/26* (2006.01)
*C01F 7/442* (2022.01)

(52) U.S. Cl.
CPC ............... *C09K 3/1418* (2013.01); *B01J 2/26* (2013.01); *C01F 7/442* (2013.01); *C09K 3/1409* (2013.01);
(Continued)

(58) Field of Classification Search
CPC .................................................. C09K 3/1409
See application file for complete search history.

(56) References Cited

U.S. PATENT DOCUMENTS 345,604 A 7/1886 Semper
1,910,444 A 5/1933 Nicholson
(Continued)

FOREIGN PATENT DOCUMENTS

CA 743715 A 10/1966
CA 2423788 A1 7/2002
(Continued)

OTHER PUBLICATIONS

Torre, "Investigation of Shaped Abrasive Particles vol. 1: Review of U.S. Pat. No. 6,054,093 Apr. 25, 2000" © Apr. 2011.
(Continued)

*Primary Examiner* — Hoa (Holly) Le
(74) *Attorney, Agent, or Firm* — Abel Schillinger, LLP; Adrian Lawrence

(57) ABSTRACT

An abrasive grain is disclosed and may include an elongated body. The body may define a length (l), a width (w), and a height (h), where the length is the longest dimension. The elongated body may have a first end face, a second end face,
(Continued)

and a side surface extending between the first end face and the second end face. The body can include a twist along an axis body.

20 Claims, 28 Drawing Sheets

Related U.S. Application Data continuation of application No. 16/459,044, filed on Jul. 1, 2019, now Pat. No. 11,142,673, which is a continuation of application No. 15/962,838, filed on Apr. 25, 2018, now Pat. No. 10,364,383, which is a continuation of application No. 15/681,796, filed on Aug. 21, 2017, now Pat. No. 10,106,715, which is a continuation of application No. 15/402,860, filed on Jan. 10, 2017, now Pat. No. 9,771,506, which is a continuation of application No. 14/964,229, filed on Dec. 9, 2015, now Pat. No. 9,567,505, which is a continuation of application No. 14/201,436, filed on Mar. 7, 2014, now Pat. No. 9,238,768, which is a continuation of application No. 13/738,890, filed on Jan. 10, 2013, now Pat. No. 8,753,742.

(60) Provisional application No. 61/584,998, filed on Jan. 10, 2012.

(52) U.S. Cl.
CPC ....... *C09K 3/1427* (2013.01); *Y10T 428/2982* (2015.01)

(56) References Cited

U.S. PATENT DOCUMENTS

| | | |
|---|---|---|
| 2,033,991 A | 3/1936 | Melton et al. |
| 2,036,903 A | 4/1936 | Webster |
| 2,049,874 A | 8/1936 | Sherk |
| 2,148,400 A | 2/1939 | Crompton, Jr. |
| 2,248,064 A | 7/1941 | Carlton et al. |
| 2,248,990 A | 7/1941 | Heany |
| 2,290,877 A | 7/1942 | Heany |
| 2,318,360 A | 5/1943 | Benner et al. |
| 2,376,343 A | 5/1945 | Carlton |
| 2,563,650 A | 8/1951 | Heinemann |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. et al. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,608,134 A | 9/1971 | Cook |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,808,747 A | 5/1974 | Kenagy |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda et al. |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 9/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe et al. |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,863,573 A | 9/1989 | Moore et al. |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,457 A | 5/1990 | Dekok et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Wilkens et al. |
| 4,997,461 A | 3/1991 | Markhoff-Matheny et al. |
| 5,000,760 A | 3/1991 | Ohtsubo et al. |
| 5,008,222 A | 4/1991 | Kameda |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,165 A | 9/1991 | Tselesin |

(56) References Cited

U.S. PATENT DOCUMENTS

| | | |
|---|---|---|
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,314,513 A | 5/1994 | Miller et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,489,318 A | 2/1996 | Erickson et al. |
| 5,496,386 A | 3/1996 | Broberg et al. |
| 5,498,268 A | 3/1996 | Gagliardi et al. |
| 5,500,273 A | 3/1996 | Holmes et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,549,962 A | 8/1996 | Holmes et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,603,738 A | 2/1997 | Zeiringer et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,946,991 A | 9/1999 | Hoopman |
| 5,975,987 A | 11/1999 | Hoopman et al. |
| 5,980,678 A | 11/1999 | Tselesin |
| 5,984,988 A | 11/1999 | Berg et al. |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,027,326 A | 2/2000 | Cesarano, III et al. |
| 6,039,775 A | 3/2000 | Ho et al. |
| 6,048,577 A | 4/2000 | Garg |
| 6,053,956 A | 4/2000 | Wood |

(56) References Cited

U.S. PATENT DOCUMENTS

| | | |
|---|---|---|
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,179,887 B1 | 1/2001 | Barber, Jr. et al. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,398,989 B1 | 6/2002 | Bergstrom |
| 6,401,795 B1 | 6/2002 | Cesarano, III et al. |
| 6,403,001 B1 | 6/2002 | Hayashi |
| 6,413,286 B1 | 7/2002 | Swei et al. |
| 6,428,392 B1 | 8/2002 | Sunahara et al. |
| 6,451,076 B1 | 9/2002 | Nevoret et al. |
| 6,475,253 B2 | 11/2002 | Culler et al. |
| 6,500,493 B2 | 12/2002 | Swei et al. |
| 6,511,938 B1 | 1/2003 | Liu |
| 6,524,681 B1 | 2/2003 | Seitz et al. |
| 6,531,423 B1 | 3/2003 | Schwetz et al. |
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,750,173 B2 | 6/2004 | Rizkalla |
| 6,752,700 B2 | 6/2004 | Duescher |
| 6,755,729 B2 | 6/2004 | Ramanath et al. |
| 6,802,878 B1 | 10/2004 | Monroe |
| 6,821,196 B2 | 11/2004 | Oliver |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,949,128 B2 | 9/2005 | Annen |
| 6,951,504 B2 | 10/2005 | Adefris et al. |
| 6,974,930 B2 | 12/2005 | Jense |
| 7,022,179 B1 | 4/2006 | Dry |
| 7,044,989 B2 | 5/2006 | Welygan et al. |
| 7,112,621 B2 | 9/2006 | Rohrbaugh et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,604 B2 | 9/2007 | Yoshizawa et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,404,832 B2 | 7/2008 | Ohtsubo et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,632,434 B2 | 12/2009 | Duescher |
| 7,651,386 B2 | 1/2010 | Sung |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,867,302 B2 | 1/2011 | Nevoret et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,333,360 B2 | 12/2012 | Rule et al. |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,530,682 B2 | 9/2013 | Sachs |
| 8,568,497 B2 | 10/2013 | Sheridan |
| 8,628,597 B2 | 1/2014 | Palmgren et al. |
| 8,783,589 B2 | 7/2014 | Hart et al. |
| 8,852,643 B2 | 10/2014 | Gonzales et al. |
| 8,920,527 B2 | 12/2014 | Seider et al. |
| 8,921,687 B1 | 12/2014 | Welser |
| 9,017,439 B2 | 4/2015 | Yener et al. |
| 9,079,154 B2 | 7/2015 | Rosendahl |
| 9,181,477 B2 | 11/2015 | Collins et al. |
| 9,211,634 B2 | 12/2015 | Rehrig et al. |
| 9,259,726 B2 | 2/2016 | Gopal |
| 9,375,826 B2 | 6/2016 | Tian et al. |
| 9,567,505 B2* | 2/2017 | Yener .................. B01J 2/26 |
| 9,717,674 B1 | 8/2017 | Guskey et al. |
| 9,758,724 B2 | 9/2017 | Collins et al. |
| 9,982,175 B2 | 5/2018 | Sarangi et al. |
| D849,066 S | 5/2019 | Hanschen et al. |
| D849,067 S | 5/2019 | Hanschen et al. |
| 10,351,745 B2 | 7/2019 | Josseaux et al. |
| 10,364,383 B2 | 7/2019 | Yener et al. |
| D862,538 S | 10/2019 | Hanschen et al. |
| D870,782 S | 12/2019 | Hanschen et al. |
| 10,556,323 B2 | 2/2020 | Alkhas et al. |
| 10,557,068 B2 | 2/2020 | Oldenkotte et al. |
| 10,563,105 B2 | 2/2020 | Cotter et al. |
| 10,655,038 B2 | 5/2020 | Martinez et al. |
| 10,710,211 B2 | 7/2020 | Lehuu et al. |
| 10,717,908 B2 | 7/2020 | Hejtmann et al. |
| 2001/0027623 A1 | 10/2001 | Rosenflanz |
| 2002/0026752 A1 | 3/2002 | Culler et al. |
| 2002/0068518 A1 | 6/2002 | Cesena et al. |

(56) References Cited

U.S. PATENT DOCUMENTS

| | | |
|---|---|---|
| 2002/0084290 A1 | 7/2002 | Materna |
| 2002/0090891 A1 | 7/2002 | Adefris et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2003/0228738 A1 | 12/2003 | Beaudoin |
| 2004/0003895 A1 | 1/2004 | Amano et al. |
| 2004/0148868 A1 | 8/2004 | Anderson et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0081455 A1 | 4/2005 | Welygan et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0245179 A1 | 11/2005 | Luedeke |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0177488 A1 | 8/2006 | Caruso et al. |
| 2006/0185256 A1 | 8/2006 | Nevoret et al. |
| 2007/0011951 A1 | 1/2007 | Gaeta et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0072500 A1 | 3/2008 | Klett et al. |
| 2008/0098659 A1 | 5/2008 | Sung |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0233845 A1 | 9/2008 | Annen et al. |
| 2008/0262577 A1 | 10/2008 | Altshuler et al. |
| 2008/0271384 A1 | 11/2008 | Puthanangady et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017276 A1 | 1/2009 | Hoglund et al. |
| 2009/0017736 A1 | 1/2009 | Block et al. |
| 2009/0098365 A1 | 4/2009 | Moeltgen |
| 2009/0165394 A1 | 7/2009 | Culler et al. |
| 2009/0165661 A1 | 7/2009 | Koenig et al. |
| 2009/0169816 A1 | 7/2009 | Erickson et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0040767 A1 | 2/2010 | Uibel et al. |
| 2010/0056816 A1 | 3/2010 | Wallin et al. |
| 2010/0064594 A1 | 3/2010 | Pakalapati et al. |
| 2010/0068974 A1 | 3/2010 | Dumm |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0251625 A1 | 10/2010 | Gaeta |
| 2010/0292428 A1 | 11/2010 | Meador et al. |
| 2010/0307067 A1 | 12/2010 | Sigalas et al. |
| 2010/0319269 A1 | 12/2010 | Erickson |
| 2010/0330886 A1 | 12/2010 | Wu et al. |
| 2011/0008604 A1 | 1/2011 | Boylan |
| 2011/0065362 A1* | 3/2011 | Woo .................. B24D 3/344 |
| | | 451/28 |
| 2011/0081848 A1 | 4/2011 | Chen |
| 2011/0092137 A1 | 4/2011 | Ohishi et al. |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0152548 A1 | 6/2011 | Sachs |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0034847 A1 | 2/2012 | Besse et al. |
| 2012/0055098 A1 | 3/2012 | Ramanath et al. |
| 2012/0100366 A1 | 4/2012 | Dumm et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2012/0308837 A1 | 12/2012 | Schlechtriemen et al. |
| 2012/0321567 A1 | 12/2012 | Gonzales et al. |
| 2013/0000212 A1 | 1/2013 | Wang et al. |
| 2013/0000216 A1* | 1/2013 | Wang .................. B24D 3/14 |
| | | 51/309 |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0067669 A1 | 3/2013 | Gonzales et al. |
| 2013/0072417 A1 | 3/2013 | Perez-Prat et al. |
| 2013/0074418 A1 | 3/2013 | Panzarella et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0203328 A1 | 8/2013 | Givot et al. |
| 2013/0212952 A1 | 8/2013 | Welygan et al. |
| 2013/0236725 A1* | 9/2013 | Yener .................. B01J 2/26 |
| | | 428/402 |
| 2013/0255162 A1 | 10/2013 | Welygan et al. |
| 2013/0260656 A1 | 10/2013 | Seth et al. |
| 2013/0267150 A1 | 10/2013 | Seider et al. |
| 2013/0283705 A1 | 10/2013 | Fischer et al. |
| 2013/0296587 A1 | 11/2013 | Rosendahl |
| 2013/0305614 A1 | 11/2013 | Gaeta et al. |
| 2013/0337262 A1 | 12/2013 | Bauer et al. |
| 2013/0337725 A1 | 12/2013 | Monroe |
| 2013/0344786 A1 | 12/2013 | Keipert |
| 2014/0000176 A1 | 1/2014 | Moren et al. |
| 2014/0007518 A1 | 1/2014 | Yener et al. |
| 2014/0080393 A1 | 3/2014 | Ludwig |
| 2014/0106126 A1 | 4/2014 | Gaeta et al. |
| 2014/0107356 A1 | 4/2014 | Gopal |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0256238 A1 | 9/2014 | Van et al. |
| 2014/0287658 A1 | 9/2014 | Flaschberger et al. |

(56) References Cited

U.S. PATENT DOCUMENTS

| | | |
|---|---|---|
| 2014/0290147 A1 | 10/2014 | Seth et al. |
| 2014/0345205 A1 | 11/2014 | Kavanaugh et al. |
| 2014/0352721 A1 | 12/2014 | Gonzales et al. |
| 2014/0352722 A1 | 12/2014 | Gonzales et al. |
| 2014/0357544 A1 | 12/2014 | Gonzales et al. |
| 2014/0378036 A1 | 12/2014 | Cichowlas et al. |
| 2015/0000209 A1 | 1/2015 | Louapre et al. |
| 2015/0000210 A1 | 1/2015 | Breder et al. |
| 2015/0007399 A1 | 1/2015 | Gonzales et al. |
| 2015/0007400 A1 | 1/2015 | Gonzales et al. |
| 2015/0089881 A1 | 4/2015 | Stevenson et al. |
| 2015/0126098 A1 | 5/2015 | Eilers et al. |
| 2015/0128505 A1* | 5/2015 | Wang ............ B24D 3/14 51/309 |
| 2015/0183089 A1 | 7/2015 | Iyengar et al. |
| 2015/0209932 A1 | 7/2015 | Lehuu et al. |
| 2015/0218430 A1 | 8/2015 | Yener et al. |
| 2015/0232727 A1 | 8/2015 | Erickson |
| 2015/0267099 A1 | 9/2015 | Panzarella et al. |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 12/2015 | Breder et al. |
| 2016/0090516 A1 | 3/2016 | Yener et al. |
| 2016/0107290 A1 | 4/2016 | Bajaj et al. |
| 2016/0177152 A1 | 6/2016 | Braun |
| 2016/0177153 A1 | 6/2016 | Josseaux |
| 2016/0177154 A1 | 6/2016 | Josseaux et al. |
| 2016/0186028 A1 | 6/2016 | Louapare et al. |
| 2016/0214903 A1 | 7/2016 | Humpal et al. |
| 2016/0298013 A1 | 10/2016 | Bock et al. |
| 2016/0303704 A1 | 10/2016 | Chou et al. |
| 2016/0303705 A1 | 10/2016 | Chou et al. |
| 2016/0304760 A1 | 10/2016 | Bock et al. |
| 2016/0311081 A1 | 10/2016 | Culler et al. |
| 2016/0311084 A1 | 10/2016 | Culler et al. |
| 2016/0326416 A1 | 11/2016 | Bauer et al. |
| 2016/0340564 A1 | 11/2016 | Louapre et al. |
| 2016/0354898 A1 | 12/2016 | Nienaber et al. |
| 2016/0362589 A1 | 12/2016 | Bauer et al. |
| 2017/0066099 A1 | 3/2017 | Nakamura |
| 2017/0114260 A1 | 4/2017 | Bock et al. |
| 2017/0129075 A1 | 5/2017 | Thurber et al. |
| 2017/0225299 A1 | 8/2017 | Keipert et al. |
| 2017/0335156 A1 | 11/2017 | Bauer et al. |
| 2017/0349797 A1 | 12/2017 | Yener et al. |
| 2018/0086957 A1 | 3/2018 | Sahlin et al. |
| 2018/0161960 A1 | 6/2018 | Wilson et al. |
| 2018/0169837 A1 | 6/2018 | Liu |
| 2018/0215975 A1 | 8/2018 | Marazano et al. |
| 2018/0215976 A1 | 8/2018 | Cotter et al. |
| 2018/0318983 A1 | 11/2018 | Wilson et al. |
| 2019/0022826 A1 | 1/2019 | Franke et al. |
| 2019/0030684 A1 | 1/2019 | Van et al. |
| 2019/0091835 A1 | 3/2019 | Culler et al. |
| 2019/0126436 A1 | 5/2019 | Westberg et al. |
| 2019/0217442 A1 | 7/2019 | Gaeta et al. |
| 2019/0249052 A1 | 8/2019 | Eckel et al. |
| 2019/0270182 A1 | 9/2019 | Eckel et al. |
| 2019/0309201 A1 | 10/2019 | Dumont et al. |
| 2019/0322915 A1 | 10/2019 | Jiwpanich et al. |
| 2019/0330505 A1 | 10/2019 | Bujnowski et al. |
| 2019/0337124 A1 | 11/2019 | Liu et al. |
| 2019/0338172 A1 | 11/2019 | Erickson et al. |
| 2019/0338173 A1 | 11/2019 | Yener et al. |
| 2019/0351531 A1 | 11/2019 | Nelson et al. |
| 2019/0366511 A1 | 12/2019 | Huber |
| 2019/0382637 A1 | 12/2019 | Braun et al. |
| 2020/0139512 A1 | 5/2020 | Culler et al. |
| 2020/0148927 A1 | 5/2020 | Arcona et al. |
| 2020/0156215 A1 | 5/2020 | Jusuf et al. |
| 2020/0157396 A1 | 5/2020 | Cotter et al. |
| 2020/0157397 A1 | 5/2020 | Stevenson et al. |
| 2020/0199426 A1 | 6/2020 | Yener et al. |
| 2020/0262031 A1 | 8/2020 | Seth et al. |
| 2022/0250210 A1* | 8/2022 | Hirschmann ........ C04B 35/1115 |

FOREIGN PATENT DOCUMENTS

| | | |
|---|---|---|
| CH | 685051 A5 | 3/1995 |
| CN | 1229007 A | 7/2005 |
| CN | 1774488 A | 5/2006 |
| CN | 101389466 A | 3/2009 |
| CN | 101970347 A | 2/2011 |
| CN | 101980836 A | 2/2011 |
| CN | 102281992 A | 12/2011 |
| CN | 103189164 A | 7/2013 |
| CN | 103842132 A | 6/2014 |
| CN | 102123837 B | 7/2014 |
| CN | 104125875 A | 10/2014 |
| CN | 104994995 A | 10/2015 |
| CN | 105622071 A | 6/2016 |
| CN | 105713568 A | 6/2016 |
| DE | 3923671 C2 | 2/1998 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 0078896 A2 | 5/1983 |
| EP | 0152768 A2 | 8/1985 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0931032 B1 | 7/2001 |
| EP | 0833803 | 8/2001 |
| EP | 1207015 A2 | 5/2002 |
| EP | 1356152 A2 | 10/2003 |
| EP | 1371451 A1 | 12/2003 |
| EP | 1383631 A1 | 1/2004 |
| EP | 1015181 B1 | 3/2004 |
| EP | 1492845 A1 | 1/2005 |
| EP | 1851007 | 11/2007 |
| EP | 1960157 | 8/2008 |
| EP | 2176031 A1 | 4/2010 |
| EP | 2184134 A1 | 5/2010 |
| EP | 2242618 A2 | 10/2010 |
| EP | 2390056 A2 | 11/2011 |
| EP | 1800801 B1 | 3/2012 |
| EP | 2445982 A2 | 5/2012 |
| EP | 2507016 A2 | 10/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |

(56) References Cited

FOREIGN PATENT DOCUMENTS

| | | |
|---|---|---|
| EP | 2692818 A1 | 2/2014 |
| EP | 2692819 A1 | 2/2014 |
| EP | 2692820 A1 | 2/2014 |
| EP | 2692821 A1 | 2/2014 |
| EP | 2719752 A1 | 4/2014 |
| EP | 2012972 B1 | 6/2014 |
| EP | 2720676 B1 | 1/2018 |
| EP | 3319758 A1 | 5/2018 |
| EP | 3342839 A1 | 7/2018 |
| EP | 3444313 B1 | 7/2020 |
| EP | 3830211 A1 | 6/2021 |
| FR | 2354373 A1 | 1/1978 |
| GB | 986847 A | 3/1965 |
| GB | 1456765 A | 11/1976 |
| GB | 1466054 | 3/1977 |
| JP | 53064890 A | 6/1978 |
| JP | 60-006356 U | 1/1985 |
| JP | 62002946 B | 1/1987 |
| JP | 63036905 B | 7/1988 |
| JP | 03079277 A | 4/1991 |
| JP | 03-287687 | 12/1991 |
| JP | 05285833 A | 11/1993 |
| JP | 06114739 A | 4/1994 |
| JP | 07008474 B2 | 2/1995 |
| JP | 3030861 U | 8/1996 |
| JP | 10113875 A | 5/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 2000-336344 A | 12/2000 |
| JP | 2000354967 A | 12/2000 |
| JP | 3160084 B2 | 4/2001 |
| JP | 2001162541 A | 6/2001 |
| JP | 3194269 B2 | 7/2001 |
| JP | 2001180930 A | 7/2001 |
| JP | 2001207160 A | 7/2001 |
| JP | 2001516652 A | 10/2001 |
| JP | 2002-038131 A | 2/2002 |
| JP | 2002210659 A | 7/2002 |
| JP | 2003-049158 A | 2/2003 |
| JP | 2004-510873 A | 4/2004 |
| JP | 2004209624 A | 7/2004 |
| JP | 2006130586 A | 5/2006 |
| JP | 2006130636 A | 5/2006 |
| JP | 2006159402 A | 6/2006 |
| JP | 2006-192540 A | 7/2006 |
| JP | 2007-537891 A | 12/2007 |
| JP | 2008132560 A | 6/2008 |
| JP | 2008194761 A | 8/2008 |
| JP | 2008531305 A | 8/2008 |
| JP | 2012512046 A | 5/2012 |
| JP | 2012512047 A | 5/2012 |
| JP | 2012512048 A | 5/2012 |
| JP | 2012530615 A | 12/2012 |
| JP | 5238725 B2 | 7/2013 |
| JP | 5238726 B2 | 7/2013 |
| JP | 2014503367 A | 2/2014 |
| JP | 2017518889 A | 7/2017 |
| JP | 2017538588 A | 12/2017 |
| JP | 2018510073 A | 4/2018 |
| KR | 1019890014409 A | 10/1989 |
| KR | 1020020042840 A | 6/2002 |
| KR | 20140106713 A | 9/2014 |
| NL | 171464 B1 | 11/1982 |
| WO | 94/02559 A1 | 2/1994 |
| WO | 95/03370 | 2/1995 |
| WO | 95/18192 A1 | 7/1995 |
| WO | 95/20469 A1 | 8/1995 |
| WO | 96/27189 A1 | 9/1996 |
| WO | 9711484 A1 | 3/1997 |
| WO | 97/14536 A1 | 4/1997 |
| WO | 99/06500 A1 | 2/1999 |
| WO | 99/14016 A1 | 3/1999 |
| WO | 99/38817 A1 | 8/1999 |
| WO | 1999038817 A1 | 8/1999 |
| WO | 99/54424 A1 | 10/1999 |
| WO | 0064630 A1 | 11/2000 |
| WO | 0114494 A1 | 3/2001 |
| WO | 0123323 A1 | 4/2001 |
| WO | 02097150 A2 | 12/2002 |
| WO | 03087236 A1 | 10/2003 |
| WO | 2005080624 A1 | 9/2005 |
| WO | 2005112601 A2 | 12/2005 |
| WO | 2006027593 A3 | 3/2006 |
| WO | 2006062597 A1 | 6/2006 |
| WO | 2007041538 A1 | 4/2007 |
| WO | 2009085578 A2 | 7/2009 |
| WO | 2009085841 A2 | 7/2009 |
| WO | 2009098017 A1 | 8/2009 |
| WO | 2010077509 A1 | 7/2010 |
| WO | 2010085587 A1 | 7/2010 |
| WO | 2010151201 A1 | 12/2010 |
| WO | 2011005425 A2 | 1/2011 |
| WO | 2011019188 A1 | 2/2011 |
| WO | 2011068714 A2 | 6/2011 |
| WO | 2011068724 A2 | 6/2011 |
| WO | 2011087649 A2 | 7/2011 |
| WO | 2011109188 A2 | 9/2011 |
| WO | 2011133438 A1 | 10/2011 |
| WO | 2011139562 A2 | 11/2011 |
| WO | 2011149625 A2 | 12/2011 |
| WO | 2012018903 A2 | 2/2012 |
| WO | 2012061016 A1 | 5/2012 |
| WO | 2012061033 A2 | 5/2012 |
| WO | 2012092590 A2 | 7/2012 |
| WO | 2012092605 A3 | 7/2012 |
| WO | 2010070294 A1 | 8/2012 |
| WO | 2012112305 A2 | 8/2012 |
| WO | 2012112322 A2 | 8/2012 |
| WO | 2012092590 A3 | 10/2012 |
| WO | 2012140617 A1 | 10/2012 |
| WO | 2012141905 A2 | 10/2012 |
| WO | 2013003830 A2 | 1/2013 |
| WO | 2013003831 A2 | 1/2013 |
| WO | 2013009484 A2 | 1/2013 |
| WO | 2013036402 A1 | 3/2013 |
| WO | 2013040423 A2 | 3/2013 |
| WO | 2013045251 A1 | 4/2013 |
| WO | 2013049239 A1 | 4/2013 |
| WO | 2013070576 A2 | 5/2013 |
| WO | 2013101575 A1 | 7/2013 |
| WO | 2013102170 A1 | 7/2013 |
| WO | 2013102176 A1 | 7/2013 |
| WO | 2013102177 A1 | 7/2013 |
| WO | 2013106597 A1 | 7/2013 |
| WO | 2013106602 A1 | 7/2013 |
| WO | 2013149209 A1 | 10/2013 |
| WO | 2013151745 A1 | 10/2013 |
| WO | 2013177446 A1 | 11/2013 |
| WO | 2013186146 A1 | 12/2013 |
| WO | 2013188038 A1 | 12/2013 |
| WO | 2014005120 A1 | 1/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014161001 A1 | 2/2014 |
| WO | 2014057273 A1 | 4/2014 |
| WO | 2014062701 A1 | 4/2014 |
| WO | 2014070468 A1 | 5/2014 |
| WO | 2014106173 A1 | 7/2014 |
| WO | 2014106211 A1 | 7/2014 |
| WO | 2014124554 A1 | 8/2014 |
| WO | 2014137972 A1 | 9/2014 |
| WO | 2014140689 A1 | 9/2014 |
| WO | 2014165390 A1 | 10/2014 |
| WO | 2014176108 A1 | 10/2014 |
| WO | 2014206739 A1 | 12/2014 |
| WO | 2014206890 A1 | 12/2014 |
| WO | 2014206967 A1 | 12/2014 |
| WO | 2014209567 A1 | 12/2014 |

(56) References Cited

FOREIGN PATENT DOCUMENTS

| | | |
|---|---|---|
| WO | 2014210160 A1 | 12/2014 |
| WO | 2014210442 A1 | 12/2014 |
| WO | 2014210532 A1 | 12/2014 |
| WO | 2014210568 A1 | 12/2014 |
| WO | 2015050781 A1 | 4/2015 |
| WO | 2015073346 A1 | 5/2015 |
| WO | 2015048768 A9 | 6/2015 |
| WO | 2015088953 A1 | 6/2015 |
| WO | 2015089527 A1 | 6/2015 |
| WO | 2015089528 A1 | 6/2015 |
| WO | 2015089529 A1 | 6/2015 |
| WO | 2015100018 A1 | 7/2015 |
| WO | 2015100020 A1 | 7/2015 |
| WO | 2015100220 A1 | 7/2015 |
| WO | 2015102992 A1 | 7/2015 |
| WO | 2015112379 A1 | 7/2015 |
| WO | 2015130487 A1 | 9/2015 |
| WO | 2015143461 A1 | 10/2015 |
| WO | 2015158009 A1 | 10/2015 |
| WO | 2015160854 A1 | 10/2015 |
| WO | 2015160855 A1 | 10/2015 |
| WO | 2015160857 A1 | 10/2015 |
| WO | 2015164211 A1 | 10/2015 |
| WO | 2015165122 A1 | 11/2015 |
| WO | 2015167910 A1 | 11/2015 |
| WO | 2015179335 A1 | 11/2015 |
| WO | 2015180005 A1 | 12/2015 |
| WO | 2015184355 A1 | 12/2015 |
| WO | 2016028683 A1 | 2/2016 |
| WO | 2016044158 A1 | 3/2016 |
| WO | 2016064726 A1 | 4/2016 |
| WO | 2016089675 A1 | 6/2016 |
| WO | 2016105469 A1 | 6/2016 |
| WO | 2016105474 A1 | 6/2016 |
| WO | 2016160357 A1 | 10/2016 |
| WO | 2016161157 A1 | 10/2016 |
| WO | 2016161170 A1 | 10/2016 |
| WO | 2016167967 A1 | 10/2016 |
| WO | 2016187570 A1 | 11/2016 |
| WO | 2016196795 A1 | 12/2016 |
| WO | 2016201104 A1 | 12/2016 |
| WO | 2016205133 A1 | 12/2016 |
| WO | 2016205267 A1 | 12/2016 |
| WO | 2016210057 A1 | 12/2016 |
| WO | 2017007703 A1 | 1/2017 |
| WO | 2017007714 A1 | 1/2017 |
| WO | 2017062482 A1 | 4/2017 |
| WO | 2017083249 A1 | 5/2017 |
| WO | 2017083255 A1 | 5/2017 |
| WO | 2016105543 A9 | 9/2017 |
| WO | 2017151498 A1 | 9/2017 |
| WO | 2018010730 A2 | 1/2018 |
| WO | 2018026669 A1 | 2/2018 |
| WO | 2018057465 A1 | 3/2018 |
| WO | 2018057558 A1 | 3/2018 |
| WO | 2018063902 A1 | 4/2018 |
| WO | 2018063958 A1 | 4/2018 |
| WO | 2018063960 A1 | 4/2018 |
| WO | 2018063962 A1 | 4/2018 |
| WO | 2018064642 A1 | 4/2018 |
| WO | 2018080703 A1 | 5/2018 |
| WO | 2018080704 A1 | 5/2018 |
| WO | 2018080705 A1 | 5/2018 |
| WO | 2018080755 A1 | 5/2018 |
| WO | 2018080756 A1 | 5/2018 |
| WO | 2018080765 A1 | 5/2018 |
| WO | 2018080778 A1 | 5/2018 |
| WO | 2018080784 A1 | 5/2018 |
| WO | 2018081246 A1 | 5/2018 |
| WO | 2018118688 A1 | 6/2018 |
| WO | 2018118690 A1 | 6/2018 |
| WO | 2018118695 A1 | 6/2018 |
| WO | 2018118699 A1 | 6/2018 |
| WO | 2018134732 A1 | 7/2018 |
| WO | 2018136268 A1 | 7/2018 |
| WO | 2018136269 A1 | 7/2018 |
| WO | 2018136271 A1 | 7/2018 |
| WO | 2018172193 A1 | 9/2018 |
| WO | 2018207145 A1 | 11/2018 |
| WO | 2018236989 A1 | 12/2018 |
| WO | 2019001908 A1 | 1/2019 |
| WO | 2019069157 A1 | 4/2019 |
| WO | 2019102312 A1 | 5/2019 |
| WO | 2019102328 A1 | 5/2019 |
| WO | 2019102329 A1 | 5/2019 |
| WO | 2019102330 A1 | 5/2019 |
| WO | 2019102331 A1 | 5/2019 |
| WO | 2019108805 A2 | 6/2019 |
| WO | 2021161129 A1 | 8/2019 |
| WO | 2019167022 A1 | 9/2019 |
| WO | 2019197948 A1 | 10/2019 |
| WO | 2019207415 A1 | 10/2019 |
| WO | 2019207416 A1 | 10/2019 |
| WO | 2019207417 A1 | 10/2019 |
| WO | 2019207423 A1 | 10/2019 |
| WO | 2019215571 A1 | 11/2019 |
| WO | 2020025270 A1 | 2/2020 |
| WO | 2020035764 A1 | 2/2020 |
| WO | 2020075005 A1 | 4/2020 |
| WO | 2020079522 A1 | 4/2020 |
| WO | 2020084382 A1 | 4/2020 |
| WO | 2020084483 A1 | 4/2020 |
| WO | 2020089741 A1 | 5/2020 |
| WO | 2020115685 A1 | 6/2020 |
| WO | 2020128708 A1 | 6/2020 |
| WO | 2020128716 A1 | 6/2020 |
| WO | 2020128717 A1 | 6/2020 |
| WO | 2020128719 A1 | 6/2020 |
| WO | 2020128720 A2 | 6/2020 |
| WO | 2020128752 A1 | 6/2020 |
| WO | 2020128779 A2 | 6/2020 |
| WO | 2020128780 A1 | 6/2020 |
| WO | 2020128781 A1 | 6/2020 |
| WO | 2020128783 A1 | 6/2020 |
| WO | 2020128787 A1 | 6/2020 |
| WO | 2020128794 A1 | 6/2020 |
| WO | 2020128833 A1 | 6/2020 |
| WO | 2020128838 A1 | 6/2020 |
| WO | 2020128842 A1 | 6/2020 |
| WO | 2020128844 A1 | 6/2020 |
| WO | 2020128845 A1 | 6/2020 |
| WO | 2020128852 A1 | 6/2020 |
| WO | 2020128853 A1 | 6/2020 |
| WO | 2020128856 A1 | 6/2020 |
| WO | 2020212788 A1 | 10/2020 |
| WO | 2021009600 A1 | 1/2021 |
| WO | 2021014271 A1 | 1/2021 |
| WO | 2021074756 A1 | 4/2021 |
| WO | 2021074768 A1 | 4/2021 |
| WO | 2021079331 A1 | 4/2021 |
| WO | 2021081571 A1 | 5/2021 |
| WO | 2021105030 A1 | 6/2021 |
| WO | 2021116883 A1 | 6/2021 |
| WO | 2021133876 A1 | 7/2021 |
| WO | 2021133888 A1 | 7/2021 |
| WO | 2021133901 A1 | 7/2021 |
| WO | 2021137092 A1 | 7/2021 |
| WO | 2021179025 A1 | 9/2021 |
| WO | 2021186326 A1 | 9/2021 |
| WO | 2021214576 A1 | 10/2021 |
| WO | 2021214605 A1 | 10/2021 |
| WO | 2021234540 A1 | 11/2021 |

OTHER PUBLICATIONS

Austin, Benson M., "Thick-Film Screen Printing," Solid State Technology, Jun. 1969, pp. 53-58.
Avril, Nicolas Joseph "Manufacturing Glass-Fiber Reinforcement for Grinding Wheels" Massachusetts Institute of Technology, Feb. 1996, 105 pages.
Bacher, Rudolph J., "High Resolution Thick Film Printing," E.I. du Pont de Nemours & Company, Inc., Proceedings of the International Symposium on Microelectronics, 1986, pp. 576-581.

(56) References Cited

OTHER PUBLICATIONS

Besse, John R., "Understanding and controlling wheel truing and dressing forces when rotary plunge dressing," Cutting Tool Engineering, Jun. 2012, vol. 64, Issue 6, 4 pages.
Ciccotti, M. et al., "Complex dynamics in the peeling of an adhesive tape," International Journal of Adhesion & Adhesives 24 (2004) pp. 143-15.
Dupont, "Kevlar Aramid Pulp", Copyright 2011, DuPont, Accessed: Sep. 18, 2013, 2 pages.
Wu, J. et al., "Friction and Wear Properties of Kevlar Pulp Reinforced Epoxy Composite under Dry Sliding Condition", Tribology Letters, vol. 22, No. 3, Jun. 2006, pp. 259-263, Abstract only.
J. European Ceramic Society 31 (2011) 2073-2081, Abstract only.
Riemer, Dietrich E., "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.
Morgan, P. et al., "Ceramic Composites of Monazite and Alumina," J. Am. Ceram. Soc., 78, 1995, 1553-1163.
Riemer, Dietrich E., "Analytical Engineering Model of the Screen Printing Process: Part I," Solid State Technology, Aug. 1988, pp. 107-111.
Winter Catalogue No. 5, Dressing tools, Winter diamond tools for dressing grinding wheels, Edition Year: 2010, 140 pages.
Badger, Jeffrey, "Evaluation of Triangular, Engineered-Shape Ceramic Abrasive in Cutting Discs," Supplement to the Welding Journal, Apr. 2014, vol. 93, p. 107-s to 115-s.
3M Cubitron II Abrasive Belts Brochure, Shaping the Future, Jan. 2011, 6 pages.
Vanstrum et al., Precisely Shaped Grain (PSG): 3M's Innovation in Abrasive Grain Technology, 1 page.
Graf, "Cubitron II: Precision-Shaped Grain (PSG) Turns the Concept of Gear Grinding Upside Down," gearsolutions.com, May 2014, pp. 36-44.
Dow Machine Tool Accessories, Grinding & Surface Finishing, www.1mta.com, Nov. 2014, 72 pages.
VSM Actirox Fibre Discs, The Latest Generation of Abrasives for Maximum Stock Removal [PDF] VSM Abrasives Ltd., Apr. 2019 [retrieved on May 15, 2019], 8 pages. Retrieved from https://uk.vsmabrasives.com/fileadmin/user_upload/ACTIROX/VSM-ACTIROX-EN.pdf.
Kumar et al., "Composites by rapid prototyping technology", Material & Design, Feb. 2010, vol. 31, Issue 2, pp. 850-856.
Lewis et al., "Direct Ink Writing of Three-Dimensional Ceramic Structures", Journal of the American Ceramic Society, US, Nov. 30, 2006, vol. 89, Issue 12, pp. 3599-3609.
International Search Report with regard to International application No. PCT/US2017/031998, dated Aug. 21, 2017.
International Search Report with regard to International application No. PCT/US2017/031992, dated Aug. 21, 2017.
International Search Report and Written Opinion for Application No. PCT/US2016/036701, dated Sep. 1, 2016, 12 pages.
Brewer, L. et al., Journal of Materials Research, 1999, vol. 14, No. 10, pp. 3907-3912, Abstract only.
Lewis et al., "Direct Ink Writing of 3D Functional Materials", Advanced Functional Materials, 2006, 16, pp. 2193-2204.

* cited by examiner

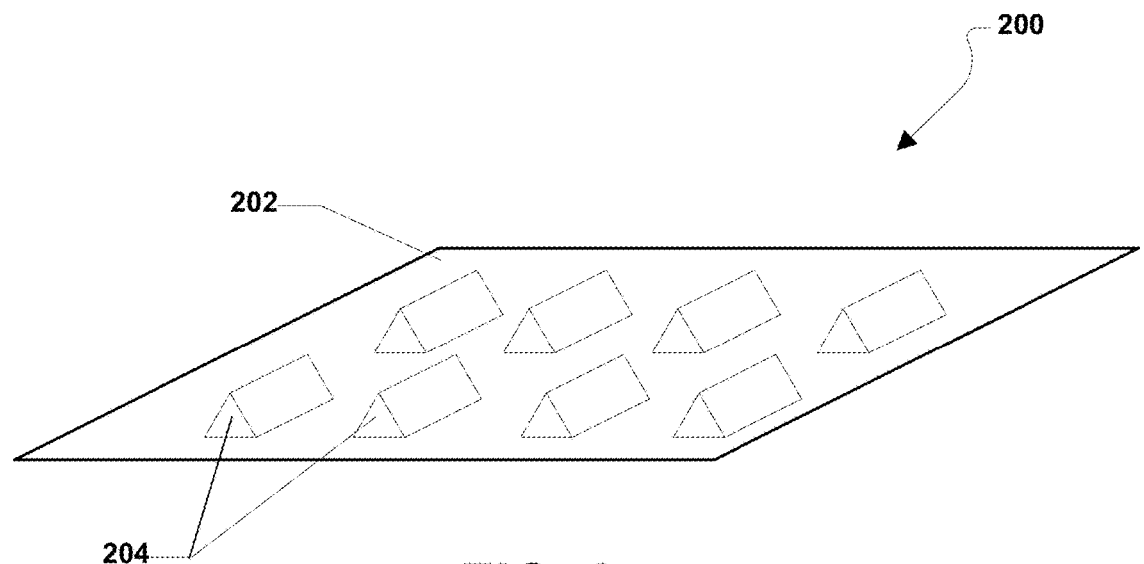
FIG. 2
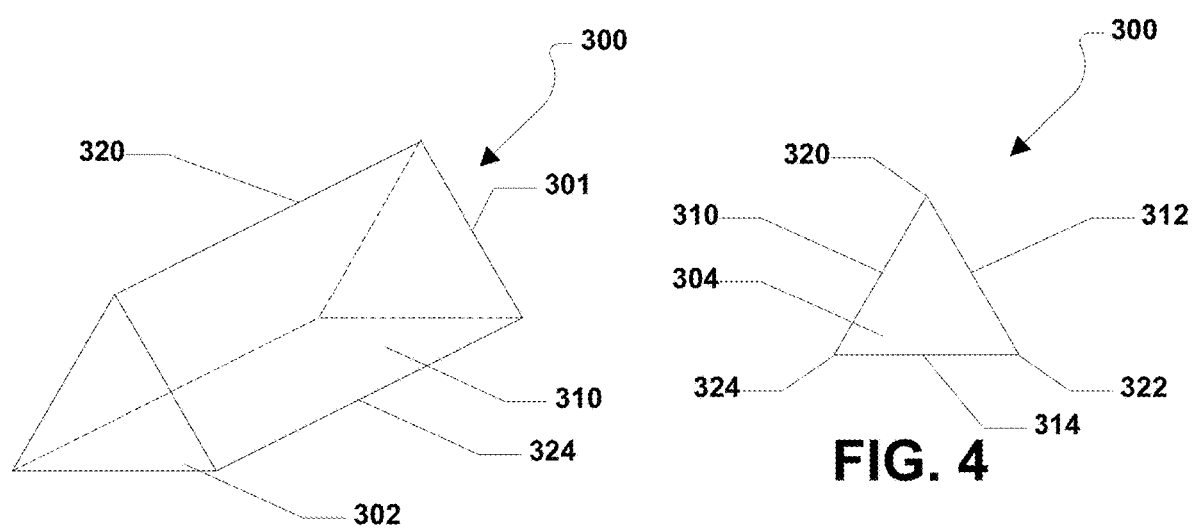
FIG. 3
FIG. 4

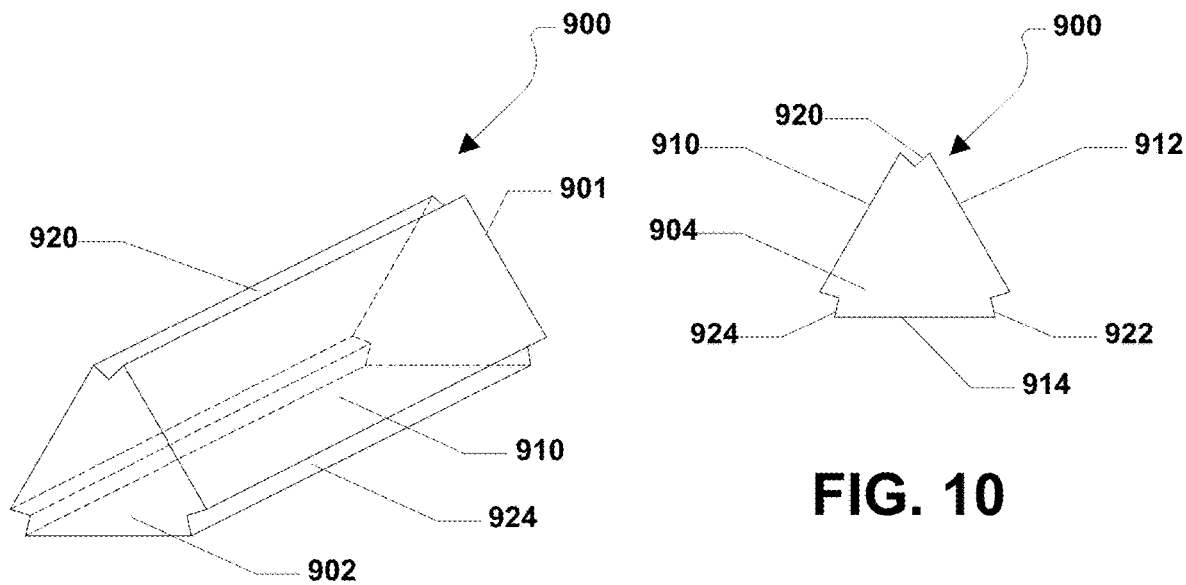
FIG. 9
FIG. 10
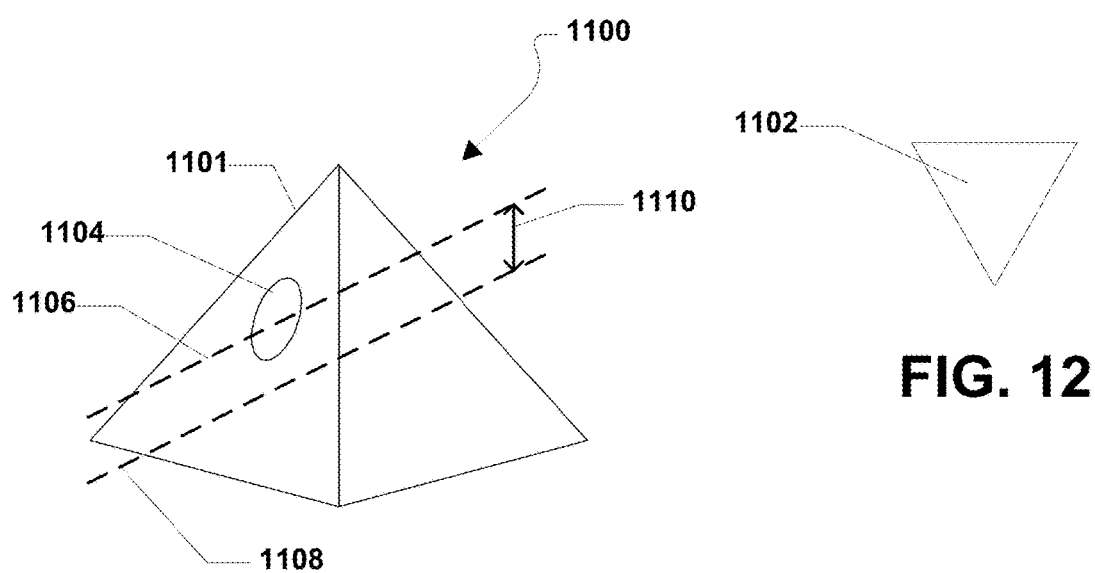
FIG. 11
FIG. 12

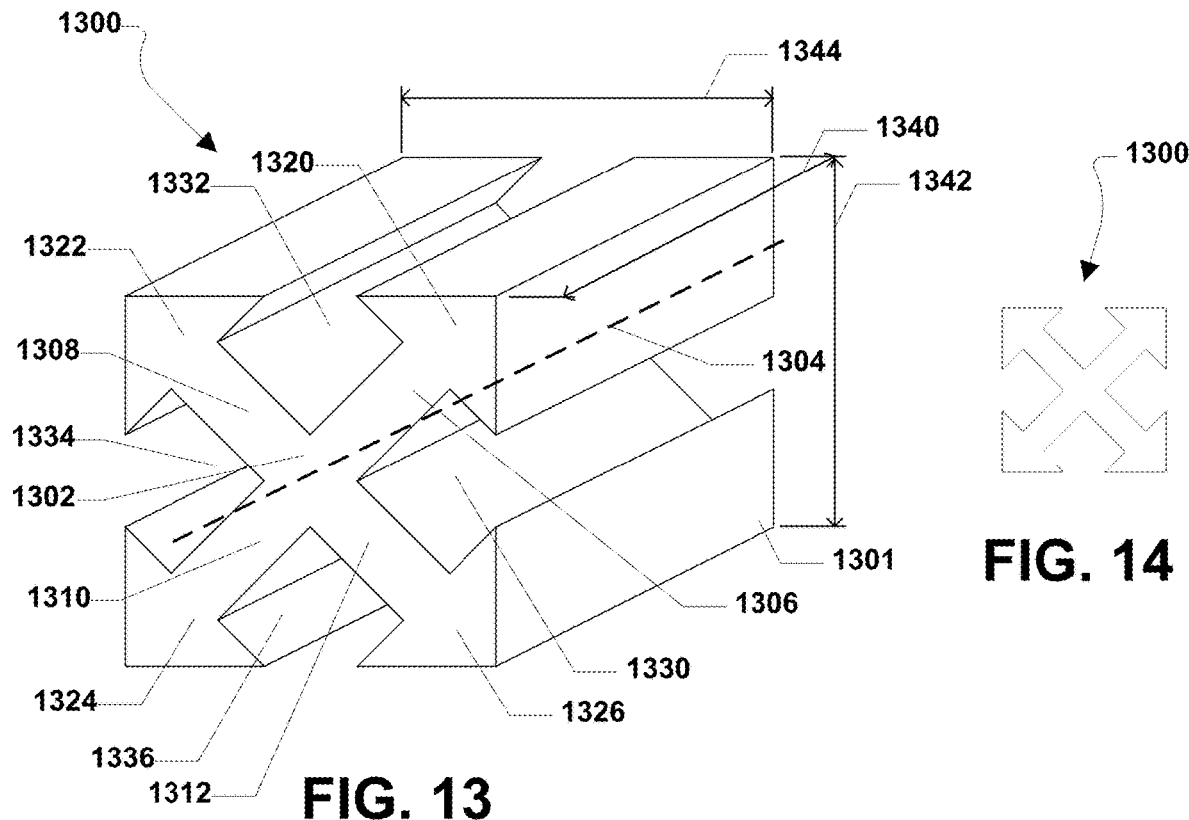
FIG. 13
FIG. 14
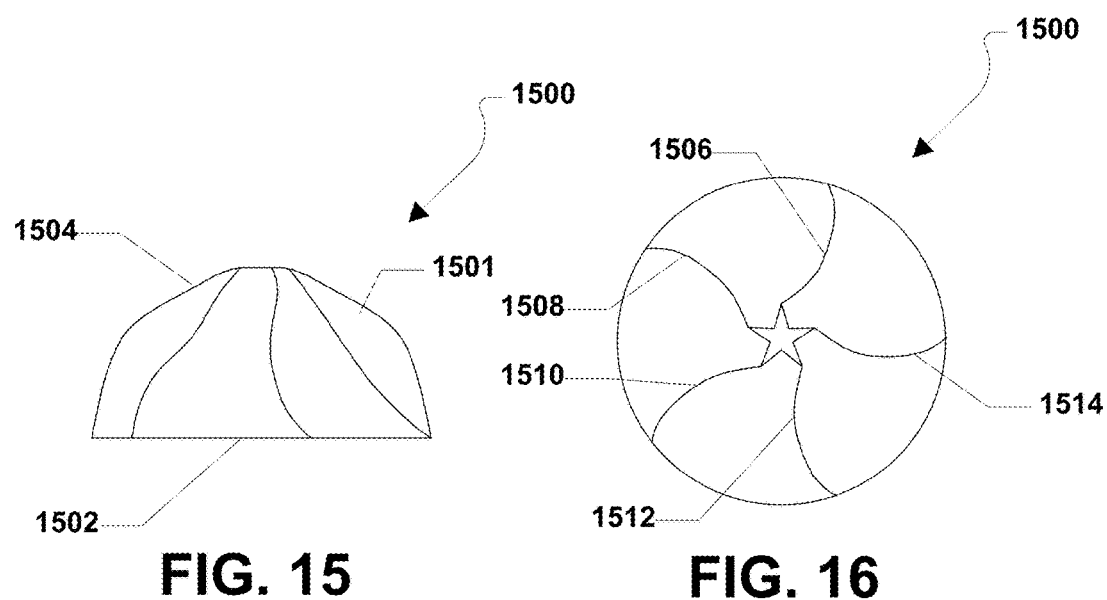
FIG. 15
FIG. 16

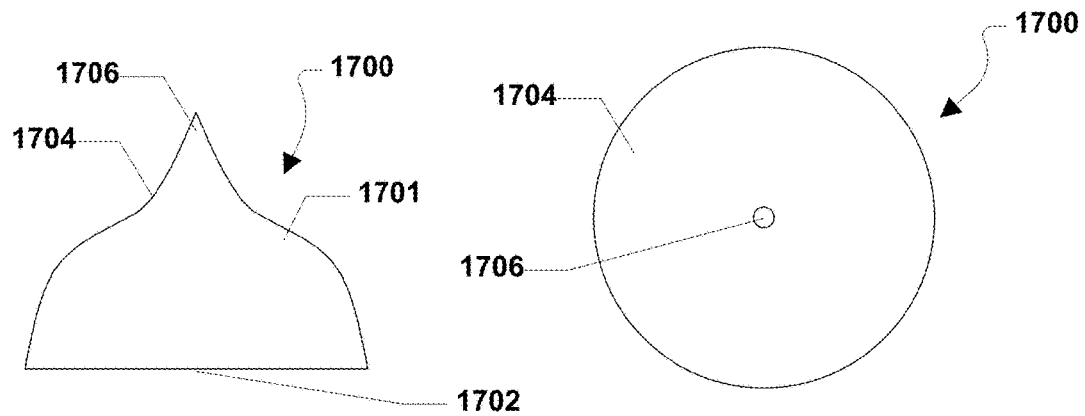
FIG. 17  FIG. 18
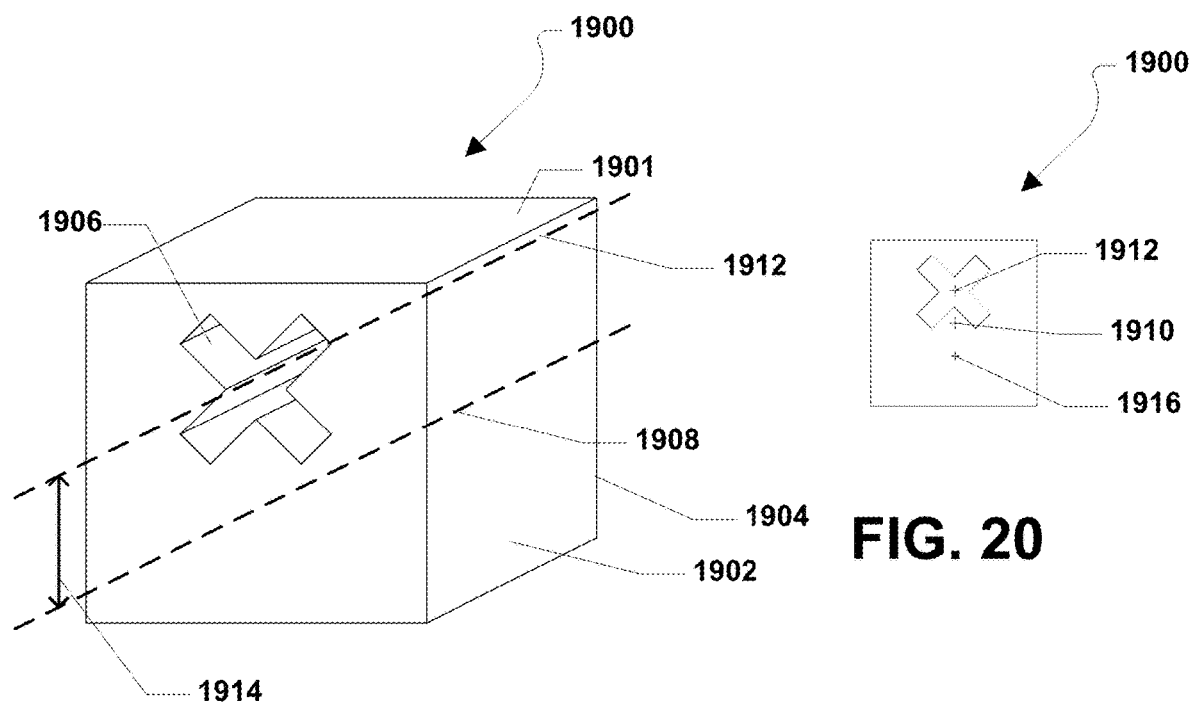
FIG. 19  FIG. 20

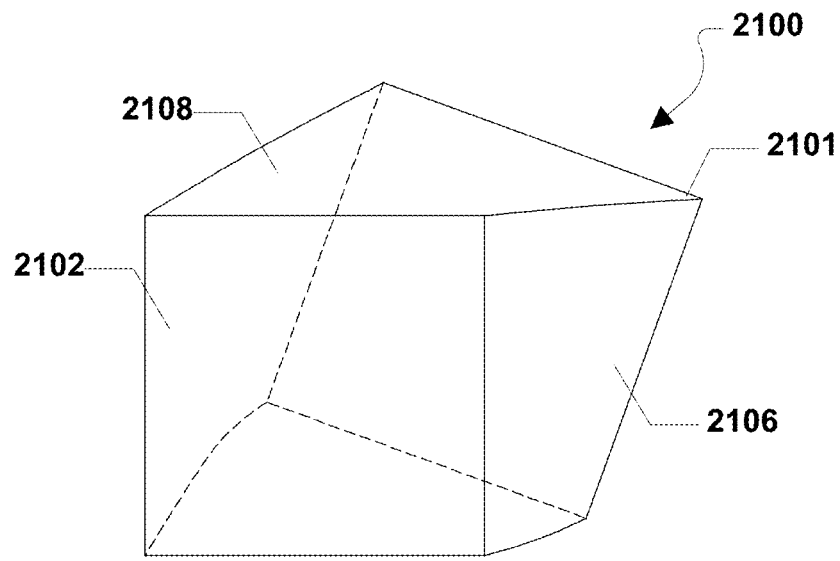
FIG. 21
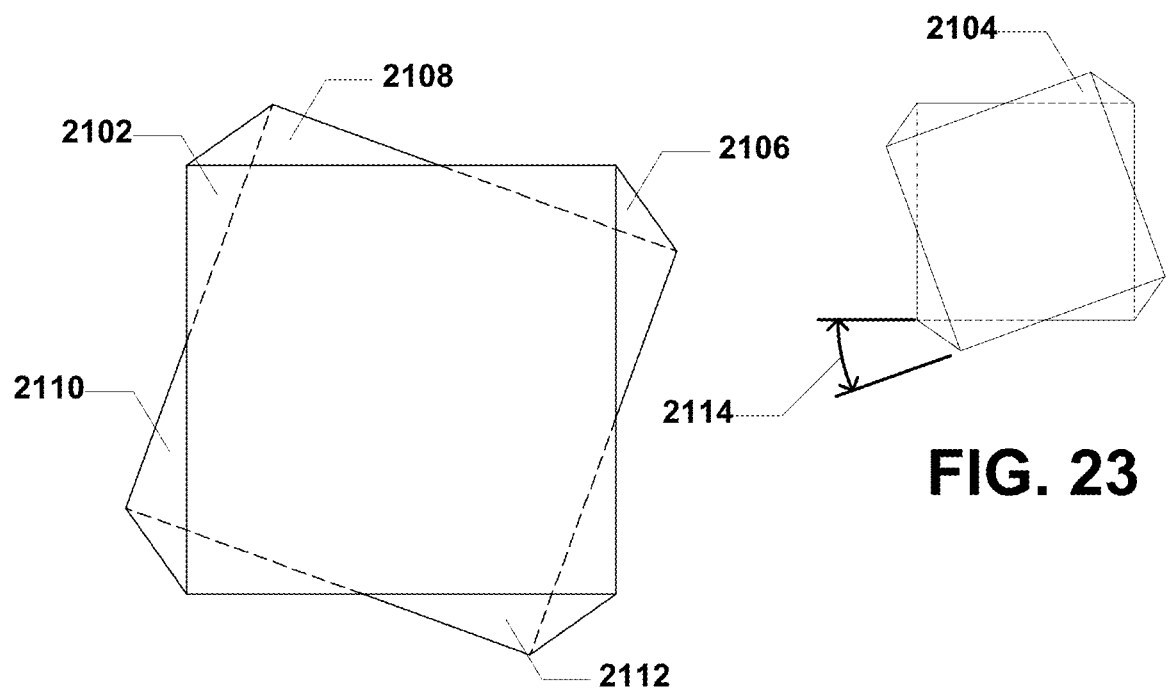
FIG. 22
FIG. 23

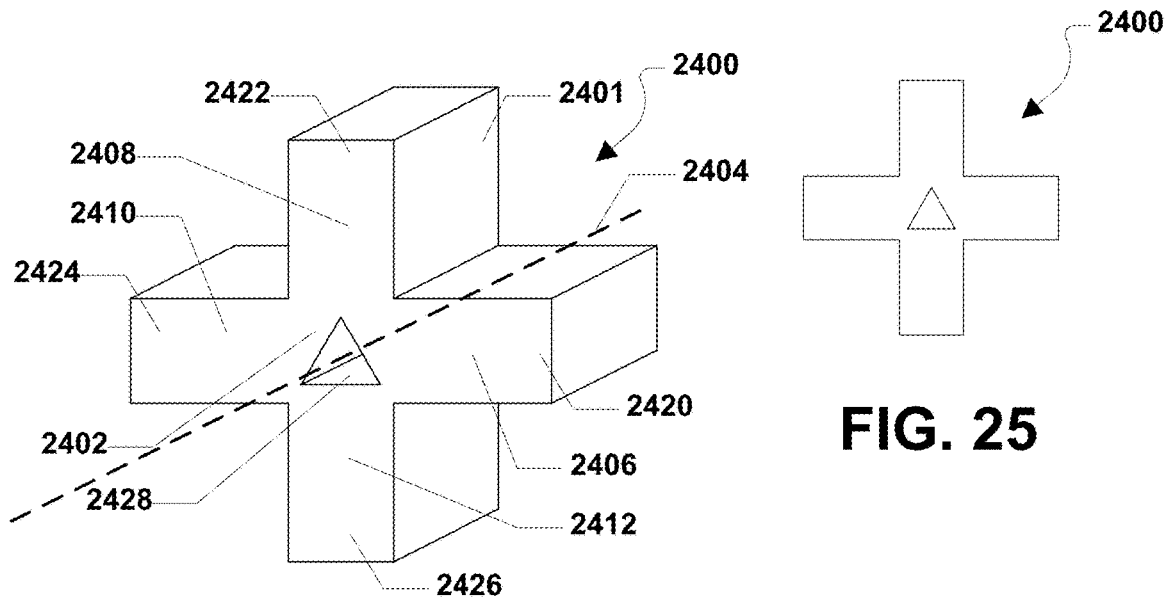
FIG. 24
FIG. 25
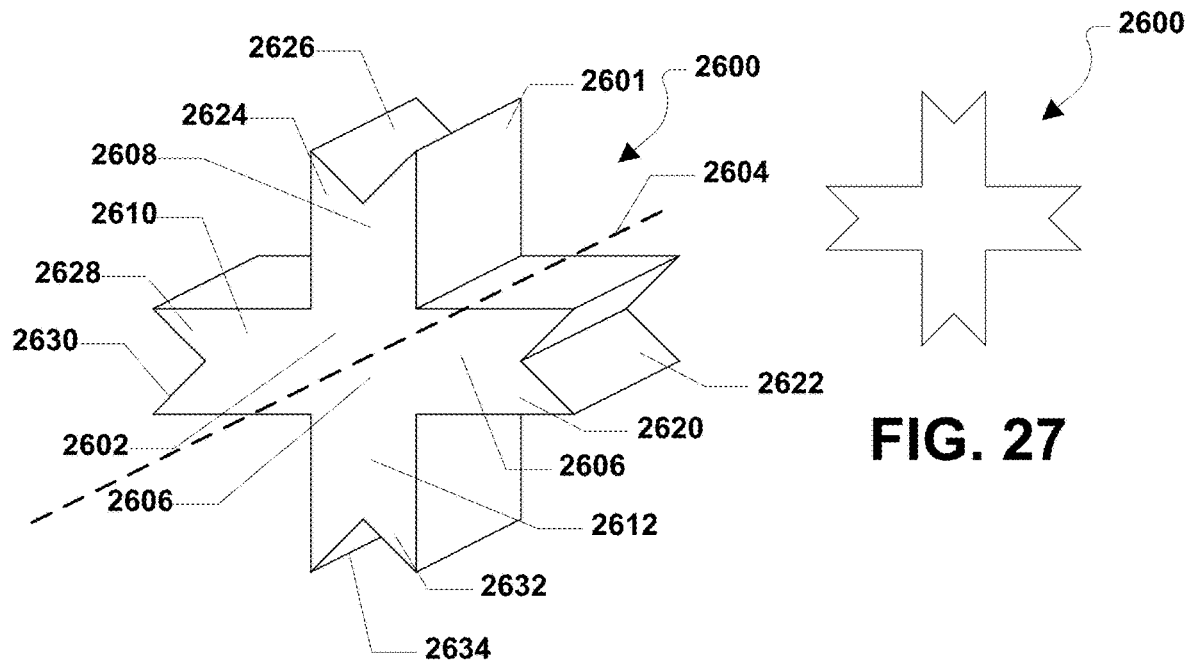
FIG. 26
FIG. 27

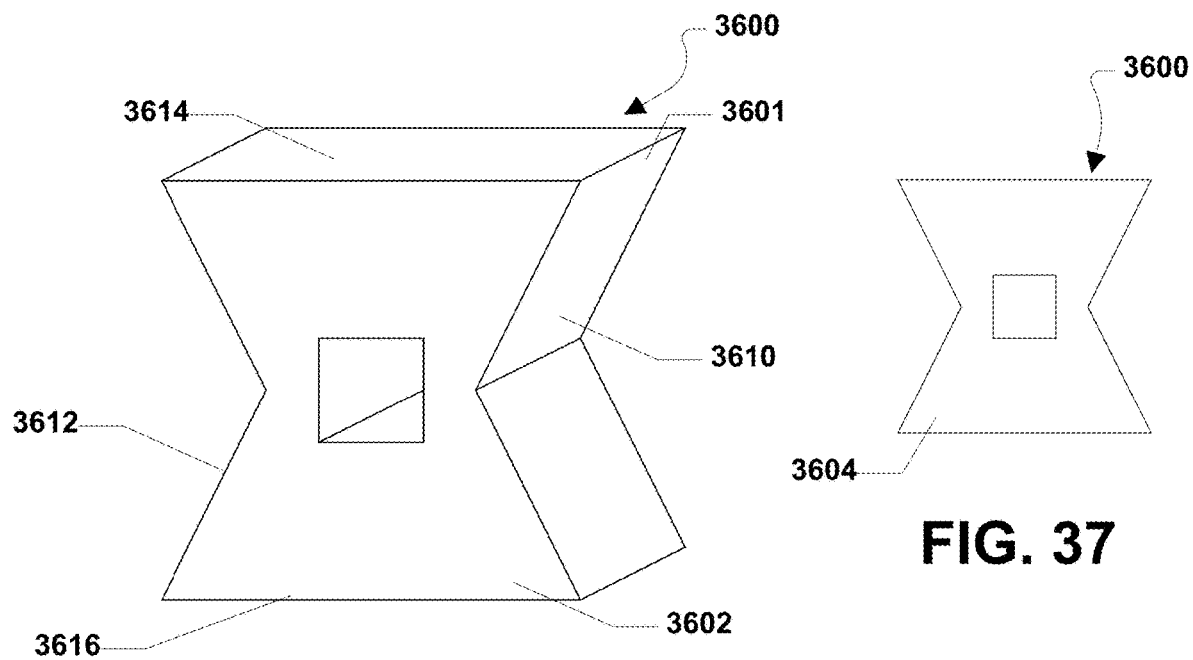
FIG. 36
FIG. 37
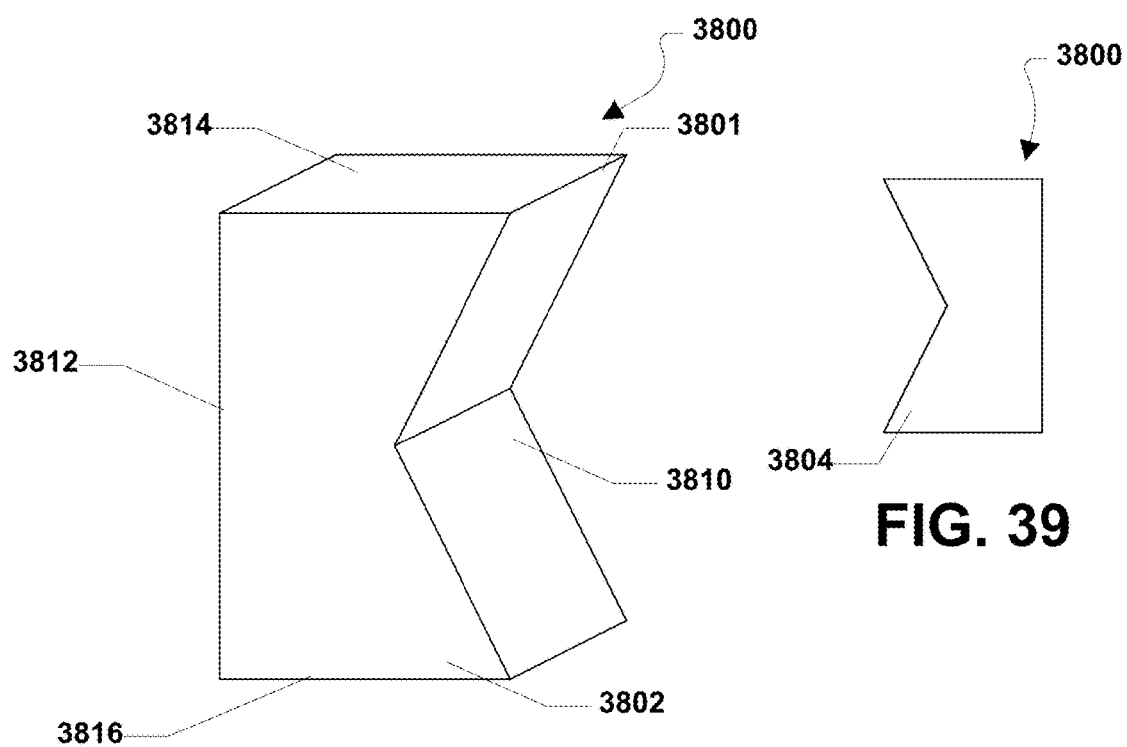
FIG. 38
FIG. 39

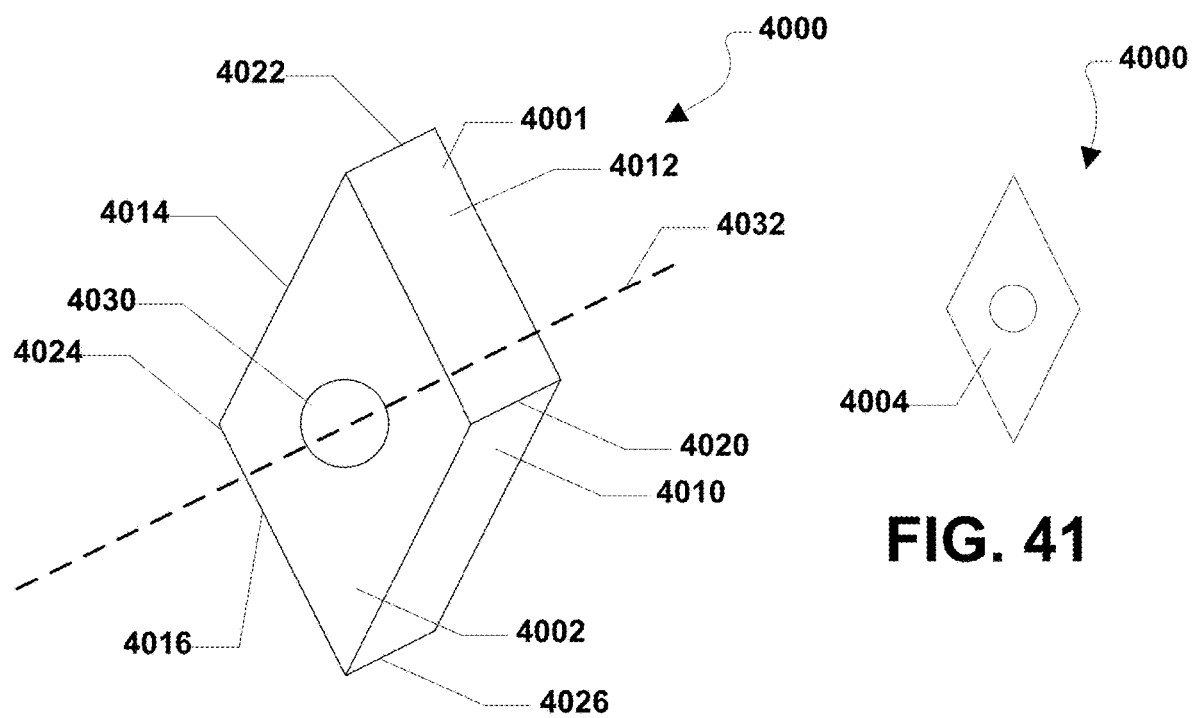
FIG. 40
FIG. 41
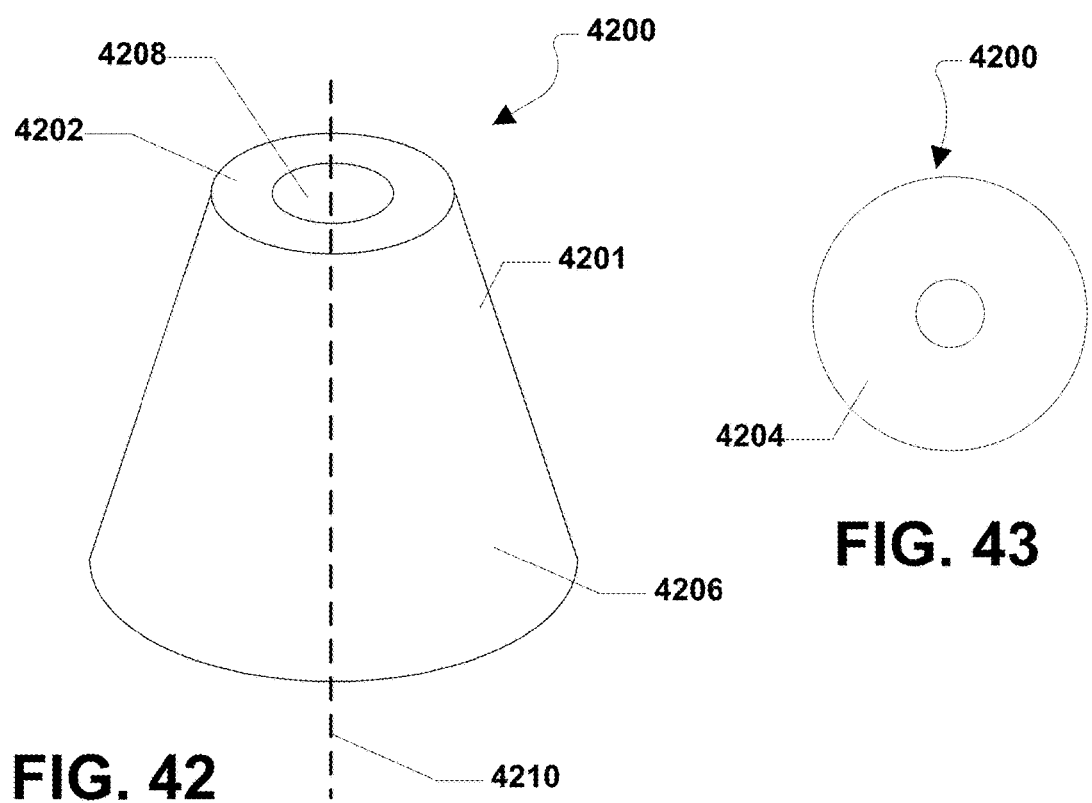
FIG. 42
FIG. 43

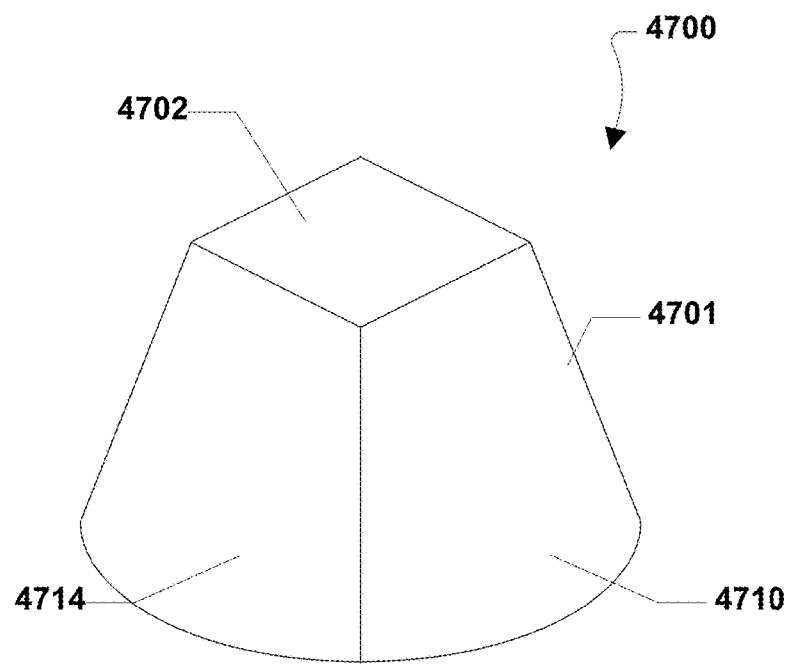
FIG. 47
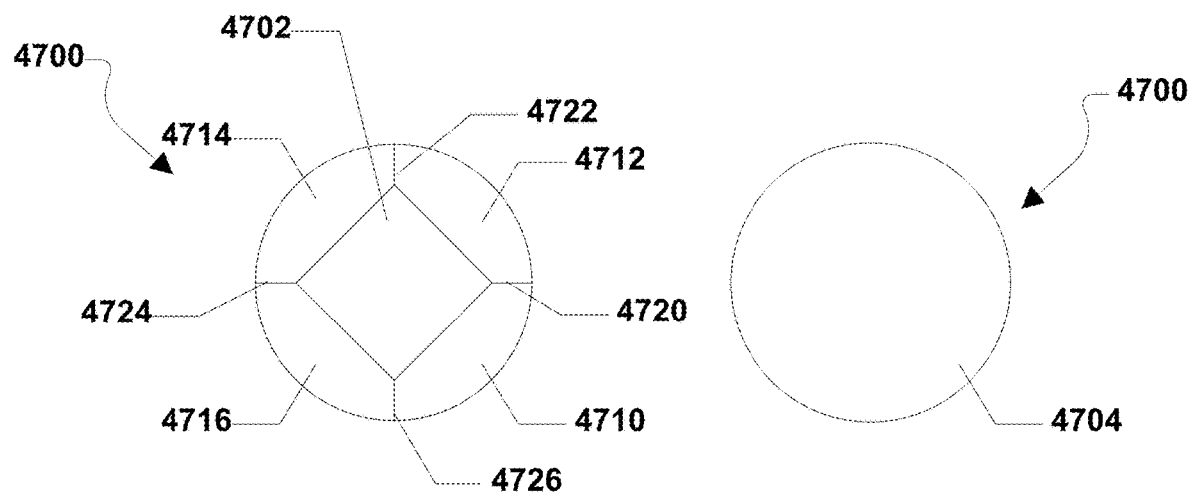
FIG. 48        FIG. 49

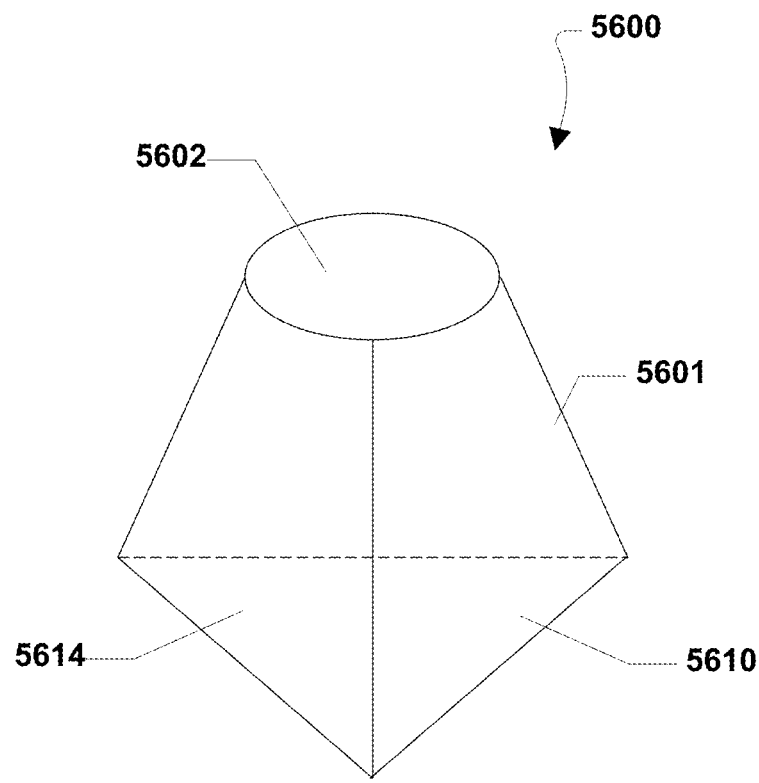
FIG. 56
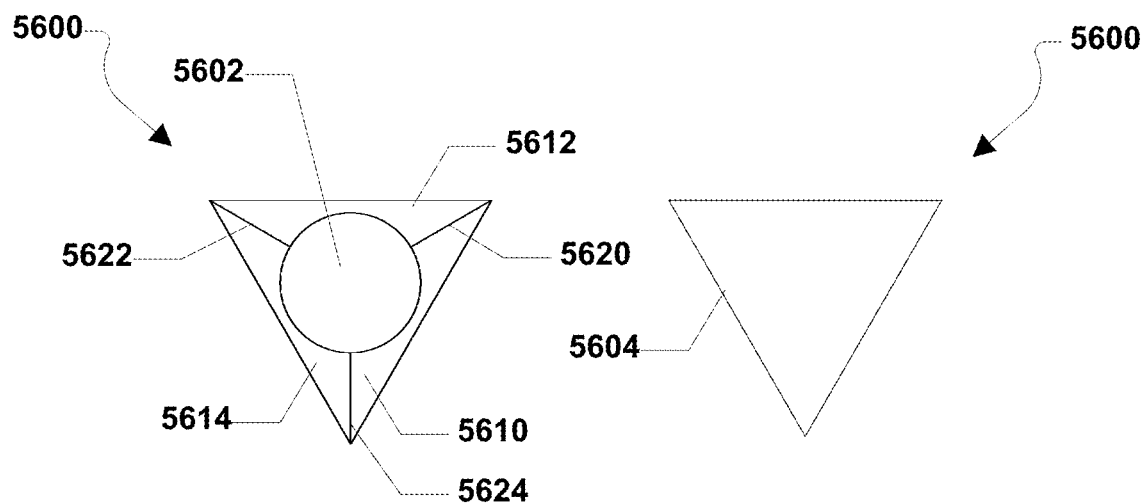
FIG. 57     FIG. 58

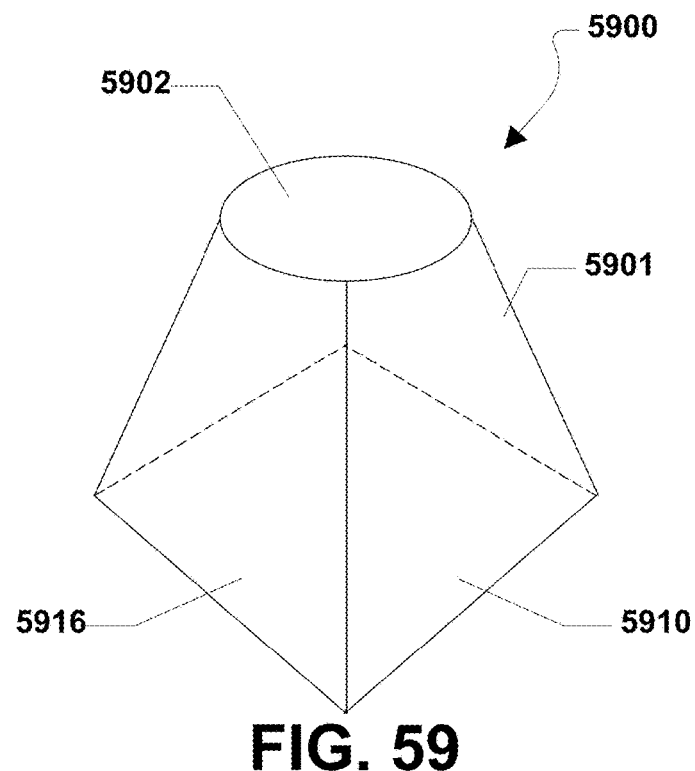
FIG. 59
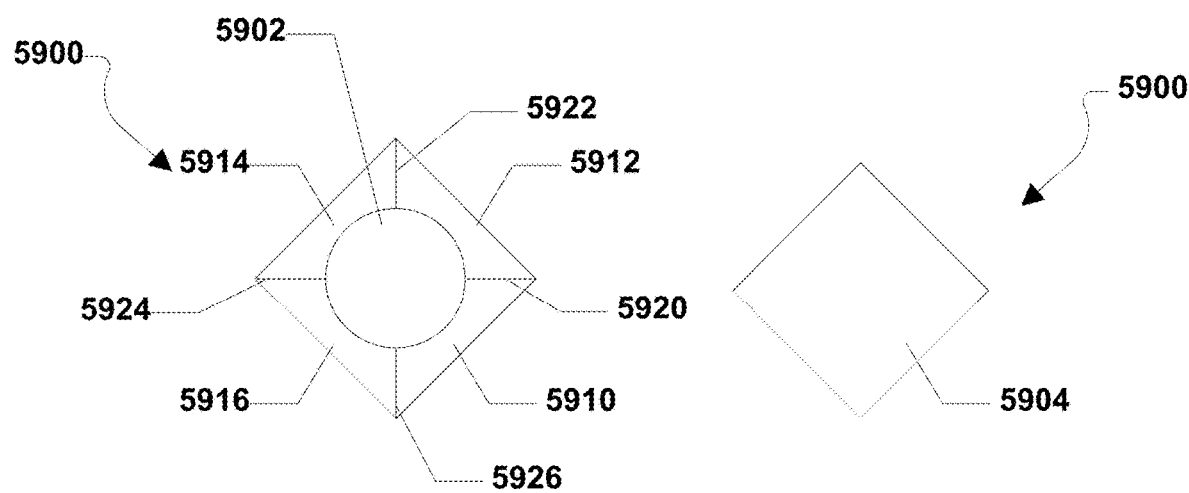
FIG. 60  FIG. 61

ABRASIVE PARTICLES HAVING AN ELONGATED BODY COMPRISING A TWIST ALONG AN AXIS OF THE BODY

CROSS-REFERENCE TO RELATED APPLICATIONS

This application is a continuation of U.S. Non-Provisional patent application Ser. No. 16/459,044, filed Jul. 1, 2019, entitled "ABRASIVE PARTICLES HAVING COMPLEX SHAPES AND METHODS OF FORMING SAME," naming inventors Doruk O. Yener et al., which is a continuation of U.S. Non-Provisional patent application Ser. No. 15/962,838, filed Apr. 25, 2018, which issued on Jul. 30, 2019, as U.S. Pat. No. 10,364,383, entitled "ABRASIVE PARTICLES HAVING COMPLEX SHAPES AND METHODS OF FORMING SAME," naming inventors Doruk O. Yener et al., which is a continuation of U.S. Non-Provisional patent application Ser. No. 15/681,796, filed Aug. 21, 2017, which issued on Oct. 23, 2018, as U.S. Pat. No. 10,106,715, entitled "ABRASIVE PARTICLES HAVING COMPLEX SHAPES AND METHODS OF FORMING SAME," naming inventors Doruk O. Yener et al., which is a continuation of U.S. Non-Provisional patent application Ser. No. 15/402,860, filed Jan. 10, 2017, which issued Sep. 26, 2017, as U.S. Pat. No. 9,771,506, entitled "ABRASIVE PARTICLES HAVING COMPLEX SHAPES AND METHODS OF FORMING SAME," naming inventors Doruk O. Yener et al., which is a continuation of U.S. Non-Provisional patent application Ser. No. 14/964,229, filed Dec. 9, 2015, which issued on Feb. 14, 2017, as U.S. Pat. No. 9,567,505, entitled "ABRASIVE PARTICLES HAVING COMPLEX SHAPES AND METHODS OF FORMING SAME," naming inventors Doruk O. Yener et al., which is a continuation of U.S. Non-Provisional patent application Ser. No. 14/201,436, filed Mar. 7, 2014, which issued Jan. 19, 2016, as U.S. Pat. No. 9,238,768, entitled "ABRASIVE PARTICLES HAVING COMPLEX SHAPES AND METHODS OF FORMING SAME," naming inventors Doruk O. Yener et al., which is a continuation of U.S. Non-Provisional patent application Ser. No. 13/738,890, filed Jan. 10, 2013, which issued Jun. 17, 2014, as U.S. Pat. No. 8,753,742, entitled "ABRASIVE PARTICLES HAVING COMPLEX SHAPES AND METHODS OF FORMING SAME," naming inventors Doruk O. Yener et al., and claims priority from U.S. Provisional Patent Application No. 61/584,998, filed Jan. 10, 2012, entitled "ABRASIVE PARTICLES HAVING COMPLEX SHAPES AND METHODS OF FORMING SAME," naming inventors Doruk O. Yener et al., all of which are assigned to the current assignee hereof and incorporated by reference herein in their entireties.

FIELD OF THE DISCLOSURE

This disclosure, in general, relates to methods and systems for forming structured abrasive articles. More particularly, this disclosure relates to shaped abrasive grains.

BACKGROUND

Abrasive articles, such as coated abrasives and bonded abrasives, are used in various industries to machine workpieces, such as by lapping, grinding, or polishing. Machining utilizing abrasive articles spans a wide industrial scope from optics industries, automotive paint repair industries, to metal fabrication industries. In each of these examples, manufacturing facilities use abrasives to remove bulk material or affect the surface characteristics of products.

Surface characteristics include shine, texture, and uniformity. For example, manufacturers of metal components use abrasive articles to fine and polish surfaces, and oftentimes desire a uniformly smooth surface. Similarly, optics manufacturers desire abrasive articles that produce defect-free surfaces to prevent light diffraction and scattering.

Manufactures also desire abrasive articles that have a high stock removal rate for certain applications. However, there is often a trade-off between removal rate and surface quality. Finer grain abrasive articles typically produce smoother surfaces, yet have lower stock removal rates. Lower stock removal rates lead to slower production and increased cost.

Particularly in the context of coated abrasive articles, manufactures of abrasive articles have introduced surface structures to improve stock removal rate, while maintaining surface quality. Coated abrasive articles having surface structures or patterns of raised abrasive layers, often called engineered or structured abrasives, typically exhibit improved useful life.

However, typical techniques for forming structured abrasive articles are unreliable and suffer from performance limitations. A typical process for forming a structured abrasive article includes coating a backing with a viscous binder, coating the viscous binder with a functional powder, and stamping or rolling structure patterns into the viscous binder. The functional powder prevents the binder from sticking to patterning tools. The binder is subsequently cured.

Imperfect coating of the viscous binder with functional powder leads to binder sticking on patterning tools. Binder sticking produces poor structures, leading to poor product performance and wasted product.

Selection of binders appropriate for typical structured abrasive formation techniques is limited by the process. Typical binders include high loading of traditional fillers that increase the viscosity of the binder. Such traditional fillers affect the mechanical characteristics of the binder. For example, high loading of traditional fillers may adversely affect tensile strength, tensile modulus, and elongation at break characteristics of the binder. Poor mechanical characteristics of the binder allow for loss of abrasive grains, leading to scratching and haze on surfaces and reducing abrasive article life.

Loss of grains also degrades the performance of abrasive articles, leading to frequent replacement. Frequent abrasive article replacement is costly to manufacturers. As such, improved abrasive articles and methods for manufacturing abrasive articles would be desirable.

SUMMARY

An abrasive grain is disclosed and may include a body. The body may define a length (l), a height (h), and a width (w). In a particular aspect, the length is greater than or equal to the height and the height is greater than or equal to the width. Further, in a particular aspect, the body may include a primary aspect ratio defined by the ratio of length:height of at least about 1:1. The body may also include an upright orientation probability of at least about 50%.

In another aspect, an abrasive grain is disclosed and may include a body that has a length (l), a width (w), and a height (h). The length, width, and height may correspond to a longitudinal axis, a lateral axis, and a vertical axis, respectively, and the longitudinal axis, lateral axis, and vertical axis may define three perpendicular planes. In this aspect, the body may include an asymmetric geometry with respect to any of the three perpendicular planes.

In yet another aspect, an abrasive grain is disclosed and may include a body having a complex three-dimensional geometry including 3-fold symmetry in three perpendicular planes defined by a longitudinal axis, a lateral axis, and a vertical axis. Further, the body may include an opening that extends through the entire interior of the body along one of the longitudinal axis, lateral axis, or vertical axis.

In still another aspect, an abrasive grain is disclosed and may include a body having a complex three-dimensional geometry defined by a length (l), a width (w), and a height (h). The body may also include a center of mass and a geometric midpoint. The center of mass may be displaced from the geometric midpoint by a distance ($D_h$) of at least about 0.05(h) along a vertical axis of the body defining the height.

In another aspect, an abrasive grain is disclosed and may include a body that defines a length (l), a width (w), and a height (h). The body may include a base surface and an upper surface. Further, the base surface comprises a different cross-sectional shape than a cross-sectional shape of the upper surface.

In still another aspect, an abrasive grain is disclosed and may include a body that has a generally flat bottom and a dome-shaped top extending from the generally flat bottom.

In another aspect, an abrasive grain is disclosed and may include a body comprising a length (l), a width (w), and a height (h). The length, width, and height may correspond to a longitudinal axis, a lateral axis, and a vertical axis, respectively. Further, the body may include a twist along a longitudinal axis defining the length of the body such that a base surface is rotated with respect to an upper surface to establish a twist angle.

In yet another aspect, an abrasive grain is disclosed and may include a body having a first end face and a second end face a, at least three adjacent side faces extending between the first end face and the second end face, and an edge structure established between each pair of adjacent side faces.

In another aspect, an abrasive grain is disclosed and may include a body having a central portion and at least three radial arms extending outwardly from the central portion along the entire length of the central portion.

In yet another aspect, an abrasive grain includes a body having a length (l), a width (w), and a height (h), wherein the body has a base surface end and an upper surface, and wherein the base surface includes a different cross-sectional shape than a cross-sectional shape of the upper surface.

For another aspect, an abrasive grain includes a body having a central portion and at least three radial arms extending outwardly from the central portion along the entire length of the central portion, wherein each radial arm includes an arrow-shaped distal end.

According to another aspect, a shaped abrasive particle includes a body having a length (l), a width (w), and a height (h), wherein the body comprises a base surface end, an upper surface, and a side surface extending between the base surface and the upper surface, and wherein the base surface has a different cross-sectional shape than a cross-sectional shape of the upper surface.

In one aspect, a shaped abrasive particle includes a body having a length (l), a width (w), and a height (h), wherein the body has a three-pointed star including a first arm defining a first arm, a second arm defining a second arm, and a third arm defining a second arm, and wherein the first arm, second arm and third arm define a total angle of less than about 180 degrees, and wherein the body has a curling factor of not greater than about 10.

For another aspect, a shaped abrasive particle includes a body having a length (l), a width (w), and a height (h), wherein the body defines a four-pointed star having a first arm, second arm, third arm, and fourth arm extending from a central portion, and wherein the body has a curling factor of not greater than about 10.

According to yet another aspect, a shaped abrasive particle includes a body having a length (l), a width (w), and a height (h), wherein the body is defined by a base surface, an upper surface, and a side surface extending between the base surface and the upper surface, wherein the base surface comprises a cross-shaped two-dimensional shape and the upper surface comprises a rounded quadrilateral two-dimensional shape.

For still another aspect, a shaped abrasive particle includes a body having a first layer having a first length and a second layer overlying the first layer, wherein the second layer has a length that is within a range between about 50% and about 90% of the length of the first layer.

BRIEF DESCRIPTION OF THE DRAWINGS

The present disclosure may be better understood, and its numerous features and advantages made apparent to those skilled in the art by referencing the accompanying drawings.

FIG. 2 is a perspective view of a structured abrasive article;

FIG. 3 is a perspective view of a first embodiment of a shaped abrasive grain;

FIG. 4 is a plan view of a second end of the first embodiment of a shaped abrasive grain;

FIG. 9 is a perspective view of a fourth embodiment of a shaped abrasive grain;

FIG. 10 is a plan view of a second end face of the fourth embodiment of a shaped abrasive grain;

FIG. 11 is a perspective view of a fifth embodiment of a shaped abrasive grain;

FIG. 12 is a plan view of a bottom of the fifth embodiment of a shaped abrasive grain;

FIG. 13 is a perspective view of a sixth embodiment of a shaped abrasive grain;

FIG. 14 is a plan view of a second end face of the fourth embodiment of a shaped abrasive grain;

FIG. 15 is a plan view of a top of a seventh embodiment of a shaped abrasive grain;

FIG. 16 is a plan view of a bottom of the seventh embodiment of a shaped abrasive grain;

FIG. 17 is a plan view of a top of an eighth embodiment of a shaped abrasive grain;

FIG. 18 is a plan view of a bottom of the eighth embodiment of a shaped abrasive grain;

FIG. 19 is a perspective view of a ninth embodiment of a shaped abrasive grain;

FIG. 20 is a plan view of a second end face of the ninth embodiment of a shaped abrasive grain;

FIG. 21 is a perspective view of a tenth embodiment of a shaped abrasive grain;

FIG. 22 is a plan view of a first end face of the tenth embodiment of a shaped abrasive grain;

FIG. 23 is a plan view of a second end face of the tenth embodiment of a shaped abrasive grain;

FIG. 24 is a perspective view of an eleventh embodiment of a shaped abrasive grain;

FIG. 25 is a plan view of a second end face of the eleventh embodiment of a shaped abrasive grain;

FIG. 26 is a perspective view of a twelfth embodiment of a shaped abrasive grain;

FIG. 27 is a plan view of a second end face of the twelfth embodiment of a shaped abrasive grain;

FIG. 36 is a perspective view of a seventeenth embodiment of a shaped abrasive grain;

FIG. 37 is a plan view of a second end face of the seventeenth embodiment of a shaped abrasive grain;

FIG. 38 is a perspective view of an eighteenth embodiment of a shaped abrasive grain;

FIG. 39 is a plan view of a second end face of the eighteenth embodiment of a shaped abrasive grain;

FIG. 40 is a perspective view of a nineteenth embodiment of a shaped abrasive grain;

FIG. 41 is a plan view of a second end face of the nineteenth embodiment of a shaped abrasive grain;

FIG. 42 is a perspective view of a twentieth embodiment of a shaped abrasive grain;

FIG. 43 is a plan view of a second end face of the twentieth embodiment of a shaped abrasive grain;

FIG. 47 is a perspective view of a twenty-second embodiment of a shaped abrasive grain;

FIG. 48 is a plan view of a first end face of the twenty-second embodiment of a shaped abrasive grain;

FIG. 49 is a plan view of a second end face of the twenty-second embodiment of a shaped abrasive grain;

FIG. 56 is a perspective view of a twenty-fifth embodiment of a shaped abrasive grain;

FIG. 57 is a plan view of a first end face of the twenty-fifth embodiment of a shaped abrasive grain;

FIG. 58 is a plan view of a second end face of the twenty-fifth embodiment of a shaped abrasive grain;

FIG. 59 is a perspective view of a twenty-sixth embodiment of a shaped abrasive grain;

FIG. 60 is a plan view of a first end face of the twenty-sixth embodiment of a shaped abrasive grain; and FIG. 61 is a plan view of a second end face of the twenty-sixth embodiment of a shaped abrasive grain.

The use of the same reference symbols in different drawings indicates similar or identical items.

DETAILED DESCRIPTION

The following is also directed to methods of forming shaped abrasive particles and features of such shaped abrasive particles. The shaped abrasive particles may be used in various abrasive articles, including for example bonded abrasive articles, coated abrasive articles, and the like. Alternatively, the shaped abrasive particles of the embodiments herein may be utilized in free abrasive technologies, including for example grinding and/or polishing slurries.

Figure 1:
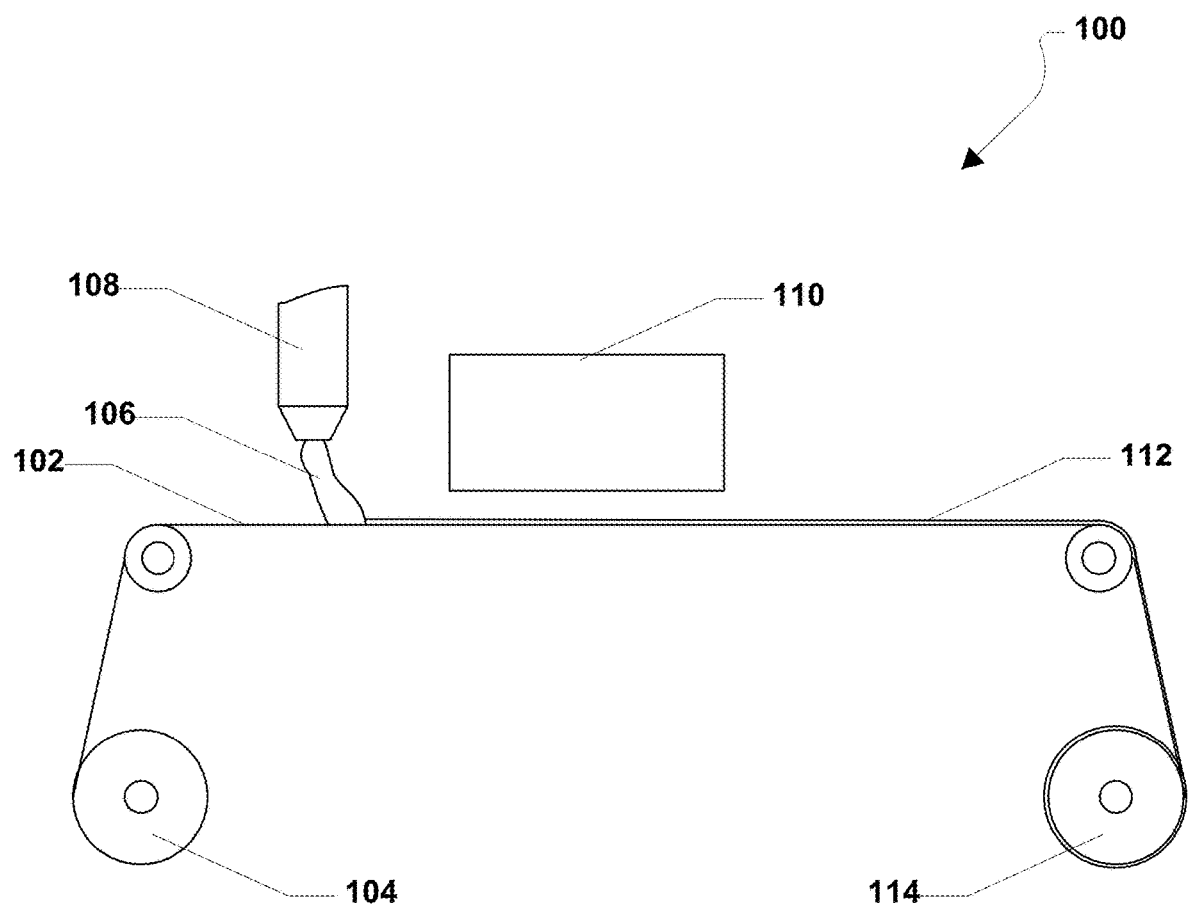
FIG. 1 is a diagram of an exemplary process.

Referring initially to FIG. 1, an exemplary process is shown and is generally designated 100. As shown, a backing 102 may be paid from a roll 104. The backing 102 may be coated with a binder formulation 106 dispensed from a coating apparatus 108. An exemplary coating apparatus includes a drop die coater, a knife coater, a curtain coater, a vacuum die coater or a die coater. Coating methodologies can include either contact or non-contact methods. Such methods include 2 roll, 3 roll reverse, knife over roll, slot die, gravure, extrusion, or spray coating applications.

In a particular embodiment, the binder formulation 106 may be provided in a slurry that includes the binder formulation and abrasive grains. In an alternative embodiment, the binder formulation 106 may be dispensed separate from the abrasive grains. Then, the abrasive grains may be provided following the coating of the backing 102 with the binder formulation 106, after partial curing of the binder formulation 106, after patterning of the binder formulation 106, or after fully curing the binder formulation 108. The abrasive grains may, for example, be applied by a technique, such as electrostatic coating, drop coating or mechanical projection. In a particular aspect, the abrasive grains may be any combination of one or more of the shaped abrasive grains described herein.

The binder formulation 106 may be cured after passing under an energy source 110. The selection of the energy source 110 may depend in part upon the chemistry of the binder formulation 106. For example, the energy source 110 may be a source of thermal energy or actinic radiation energy, such as electron beam, ultraviolet light, or visible light. The amount of energy used may depend on the chemical nature of the reactive groups in the precursor polymer constituents, as well as upon the thickness and density of the binder formulation 106. For thermal energy, an oven temperature of about 75° C. to about 150° C. and a duration of about 5 minutes to about 60 minutes may be generally sufficient. Electron beam radiation or ionizing radiation may be used at an energy level of about 0.1 MRad to about 100 MRad, particularly at an energy level of about 1 MRad to about 10 MRad. Ultraviolet radiation includes radiation having a wavelength within a range of about 200 nanometers to about 400 nanometers, particularly within a range of about 250 nanometers to 400 nanometers. Visible radiation includes radiation having a wavelength within a range of about 400 nanometers to about 800 nanometers, particularly in a range of about 400 nanometers to about 550 nanometers. Curing parameters, such as exposure, are generally formulation dependent and can be adjusted via lamp power and belt speed.

In an exemplary embodiment, the energy source 110 may provide actinic radiation to the coated backing, partially curing the binder formulation 106. In another embodiment, the binder formulation 106 is thermally curable and the energy source 110 may provide heat for thermal treatment. In a further embodiment, the binder formulation 106 may include actinic radiation curable and thermally curable components. As such, the binder formulation may be partially cured through one of thermal and actinic radiation curing and cured to complete curing through a second of thermal and actinic radiation curing. For example, an epoxy constituent of the binder formulation may be partially cured using ultraviolet electromagnetic radiation and an acrylic constituent of the binder formulation may be further cured through thermal curing.

Once the binder formulation 106 is cured a structured abrasive article 112 is formed. Alternatively, a size coat may be applied over the patterned abrasive structures. In a particular embodiment, the structured abrasive article 112 may be rolled into a roll 114. In other embodiments, fully curing may be performed after rolling a partially cured abrasive article 112.

In one or more alternative embodiments, a size coat may be applied over the binder formulation 106 and abrasive grains. For example, the size coat may be applied before partially curing the binder formulation 106, after partially curing the binder formulation 106 or after further curing the binder formulation 106. The size coat may be applied, for example, by roll coating or spray coating. Depending on the composition of the size coat and when it is applied, the size coat may be cured in conjunction with the binder formulation 106 or cured separately. A supersize coat including grinding aids may be applied over the size coat and cured with the binder formulation 106, cured with the size coat or cured separately.

Referring to FIG. 2, a structured abrasive article is shown and is generally designated 200. As illustrated, the structured abrasive article 200 may include a backing 202 and a plurality of shaped abrasive grains 204 deposited thereon. In a particular aspect, the structured abrasive article 200 may be manufactured using the process described in conjunction with FIG. 1.

In a particular aspect, the shaped abrasive grains 204 may be one or more of the shaped abrasive grains described herein. Further, the shaped abrasive grains may include one or more, or any combination, of the shaped abrasive grains described herein. Further, one or more of the shaped abrasive grains described herein may include an upright orientation probability. The upright orientation may be considered an orientation that corresponds to a favorable abrasive/cutting position for each shaped abrasive grain and the probability is a simple mathematical probability that the grain lands in the upright orientation.

In a particular aspect, the upright orientation is at least fifty percent (50%). In another aspect, the upright orientation is at least fifty-five percent (55%). In another aspect, the upright orientation is at least sixty percent (60%). In another aspect, the upright orientation is at least sixty-five percent (65%). In another aspect, the upright orientation is at least seventy percent (70%). In another aspect, the upright orientation is at least seventy-five percent (75%). In another aspect, the upright orientation is at least eighty percent (80%). In another aspect, the upright orientation is at least eighty-five percent (85%). In another aspect, the upright orientation is at least ninety percent (90%). In another aspect, the upright orientation is at least ninety-five percent (95%). In another aspect, the upright orientation is one hundred percent (100%).

The body of each of the shaped abrasive grains described herein may include a polycrystalline material. The polycrystalline material may include abrasive grains. The abrasive grains may include nitrides, oxides, carbides, borides, oxynitrides, diamond, or a combination thereof. Further, the abrasive grains may include an oxide selected from the group of oxides consisting of aluminum oxide, zirconium oxide, titanium oxide, yttrium oxide, chromium oxide, strontium oxide, silicon oxide, and a combination thereof.

In another aspect, the abrasive grains may include alumina. In yet another aspect, the abrasive grains consist essentially of alumina. Further, the abrasive grains may have an average grain size of not greater than about 500 microns. Alternatively, the average grain size is not greater than about 250 microns. In another aspect, the average grain size is not greater than about 100 microns. In another aspect, the average grain size is not greater than about 50 microns. In another aspect, the average grain size is not greater than about 30 microns. In another aspect, the average grain size is not greater than about 20 microns. In another aspect, the average grain size is not greater than about 10 microns. In another aspect, the average grain size is not greater than about 1 micron.

In another aspect, the average grain size is at least about 0.01 microns. In another aspect, the average grain size is at least about 0.05 microns. In another aspect, the average grain size is at least about 0.08 microns. In another aspect, the average grain size is at least about 0.1 microns.

In another aspect, the body of each of the shaped abrasive grains described herein may be a composite that includes at least about 2 different types of abrasive grains.

FIG. 3 and FIG. 4 illustrate a first embodiment of a shaped abrasive grain 300. As shown in FIG. 3, the shaped abrasive grain 300 may include a body 301 that is generally prismatic with a first end face 302 and a second end face 304. Further, the shaped abrasive grain 300 may include a first side face 310 extending between the first end face 302 and the second end face 304. A second side face 312 may extend between the first end face 302 and the second end face 304 adjacent to the first side face 310. As shown, the shaped abrasive grain 300 may also include a third side face 314 extending between the first end face 302 and the second end face 304 adjacent to the second side face 312 and the first side face 310.

As depicted in FIG. 3 and FIG. 4, the shaped abrasive grain 300 may also include a first edge 320 between the first side face 310 and the second side face 312. The shaped abrasive grain 300 may also include a second edge 322 between the second side face 312 and the third side face 314. Further, the shaped abrasive grain 300 may include a third edge 324 between the third side face 314 and the first side face 312.

As shown, each end face 302, 304 the shaped abrasive grain 300 may be generally triangular in shape. Each side face 310, 312, 314 may be generally rectangular in shape. Further, the cross-section of the shaped abrasive grain 300 in a plane parallel to the end faces 302, 304 is generally triangular. It can be appreciated that the shaped abrasive grain 300 may include more than the three side faces 310, 312, 314, and three edges 320, 322, 324. It may be further appreciated that depending on the number of side faces 310, 312, 314, the end faces 302, 304 and cross-section of the shaped abrasive grain 300 through a plane parallel to the end faces 302, 304 may have that shape of any polygon, e.g., a quadrilateral, a pentagon, a hexagon, a heptagon, an octagon, a nonagon, a decagon, etc. Further, the polygon may be convex, non-convex, concave, or non-concave.

Figure 5:
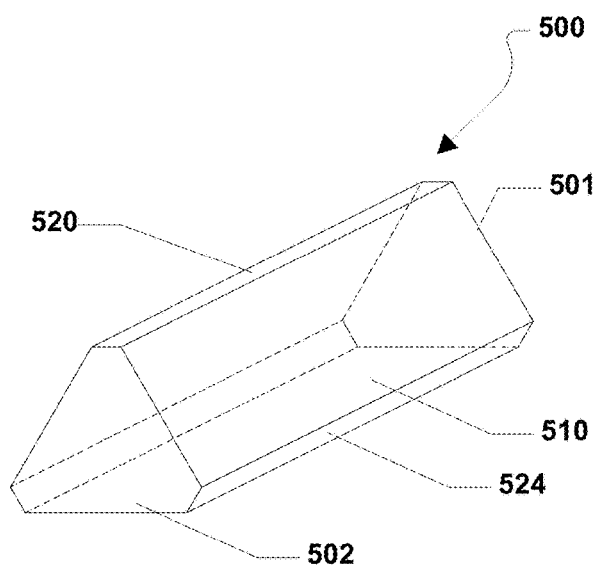
FIG. 5 is a perspective view of a second embodiment of a shaped abrasive grain.
Figure 6:
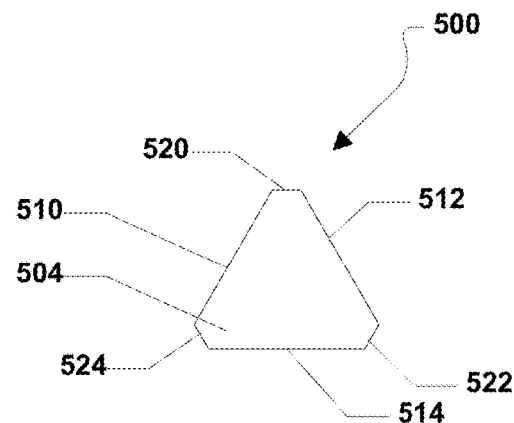
FIG. 6 is a plan view of a second end face of the second embodiment of a shaped abrasive grain.

FIG. 5 and FIG. 6 illustrate a second embodiment of a shaped abrasive grain 500. As shown in FIG. 5, the shaped abrasive grain 500 may include a body 501 that is generally prismatic with a first end face 502 and a second end face 504. Further, the shaped abrasive grain 500 may include a first side face 510 extending between the first end face 502 and the second end face 504. A second side face 512 may extend between the first end face 502 and the second end face 504 adjacent to the first side face 510. As shown, the shaped abrasive grain 500 may also include a third side face 514 extending between the first end face 502 and the second end face 504 adjacent to the second side face 512 and the first side face 510.

As depicted in FIG. 5 and FIG. 6, the shaped abrasive grain 500 may also include a first edge face 520 between the first side face 510 and the second side face 512. The shaped abrasive grain 500 may also include a second edge face 522 between the second side face 512 and the third side face 514. Further, the shaped abrasive grain 500 may include a third edge face 524 between the third side face 514 and the first side face 512.

As shown, each end face 502, 504 the shaped abrasive grain 500 may be generally triangular in shape. Each side face 510, 512, 514 may be generally rectangular in shape. Further, the cross-section of the shaped abrasive grain 500 in a plane parallel to the end faces 502, 504 is generally triangular.

Figure 7:
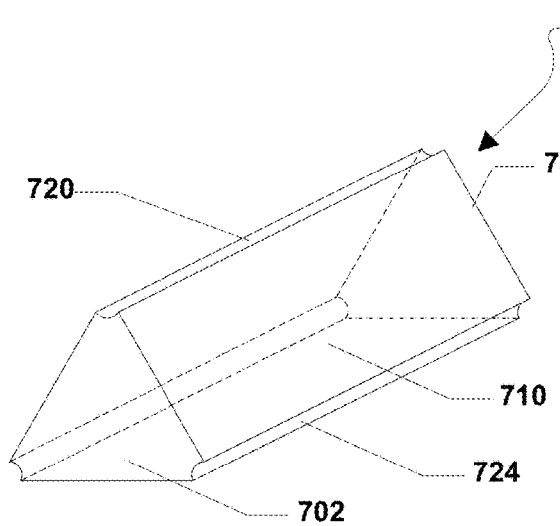
FIG. 7 is a perspective view of a third embodiment of a shaped abrasive grain.
Figure 8:
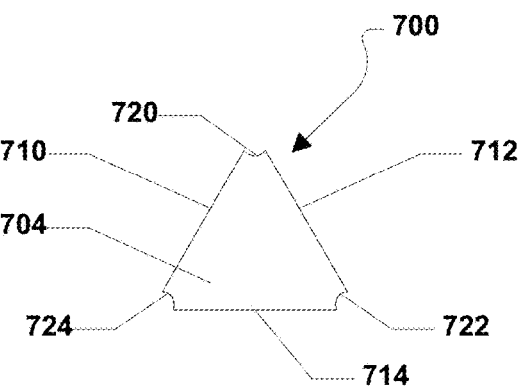
FIG. 8 is a plan view of a second end face of the first embodiment of a shaped abrasive grain.

FIG. 7 and FIG. 8 illustrate a third embodiment of a shaped abrasive grain 700. As shown in FIG. 7, the shaped abrasive grain 700 may include a body 701 that is generally prismatic with a first end face 702 and a second end face 704. Further, the shaped abrasive grain 700 may include a first side face 710 extending between the first end face 702 and the second end face 704. A second side face 712 may extend between the first end face 702 and the second end face 704 adjacent to the first side face 710. As shown, the shaped abrasive grain 700 may also include a third side face 714 extending between the first end face 702 and the second end face 704 adjacent to the second side face 712 and the first side face 710.

As depicted in FIG. 7 and FIG. 8, the shaped abrasive grain 700 may also include a first concave edge channel 720 between the first side face 710 and the second side face 712. The shaped abrasive grain 700 may also include a second concave edge channel 722 between the second side face 712 and the third side face 714. Further, the shaped abrasive grain 700 may include a third concave edge channel 724 between the third side face 714 and the first side face 712.

As shown, each end face 702, 704 the shaped abrasive grain 700 may be generally triangular in shape. Each side face 710, 712, 714 may be generally rectangular in shape. Further, the cross-section of the shaped abrasive grain 700 in a plane parallel to the end faces 702, 704 is generally triangular.

FIG. 9 and FIG. 10 illustrate a fourth embodiment of a shaped abrasive grain 900. As shown in FIG. 9, the shaped abrasive grain 900 may include a body 901 that is generally prismatic with a first end face 902 and a second end face 904. Further, the shaped abrasive grain 900 may include a first side face 910 extending between the first end face 902 and the second end face 904. A second side face 912 may extend between the first end face 902 and the second end face 904 adjacent to the first side face 910. As shown, the shaped abrasive grain 900 may also include a third side face 914 extending between the first end face 902 and the second end face 904 adjacent to the second side face 912 and the first side face 910.

As depicted in FIG. 9 and FIG. 10, the shaped abrasive grain 900 may also include a first V-shaped edge channel face 920 between the first side face 910 and the second side face 912. The shaped abrasive grain 900 may also include a second V-shaped edge channel face 922 between the second side face 912 and the third side face 914. Further, the shaped abrasive grain 900 may include a third V-shaped edge channel face 924 between the third side face 914 and the first side face 912.

As shown, each end face 902, 904 the shaped abrasive grain 900 may be generally triangular in shape. Each side face 910, 912, 914 may be generally rectangular in shape. Further, the cross-section of the shaped abrasive grain 900 in a plane parallel to the end faces 902, 904 is generally triangular.

In the exemplary embodiments shown in FIG. 3 through FIG. 10, it can be appreciated that the edges 320, 322, 324; the edge faces 520, 522, 524; the concave edge channels 720, 722, 724; and the V-shaped edge channels 920, 922, 924 may be considered edge structures. Further, the edge structures ensure that when the shaped abrasive grains 300, 500, 700, 900 are deposited, or otherwise disposed, on a backing, a side face will land on the backing and an edge structure will face up, or outward, from the backing. Further, the edge structures provide sharp edges that provide substantially increased grinding performance.

Additionally, it may be appreciated that in each of the exemplary embodiments shown in FIG. 3 through FIG. 10, the face of the shaped abrasive grain 300, 500, 700, 900, i.e., the base, that is touching a backing has an area that is substantially greater than the area of the portion of the shaped abrasive grain 300, 500, 700, 900 that is pointed outward, or upward, e.g., the edge structure.

In particular, the base may comprise at least about thirty percent (30%) of the total surface area of the particle. In another aspect, the base may comprise at least about forty percent (40%) of the total surface area of the particle. In another aspect, the base may comprise at least about fifty percent (50%) of the total surface area of the particle. In another aspect, the base may comprise at least about sixty percent (60%) of the total surface area of the particle. In another aspect, the base may comprise no greater than ninety-nine percent (99%) of the total surface area of the particle. In another aspect, the base may comprise no greater than ninety-five percent (95%) of the total surface area of the particle. In another aspect, the base may comprise no greater than ninety percent (90%) of the total surface area of the particle. In another aspect, the base may comprise no greater than eighty percent (80%) of the total surface area of the particle. In another aspect, the base may comprise no greater than seventy-five percent (75%) of the total surface area of the particle.

Referring to FIG. 11 and FIG. 12, a fifth embodiment of a shaped abrasive grain is shown and is generally designated 1100. As shown, the shaped abrasive grain 1100 may include a body 1101 that is generally pyramid-shaped with a generally triangle-shaped bottom face 1102. Further, the shaped abrasive grain 1100 may be formed with a hole 1104, i.e., an opening, therein.

In a particular aspect, the hole 1104 may define a central axis 1106 that passes through a center of the hole 1104. Further, the shaped abrasive grain 1100 may also define a central axis 1108 that passes through a center of the shaped abrasive grain 1100. It may be appreciated that the hole 1104 may be formed in the shaped abrasive grain 1100 such that the central axis 1106 of the hole 1104 is spaced a distance 1110 above the central axis 1108 of the shaped abrasive grain 1100. As such, a center of mass of the shaped abrasive grain 1100 may be moved below the geometric midpoint of the shaped abrasive grain 1100. Moving the center of mass below the geometric midpoint of the shaped abrasive grain may ensure that the shaped abrasive grain 1100 lands on the same face, e.g., the bottom face 1102, when dropped, or otherwise deposited, onto a backing, such that the shaped abrasive grain has an upright orientation.

In a particular embodiment, the center of mass of is displaced from the geometric midpoint by a distance that is equal to 0.05 the height (h) along a vertical axis of the body 1102 defining a height. In another aspect, the center of mass may be displaced by a distance of at least about 0.1(h). In another aspect, the center of mass may be displaced by a distance of at least about 0.15(h). In another aspect, the center of mass may be displaced by a distance of at least about 0.18(h). In another aspect, the center of mass may be displaced by a distance of at least about 0.2(h). In another aspect, the center of mass may be displaced by a distance of at least about 0.22(h). In another aspect, the center of mass may be displaced by a distance of at least about 0.25(h). In another aspect, the center of mass may be displaced by a distance of at least about 0.27(h). In another aspect, the center of mass may be displaced by a distance of at least about 0.3(h). In another aspect, the center of mass may be displaced by a distance of at least about 0.32(h). In another aspect, the center of mass may be displaced by a distance of at least about 0.35(h). In another aspect, the center of mass may be displaced by a distance of at least about 0.38(h).

In another aspect, the center of mass is displaced a distance no greater than 0.5(h). In yet another aspect, the center of mass is displaced a distance no greater than 0.49(h). In still another aspect, the center of mass is displaced a distance no greater than 0.48(h). In another aspect, the center of mass is displaced a distance no greater than 0.45(h). In still another aspect, the center of mass is displaced a distance no greater than 0.43(h). In yet still another aspect, the center of mass is displaced a distance no greater than 0.40(h). In another aspect, the center of mass is displaced a distance no greater than 0.39(h). In another aspect, the center of mass is displaced a distance no greater than 0.38(h).

Further, the center of mass may be displaced so that the center of mass is closer to a base, e.g., the bottom face 1102, of the body 1101, than a top of the body 1101 when the shaped abrasive grain 1100 is in an upright orientation as shown in FIG. 11.

In another embodiment, the center of mass may be displaced from the geometric midpoint by a distance 1110 that is equal to 0.05 the width (w) along a horizontal axis of the of the body 1102 defining the width. In another aspect, the center of mass may be displaced by a distance of at least about 0.1(w). In another aspect, the center of mass may be displaced by a distance of at least about 0.15(w). In another aspect, the center of mass may be displaced by a distance of at least about 0.18(w). In another aspect, the center of mass may be displaced by a distance of at least about 0.2(w). In another aspect, the center of mass may be displaced by a distance of at least about 0.22(w). In another aspect, the center of mass may be displaced by a distance of at least about 0.25(w). In another aspect, the center of mass may be displaced by a distance of at least about 0.27(w). In another aspect, the center of mass may be displaced by a distance of at least about 0.3(w). In another aspect, the center of mass may be displaced by a distance of at least about 0.32(w). In another aspect, the center of mass may be displaced by a distance of at least about 0.35(w). In another aspect, the center of mass may be displaced by a distance of at least about 0.38(w).

In another aspect, the center of mass is displaced a distance no greater than 0.5(w). In yet another aspect, the center of mass is displaced a distance no greater than 0.49(w). In still another aspect, the center of mass is displaced a distance no greater than 0.48(w). In another aspect, the center of mass is displaced a distance no greater than 0.45(w). In still another aspect, the center of mass is displaced a distance no greater than 0.43(w). In yet still another aspect, the center of mass is displaced a distance no greater than 0.40(w). In another aspect, the center of mass is displaced a distance no greater than 0.39(w). In another aspect, the center of mass is displaced a distance no greater than 0.38(w).

In another embodiment, the center of mass may be displaced from the geometric midpoint by a distance that is equal to 0.05 the length (l) along a longitudinal axis of the body 1102 defining a length. In another aspect, the center of mass may be displaced by a distance of at least about 0.1(l). In another aspect, the center of mass may be displaced by a distance of at least about 0.15(l). In another aspect, the center of mass may be displaced by a distance of at least about 0.18(l). In another aspect, the center of mass may be displaced by a distance of at least about 0.2(l). In another aspect, the center of mass may be displaced by a distance of at least about 0.22(l). In another aspect, the center of mass may be displaced by a distance of at least about 0.25(l). In another aspect, the center of mass may be displaced by a distance of at least about 0.27(l). In another aspect, the center of mass may be displaced by a distance of at least about 0.3(l). In another aspect, the center of mass may be displaced by a distance of at least about 0.32(l). In another aspect, the center of mass may be displaced by a distance of at least about 0.35(l). In another aspect, the center of mass may be displaced by a distance of at least about 0.38(l).

In another aspect, the center of mass is displaced a distance no greater than 0.5(l). In yet another aspect, the center of mass is displaced a distance no greater than 0.49(l). In still another aspect, the center of mass is displaced a distance no greater than 0.48(l). In another aspect, the center of mass is displaced a distance no greater than 0.45(l). In still another aspect, the center of mass is displaced a distance no greater than 0.43(l). In yet still another aspect, the center of mass is displaced a distance no greater than 0.40(l). In another aspect, the center of mass is displaced a distance no greater than 0.39(l). In another aspect, the center of mass is displaced a distance no greater than 0.38(l).

FIG. 13 and FIG. 14 illustrate a sixth embodiment of a shaped abrasive grain that is generally designated 1300. As depicted, the shaped abrasive grain 1300 may include a body 1301 that may include a central portion 1302 that extends along a longitudinal axis 1304. A first radial arm 1306 may extend outwardly from the central portion 1302 along the length of the central portion 1302. A second radial arm 1308 may extend outwardly from the central portion 1302 along the length of the central portion 1302. A third radial arm 1310 may extend outwardly from the central portion 1302 along the length of the central portion 1302. Moreover, a fourth radial arm 1312 may extend outwardly from the central portion 1302 along the length of the central portion 1302. The radial arms 1306, 1308, 1310, 1312 may be equally spaced around the central portion 1302 of the shaped abrasive grain 1300.

As shown in FIG. 13, the first radial arm 1306 may include a generally arrow-shaped distal end 1320. The second radial arm 1308 may include a generally arrow-shaped distal end 1322. The third radial arm 1310 may include a generally arrow-shaped distal end 1324. Further, the fourth radial arm 1312 may include a generally arrow-shaped distal end 1326.

FIG. 13 also indicates that the shaped abrasive grain 1300 may be formed with a first void 1330 between the first radial arm 1306 and the second radial arm 1308. A second void 1332 may be formed between the second radial arm 1308 and the third radial arm 1310. A third void 1334 may also be formed between the third radial arm 1310 and the fourth radial arm 1312. Additionally, a fourth void 1336 may be formed between the fourth radial arm 1312 and the first radial arm 1306.

As shown in FIG. 13, the shaped abrasive grain 1300 may include a length 1340, a height 1342, and a width 1344. In a particular aspect, the length 1340 is greater than the height 1342 and the height 1342 is greater than the width 1344. In a particular aspect, the shaped abrasive grain 1300 may define a primary aspect ratio that is the ratio of the length 1340 to the height 1342 (length:height). Further, the shaped abrasive grain 1300 may define a secondary aspect ratio that is the ratio of the height 1342 to the width 1344 (height:width). Finally, the shaped abrasive grain 1300 may define a tertiary aspect ratio that is the ratio of the length 1340 to the width 1342 (length:width).

In a particular aspect, the primary aspect ratio is at least 1:1. In another aspect, the primary aspect ratio is at least 2:1. In another aspect, the primary aspect ratio is at least 2.5:1. In another aspect, the primary aspect ratio is at least 3:1. In another aspect, the primary aspect ratio is at least 3.5:1. In another aspect, the primary aspect ratio is at least 4:1. In another aspect, the primary aspect ratio is at least 4.5:1. In another aspect, the primary aspect ratio is at least 5:1. In another aspect, the primary aspect ratio is at least 5.5:1. In another aspect, the primary aspect ratio is at least 6:1. In another aspect, the primary aspect ratio is at least 6.5:1. In another aspect, the primary aspect ratio is at least 7:1. In another aspect, the primary aspect ratio is at least 7.5:1. In another aspect, the primary aspect ratio is at least 8:1. In another aspect, the primary aspect ratio is at least 8.5:1. In another aspect, the primary aspect ratio is at least 9:1. In another aspect, the primary aspect ratio is at least 9.5:1. In another aspect, the primary aspect ratio is at least 10:1.

In a particular aspect, the secondary aspect ratio is at least 1:1. In another aspect, the secondary aspect ratio is at least 1.5:1. In another aspect, the secondary aspect ratio is 2:1. In another aspect, the secondary aspect ratio is at least 2.5:1. In another aspect, the secondary aspect ratio is at least 3:1. In another aspect, the secondary aspect ratio is at least 3.5:1. In another aspect, the secondary aspect ratio is at least 4:1. In another aspect, the secondary aspect ratio is at least 4.5:1. In another aspect, the secondary aspect ratio is at least 5:1. In another aspect, the secondary aspect ratio is at least 5.5:1. In another aspect, the secondary aspect ratio is at least 6:1. In another aspect, the secondary aspect ratio is at least 6.5:1. In another aspect, the secondary aspect ratio is at least 7:1. In another aspect, the secondary aspect ratio is at least 7.5:1. In another aspect, the secondary aspect ratio is at least 8:1. In another aspect, the secondary aspect ratio is at least 8.5:1. In another aspect, the secondary aspect ratio is at least 9:1. In another aspect, the secondary aspect ratio is at least 9.5:1. In another aspect, the secondary aspect ratio is at least 10:1.

In a particular aspect, the tertiary aspect ratio is at least 1:1. In another aspect, the tertiary aspect ratio is at least 1.5:1. In another aspect, the tertiary aspect ratio is 2:1. In another aspect, the tertiary aspect ratio is at least 2.5:1. In another aspect, the tertiary aspect ratio is at least 3:1. In another aspect, the tertiary aspect ratio is at least 3.5:1. In another aspect, the tertiary aspect ratio is at least 4:1. In another aspect, the tertiary aspect ratio is at least 4.5:1. In another aspect, the tertiary aspect ratio is at least 5:1. In another aspect, the tertiary aspect ratio is at least 5.5:1. In another aspect, the tertiary aspect ratio is at least 6:1. In another aspect, the tertiary aspect ratio is at least 6.5:1. In another aspect, the tertiary aspect ratio is at least 7:1. In another aspect, the tertiary aspect ratio is at least 7.5:1. In another aspect, the tertiary aspect ratio is at least 8:1. In another aspect, the tertiary aspect ratio is at least 8.5:1. In another aspect, the tertiary aspect ratio is at least 9:1. In another aspect, the tertiary aspect ratio is at least 9.5:1. In another aspect, the tertiary aspect ratio is at least 10:1.

In a particular aspect, the shape of the shaped abrasive grain 1300 with respect to the primary aspect ratio is generally rectangular, e.g., flat, or curved. Moreover, the shape of the shaped abrasive grain 1300 with respect to the secondary aspect ratio may be any polyhedral shape, e.g., a triangle, a square, a rectangle, a pentagon, etc. The shape of the shaped abrasive grain 1300 with respect to the secondary aspect ratio may also be the shape of any alphanumeric character, e.g., 1, 2, 3, etc., A, B, C, etc. Further, the shape of the shaped abrasive grain 1300 with respect to the secondary aspect ratio may be a character selected from the Greek alphabet, the modern Latin alphabet, the ancient Latin alphabet, the Russian alphabet, any other alphabet, or any combination thereof. Further, the shape of the shaped abrasive grain 1300 with respect to the secondary aspect ratio may be a Kanji character.

In another aspect of the shaped abrasive grain 1300, the width 1344 is greater than the height 1342 and the height 1342 is greater than the length 1340. In this aspect, the shaped abrasive grain 1300 may define a primary aspect ratio that is the ratio of the width 1344 to the height 1342 (width:height). Further, the shaped abrasive grain 1300 may define a secondary aspect ratio that is the ratio of the height 1342 to the length 1340 (height:length). Finally, the shaped abrasive grain 1300 may define a tertiary aspect ratio that is the ratio of the width 1342 to the length 1340 (width:length).

In a particular aspect, the primary aspect ratio is at least 2:1. In another aspect, the primary aspect ratio is at least 2.5:1. In another aspect, the primary aspect ratio is at least 3:1. In another aspect, the primary aspect ratio is at least 3.5:1. In another aspect, the primary aspect ratio is at least 4:1. In another aspect, the primary aspect ratio is at least 4.5:1. In another aspect, the primary aspect ratio is at least 5:1. In another aspect, the primary aspect ratio is at least 5.5:1. In another aspect, the primary aspect ratio is at least 6:1. In another aspect, the primary aspect ratio is at least 6.5:1. In another aspect, the primary aspect ratio is at least 7:1. In another aspect, the primary aspect ratio is at least 7.5:1. In another aspect, the primary aspect ratio is at least 8:1. In another aspect, the primary aspect ratio is at least 8.5:1. In another aspect, the primary aspect ratio is at least 9:1. In another aspect, the primary aspect ratio is at least 9.5:1. In another aspect, the primary aspect ratio is at least 10:1.

In a particular aspect, the secondary aspect ratio is at least 1.5:1. In another aspect, the secondary aspect ratio is 2:1. In another aspect, the secondary aspect ratio is at least 2.5:1. In another aspect, the secondary aspect ratio is at least 3:1. In another aspect, the secondary aspect ratio is at least 3.5:1. In another aspect, the secondary aspect ratio is at least 4:1. In another aspect, the secondary aspect ratio is at least 4.5:1. In another aspect, the secondary aspect ratio is at least 5:1. In another aspect, the secondary aspect ratio is at least 5.5:1. In another aspect, the secondary aspect ratio is at least 6:1. In another aspect, the secondary aspect ratio is at least 6.5:1. In another aspect, the secondary aspect ratio is at least 7:1. In another aspect, the secondary aspect ratio is at least 7.5:1. In another aspect, the secondary aspect ratio is at least 8:1. In another aspect, the secondary aspect ratio is at least 8.5:1. In another aspect, the secondary aspect ratio is at least 9:1. In another aspect, the secondary aspect ratio is at least 9.5:1. In another aspect, the secondary aspect ratio is at least 10:1.

In a particular aspect, the tertiary aspect ratio is at least 1.5:1. In another aspect, the tertiary aspect ratio is 2:1. In another aspect, the tertiary aspect ratio is at least 2.5:1. In another aspect, the tertiary aspect ratio is at least 3:1. In another aspect, the tertiary aspect ratio is at least 3.5:1. In another aspect, the tertiary aspect ratio is at least 4:1. In another aspect, the tertiary aspect ratio is at least 4.5:1. In another aspect, the tertiary aspect ratio is at least 5:1. In another aspect, the tertiary aspect ratio is at least 5.5:1. In another aspect, the tertiary aspect ratio is at least 6:1. In another aspect, the tertiary aspect ratio is at least 6.5:1. In another aspect, the tertiary aspect ratio is at least 7:1. In another aspect, the tertiary aspect ratio is at least 7.5:1. In another aspect, the tertiary aspect ratio is at least 8:1. In another aspect, the tertiary aspect ratio is at least 8.5:1. In another aspect, the tertiary aspect ratio is at least 9:1. In another aspect, the tertiary aspect ratio is at least 9.5:1. In another aspect, the tertiary aspect ratio is at least 10:1.

In a particular aspect, the shape of the shaped abrasive grain 1300 with respect to the secondary aspect ratio is generally rectangular, e.g., flat, or curved. Moreover, the shape of the shaped abrasive grain 1300 with respect to the primary aspect ratio may be any polyhedral shape, e.g., a triangle, a square, a rectangle, a pentagon, etc. The shape of the shaped abrasive grain 1300 with respect to the primary aspect ratio may also be the shape of any alphanumeric character, e.g., 1, 2, 3, etc., A, B, C, etc. Further, the shape of the shaped abrasive grain 1300 with respect to the primary aspect ratio may be a character selected from the Greek alphabet, the modern Latin alphabet, the ancient Latin alphabet, the Russian alphabet, any other alphabet, or any combination thereof. Moreover, the shape of the shaped abrasive grain 1300 with respect to the primary aspect ratio may be a Kanji character.

Referring now to FIG. 15 and FIG. 16, a seventh embodiment of a shaped abrasive grain is shown and is generally designated 1500. As shown, the shaped abrasive grain 1500 may include a body 1501 that includes a flat bottom 1502 and a generally dome-shaped top 1504. The domed-shaped top 1504 may be formed with a first edge 1506, a second edge 1508, a third edge 1510, a fourth edge 1512, and a fifth edge 1514. It may be appreciated that the shaped abrasive grain 1500 may include more or less than five edges 1506, 1508, 1510, 1512, 1514. Further, the edges 1506, 1508, 1510, 1512, 1514 may be equally spaced radially around a center of the dome-shaped top 1504.

In a particular aspect, the edges 1506, 1508, 1510, 1512, 1514 in the dome-shaped top 1504 may be formed by injecting the material comprising the shaped abrasive grain 1500 through a generally star-shaped nozzle. It may be appreciated that the shape of the shaped abrasive grain 1500 may facilitate orientation of the shaped abrasive grain 1500 as it is dropped, or otherwise deposited, on a backing. Specifically, the dome-shaped top 1504 will allow the shaped abrasive grain 1500 to roll onto the flat bottom 1502 ensuring that the edges face out, or up, from the backing.

FIG. 17 and FIG. 18 illustrate an eighth embodiment of a shaped abrasive grain, designated 1700. As depicted, the shaped abrasive grain 1700 may include a body 1701 that includes a flat bottom 1702 and a generally dome-shaped top 1704. The domed-shaped top 1704 may be formed with a peak 1706. In a particular aspect, the peak 1706 in the dome-shaped top 1704 may be formed by injecting the material comprising the shaped abrasive grain 1700 through a generally round, generally small nozzle. It may be appreciated that the shape of the shaped abrasive grain 1700 may facilitate orientation of the shaped abrasive grain 1700 as it is dropped, or otherwise deposited, on a backing. Specifically, the dome-shaped top 1704 and the peak 1706 will allow the shaped abrasive grain 1700 to roll onto the flat bottom 1702 ensuring that the peak 1706 and the dome-shaped top 1704 face out, or up, from the backing.

Referring now to FIG. 19 and FIG. 20, a ninth embodiment of a shaped abrasive grain is shown and is generally designated 1900. As shown, the shaped abrasive grain 1900 may include a body 1901 that is generally box-shaped with six exterior faces 1902 and twelve 1904 edges. Further, the shaped abrasive grain 1900 may be formed with a generally X-shaped hole 1906, i.e., an opening, through the shaped abrasive grain 1900 parallel to a longitudinal axis 1908 that passes through a center 1910 of the shaped abrasive grain. Further, a center 1912 of the X shaped hole 1906 may be spaced a distance 1914 from the longitudinal axis 1908. As such, a center of mass 1916 of the shaped abrasive grain 1900 may be moved below the geometric midpoint 1910 of the shaped abrasive grain 1900. Moving the center of mass below the geometric midpoint of the shaped abrasive grain may ensure that the shaped abrasive grain 1900 lands on the same face when dropped, or otherwise deposited, onto a backing.

It may be appreciated that the X shaped hole 1906 may be formed along the longitudinal axis 1908 through the geometric midpoint 1910 of the shaped abrasive grain 1900. Further, it may be appreciated that the X shaped hole 1906 may be rotated forty-five degrees (45°) and in such a case the hole 1906 would appear to be generally + shaped. It may be appreciated that the hole 1906 formed in the shaped abrasive grain 1900 may have any shape: polygonal or otherwise.

FIG. 21 through FIG. 23 depict a tenth embodiment of a shaped abrasive grain that is generally designated 2100. As shown, the shaped abrasive grain 2100 may include a body 2101 that may have a first end face 2102 and a second end face 2104. In a particular aspect, depending on the orientation, the first end face 2102 may be a base surface and the second end face 2104 may be an upper surface. Further, the shaped abrasive grain 2100 may include a first lateral face 2106 extending between the first end face 2102 and the second end face 2104. A second lateral face 2108 may extend between the first end face 2102 and the second end face 2104. Further, a third lateral face 2110 may extend between the first end face 2102 and the second end face 2104. A fourth lateral face 2112 may also extend between the first end face 2102 and the second end face 2104.

As shown, the first end face 2102 and the second end face 2104 are parallel to each other. However, in a particular aspect, the first end face 2102 is rotated with respect to the second end face 2104 to establish a twist angle 2114. In a particular aspect, the twist angle 2114 is at least about one degree. In another aspect, the twist angle 2114 is at least about two degrees. In another aspect, the twist angle 2114 is at least about five degrees. In another aspect, the twist angle 2114 is at least about eight degrees. In another aspect, the twist angle 2114 is at least about ten degrees. In another aspect, the twist angle 2114 is at least about twelve degrees. In another aspect, the twist angle 2114 is at least about fifteen degrees. In another aspect, the twist angle 2114 is at least about eighteen degrees. In another aspect, the twist angle 2114 is at least about twenty degrees. In another aspect, the twist angle 2114 is at least about twenty-five degrees. In another aspect, the twist angle 2114 is at least about thirty degrees. In another aspect, the twist angle 2114 is at least about forty degrees. In another aspect, the twist angle 2114 is at least about fifty degrees. In another aspect, the twist angle 2114 is at least about sixty degrees. In another aspect, the twist angle 2114 is at least about seventy degrees. In another aspect, the twist angle 2114 is at least about eighty degrees. In another aspect, the twist angle 2114 is at least about ninety degrees.

It can be appreciated that the twist angle 2100 of the shaped abrasive grain may be a horizontal twist angle, i.e., along a longitudinal axis of the body 2101 defining a length. In another aspect, the twist angle 2100 of the shaped abrasive grain may be a vertical twist angle, i.e., along a vertical axis defining a height of the body 2101.

Referring to FIG. 24 and FIG. 25, an eleventh embodiment of a shaped abrasive grain is shown and is generally designated 2400. As illustrated, the shaped abrasive grain 2400 may include a body 2401 that may include a central portion 2402 that extends along a longitudinal axis 2404. A first radial arm 2406 may extend outwardly from the central portion 2402 along the length of the central portion 2402. A second radial arm 2408 may extend outwardly from the central portion 2402 along the length of the central portion 2402. A third radial arm 2410 may extend outwardly from the central portion 2402 along the length of the central portion 2402. Moreover, a fourth radial arm 2412 may extend outwardly from the central portion 2402 along the length of the central portion 2402. The radial arms 2406, 2408, 2410, 2412 may be equally spaced around the central portion 2402 of the shaped abrasive grain 2400.

As shown in FIG. 24, the first radial arm 2406 may include a generally box-shaped distal end 2420. The second radial arm 2408 may include a generally box-shaped distal end 2422. The third radial arm 2410 may include a generally box-shaped distal end 2424. Further, the fourth radial arm 2412 may include a generally box-shaped distal end 2426.

FIG. 24 and FIG. 25 further show that the shaped abrasive grain 2400 may be formed with a hole 2428 through the shaped abrasive grain 2400 along the longitudinal axis 2404. As shown, the hole 2428 may be generally triangular in shape. It may be appreciated that in other aspects the hole 2428 formed in the shaped abrasive grain 2400 may have any shape: polygonal or otherwise.

FIG. 26 and FIG. 27 illustrate a twelfth embodiment of a shaped abrasive grain that is generally designated 2600. As shown, the shaped abrasive grain 2600 may include a body 2601 that may include a central portion 2602 that extends along a longitudinal axis 2604. A first radial arm 2606 may extend outwardly from the central portion 2602 along the length of the central portion 2602. A second radial arm 2608 may extend outwardly from the central portion 2602 along the length of the central portion 2602. A third radial arm 2610 may extend outwardly from the central portion 2602 along the length of the central portion 2602. Moreover, a fourth radial arm 2612 may extend outwardly from the central portion 2602 along the length of the central portion 2602. The radial arms 2606, 2608, 2610, 2612 may be equally spaced around the central portion 2602 of the shaped abrasive grain 2600.

As shown in FIG. 26 and FIG. 27, the first radial arm 2606 may include a generally box-shaped distal end 2620 formed with a V-shaped channel 2622. The second radial arm 2608 may include a generally box-shaped distal end 2624 formed with a V-shaped channel 2626. The third radial arm 2610 may also include a generally box-shaped distal end 2628 formed with a V-shaped channel 2630. Further, the fourth radial arm 2612 may include a generally box-shaped distal end 2632 that is also formed with a V shape channel 2634.

Figure 28:
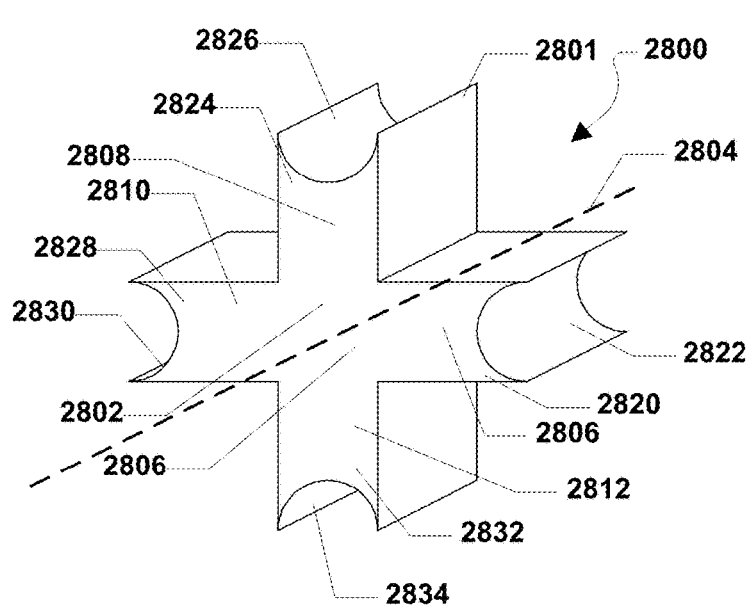
FIG. 28 is a perspective view of a thirteenth embodiment of a shaped abrasive grain.
Figure 29:
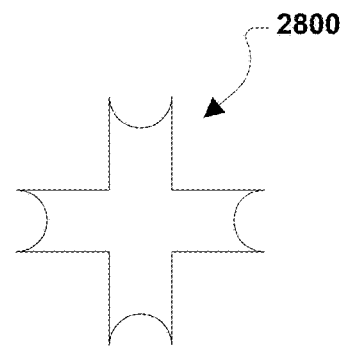
FIG. 29 is a plan view of a second end face of the thirteenth embodiment of a shaped abrasive grain.

FIG. 28 and FIG. 29 illustrate a thirteenth embodiment of a shaped abrasive grain that is generally designated 2800. As shown, the shaped abrasive grain 2800 may include a body 2801 that may include a central portion 2802 that extends along a longitudinal axis 2804. A first radial arm 2806 may extend outwardly from the central portion 2802 along the length of the central portion 2802. A second radial arm 2808 may extend outwardly from the central portion 2802 along the length of the central portion 2802. A third radial arm 2810 may extend outwardly from the central portion 2802 along the length of the central portion 2802. Moreover, a fourth radial arm 2812 may extend outwardly from the central portion 2802 along the length of the central portion 2802. The radial arms 2806, 2808, 2810, 2812 may be equally spaced around the central portion 2802 of the shaped abrasive grain 2800.

As shown in FIG. 28 and FIG. 29, the first radial arm 2806 may include a generally box-shaped distal end 2820 formed with a concave channel 2822. The second radial arm 2808 may include a generally box-shaped distal end 2824 formed with a concave channel 2826. The third radial arm 2810 may also include a generally box-shaped distal end 2828 formed with a concave channel 2830. Further, the fourth radial arm 2812 may include a generally box-shaped distal end 2832 that is also formed with a concave channel 2834.

Figure 30:
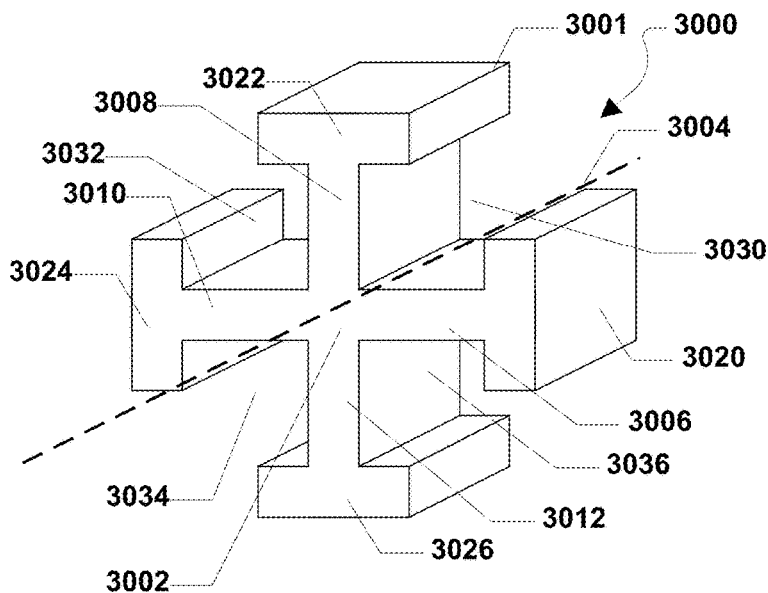
FIG. 30 is a perspective view of a fourteenth embodiment of a shaped abrasive grain.
Figure 31:
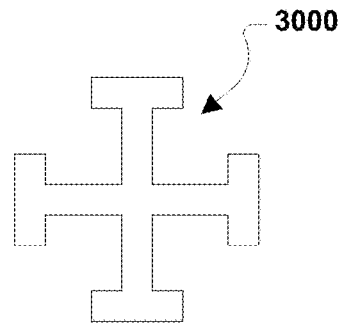
FIG. 31 is a plan view of a second end face of the fourteenth embodiment of a shaped abrasive grain.

FIG. 30 and FIG. 31 illustrate a fourteenth embodiment of a shaped abrasive grain that is generally designated 3000. As depicted, the shaped abrasive grain 3000 may include a body 3001 having a central portion 3002 that extends along a longitudinal axis 3004. A first radial arm 3006 may extend outwardly from the central portion 3002 along the length of the central portion 3002. A second radial arm 3008 may extend outwardly from the central portion 3002 along the length of the central portion 3002. A third radial arm 3010 may extend outwardly from the central portion 3002 along the length of the central portion 3002. Moreover, a fourth radial arm 3012 may extend outwardly from the central portion 3002 along the length of the central portion 3002. The radial arms 3006, 3008, 3010, 3012 may be equally spaced around the central portion 3002 of the shaped abrasive grain 3000.

As shown in FIG. 30, the first radial arm 3006 may include a generally T-shaped distal end 3020. The second radial arm 3008 may include a generally T-shaped distal end 3022. The third radial arm 3010 may include a generally T-shaped distal end 3024. Further, the fourth radial arm 3012 may include a generally T-shaped distal end 3026.

FIG. 30 also indicates that the shaped abrasive grain 3000 may be formed with a first void 3030 between the first radial arm 3006 and the second radial arm 3008. A second void 3032 may be formed between the second radial arm 3008 and the third radial arm 3010. A third void 3034 may also be formed between the third radial arm 3010 and the fourth radial arm 3012. Additionally, a fourth void 3036 may be formed between the fourth radial arm 3012 and the first radial arm 3006.

Figure 32:
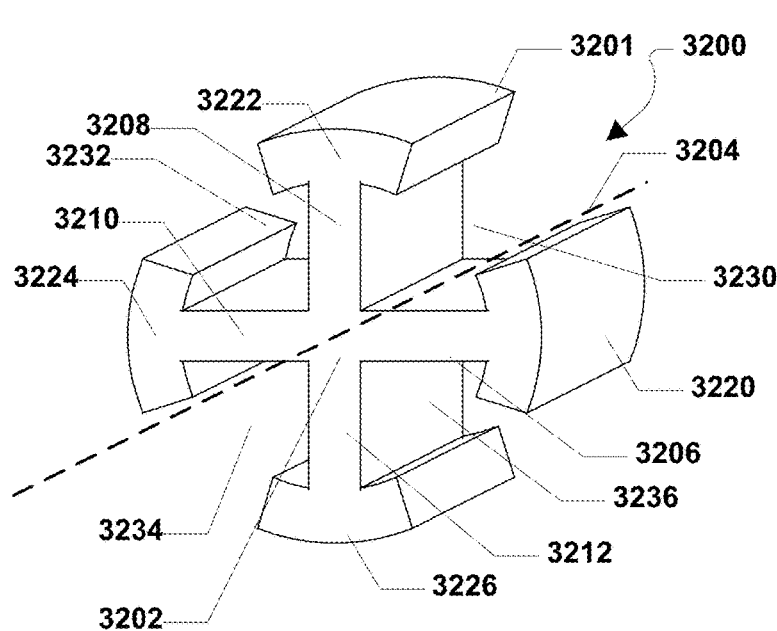
FIG. 32 is a perspective view of a fifteenth embodiment of a shaped abrasive grain.
Figure 33:
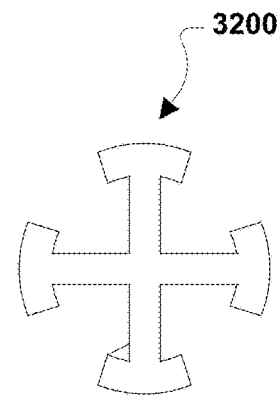
FIG. 33 is a plan view of a second end face of the fifteenth embodiment of a shaped abrasive grain.

FIG. 32 and FIG. 33 illustrate a fifteenth embodiment of a shaped abrasive grain that is generally designated 3200. As depicted, the shaped abrasive grain 3200 may include a body 3201 that may include a central portion 3202 that extends along a longitudinal axis 3204. A first radial arm 3206 may extend outwardly from the central portion 3202 along the length of the central portion 3202. A second radial arm 3208 may extend outwardly from the central portion 3202 along the length of the central portion 3202. A third radial arm 3210 may extend outwardly from the central portion 3202 along the length of the central portion 3202. Moreover, a fourth radial arm 3212 may extend outwardly from the central portion 3202 along the length of the central portion 3202. The radial arms 3206, 3208, 3210, 3212 may be equally spaced around the central portion 3202 of the shaped abrasive grain 3200.

As shown in FIG. 32, the first radial arm 3206 may include a generally rounded T-shaped distal end 3220. The second radial arm 3208 may include a generally rounded T-shaped distal end 3222. The third radial arm 3210 may include a generally rounded T-shaped distal end 3224. Further, the fourth radial arm 3212 may include a generally rounded T-shaped distal end 3226.

FIG. 32 also indicates that the shaped abrasive grain 3200 may be formed with a first void 3230 between the first radial arm 3206 and the second radial arm 3208. A second void 3232 may be formed between the second radial arm 3208 and the third radial arm 3210. A third void 3234 may also be formed between the third radial arm 3210 and the fourth radial arm 3212. Additionally, a fourth void 3236 may be formed between the fourth radial arm 3212 and the first radial arm 3206.

Figure 34:
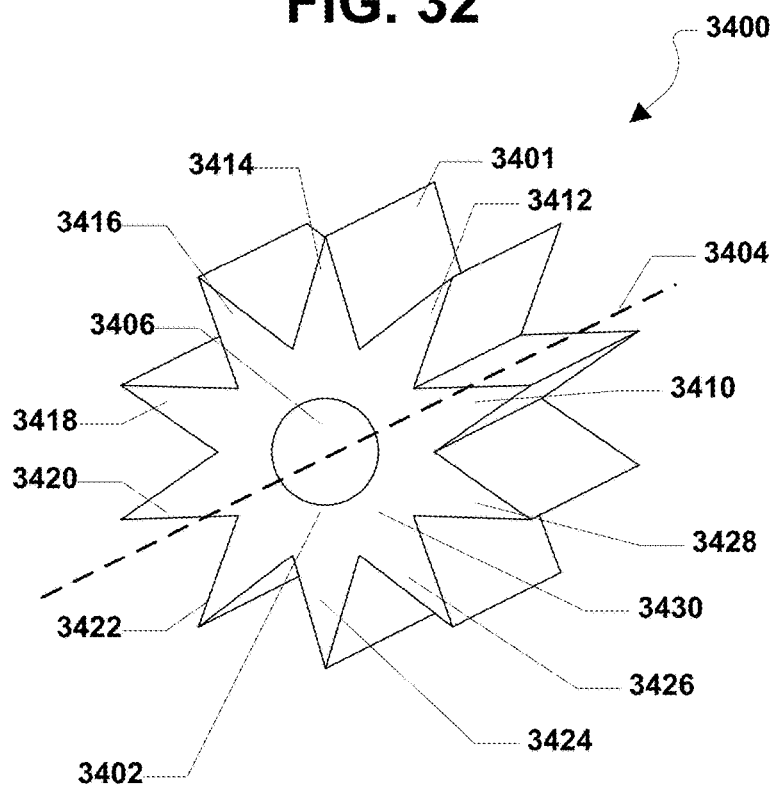
FIG. 34 is a perspective view of a sixteenth embodiment of a shaped abrasive grain.
Figure 35:
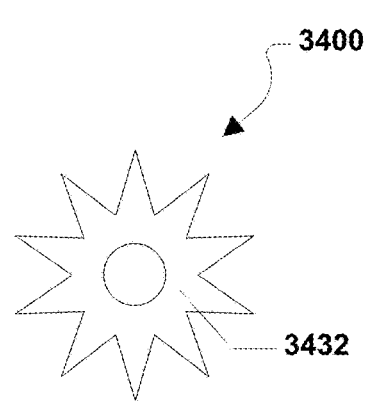
FIG. 35 is a plan view of a second end face of the sixteenth embodiment of a shaped abrasive grain.

FIG. 34 and FIG. 35 illustrate a sixteenth embodiment of a shaped abrasive grain that is generally designated 3400. As depicted, the shaped abrasive grain 3400 may include a body 3401 having a central portion 3402 that extends along a longitudinal axis 3404. The central portion 3402 may be formed with a hole 3406 along the longitudinal axis 3404 along the entire length of the central portion 3402 of the shaped abrasive grain 3400.

A generally triangular first radial arm 3410 may extend outwardly from the central portion 3402 of the shaped abrasive grain 3400 along the length of the central portion 3402. A generally triangular second radial arm 3412 may extend outwardly from the central portion 3402 of the shaped abrasive grain 3400 along the length of the central portion 3402. A generally triangular third radial arm 3414 may extend outwardly from the central portion 3402 of the shaped abrasive grain 3400 along the length of the central portion 3402. A generally triangular fourth radial arm 3416 may extend outwardly from the central portion 3402 of the shaped abrasive grain 3400 along the length of the central portion 3402. Further, a generally triangular fifth radial arm 3418 may extend outwardly from the central portion 3402 of the shaped abrasive grain 3400 along the length of the central portion 3402.

As further depicted in FIG. 34 and FIG. 35, a generally triangular sixth radial arm 3420 may extend outwardly from the central portion 3402 of the shaped abrasive grain 3400 along the length of the central portion 3402. A generally triangular seventh radial arm 3422 may extend outwardly from the central portion 3402 of the shaped abrasive grain 3400 along the length of the central portion 3402. A generally triangular eighth radial arm 3424 may extend outwardly from the central portion 3402 of the shaped abrasive grain 3400 along the length of the central portion 3402. A generally triangular ninth radial arm 3426 may extend outwardly from the central portion 3402 of the shaped abrasive grain 3400 along the length of the central portion 3402. Moreover, a generally triangular tenth radial arm 3428 may extend outwardly from the central portion 3402 of the shaped abrasive grain 3400 along the length of the central portion 3402.

In a particular aspect, the radial arms 3410, 3412, 3414, 3416, 3418, 3420, 3422, 3424, 3426, 3428 may be equally spaced around the central portion 3402 of the shaped abrasive grain to form a generally star-shaped first end face 3430, a generally star-shaped second end face 3432 and a generally star-shaped cross-section taken parallel to the end faces 3430, 3432.

Referring now to FIG. 36 and FIG. 37, a seventeenth embodiment of a shaped abrasive grain is shown and is generally designated 3600. As shown, the shaped abrasive grain 3600 may include a body 3601 having a first end face 3602 and a second end face 3604. In a particular aspect, depending on the orientation, the first end face 3602 may be a base surface and the second end face 3604 may be an upper surface. Further, the shaped abrasive grain 3600 may be formed with a hole 3606 along a longitudinal axis 3608. As shown, the hole 3606 may be generally box shaped.

FIG. 36 and FIG. 37 show that the shaped abrasive grain 3600 may include a generally K-shaped first side face 3610 extending between the first end face 3602 and the second end face 3604. The shaped abrasive grain 3600 may also include a generally K-shaped second side face 3612 extending between the first end face 3602 and the second end face 3604 opposite the generally K-shaped first side face 3610.

As illustrated, the shaped abrasive grain 3600 may include a generally flat third side face 3614 extending between the first K shaped side face 3610 and the second K shaped side face 3612 and between the first end face 3602 and the second end face 3604. The shaped abrasive grain 3600 may also include a generally flat fourth side face 3616 extending between the first K-shaped side face 3610 and the second K shape side face 3612 opposite the generally flat third side face 3614.

FIG. 38 and FIG. 39 depict an eighteenth embodiment of a shaped abrasive grain that is generally designated 3800. As shown, the shaped abrasive grain 3800 may include a body 3801 having a first end face 3802 and a second end face 3804. In a particular aspect, depending on the orientation, the first end face 3802 may be a base surface and the second end face 3804 may be an upper surface. The shaped abrasive grain 3800 may include a generally K-shaped first side face 3806 extending between the first end face 3802 and the second end face 3804. Further, the shaped abrasive grain 3800 may include a generally flat second side face 3808 opposite the generally K-shaped first side face 3806 and extending between the first end face 3802 and the second end face 3804.

As shown, the shaped abrasive grain 3800 may also include a third side face 3810 extending between the first end face 3802 and the second end face 3804 and between the first side face 3806 and the second side face 3808. Further, the shaped abrasive grain 3800 may include a fourth side face 3812 extending between the first end face 3802 and the second end face 3804 opposite the third side face 3810.

FIG. 40 and FIG. 41 show a nineteenth embodiment of a shaped abrasive grain 4000. As shown in FIG. 40 and FIG. 41, the shaped abrasive grain 4000 may include a body 4001 that is generally prismatic with a first end face 4002 and a second end face 4004. In a particular aspect, depending on the orientation, the first end face 4002 may be a base surface and the second end face 4004 may be an upper surface. Further, the shaped abrasive grain 4000 may include a first side face 4010 extending between the first end face 4002 and the second end face 4004. A second side face 4012 may extend between the first end face 4002 and the second end face 4004 adjacent to the first side face 4010. As shown, the shaped abrasive grain 4000 may also include a third side face 4014 extending between the first end face 4002 and the second end face 4004 adjacent to the second side face 4012. Further, the shaped abrasive grain 4000 may include a fourth side face 4016 extending between the first end face 4002 and the second end face 4004 adjacent to the third side face 4014 and the first side face 4010.

As depicted in FIG. 40 and FIG. 41, the shaped abrasive grain 4000 may also include a first edge 4020 between the first side face 4010 and the second side face 4012. The shaped abrasive grain 4000 may also include a second edge 4022 between the second side face 4012 and the third side face 4014. The shaped abrasive grain 4000 may include a third edge 4024 between the third side face 4014 and the fourth side face 4016. Moreover, the shaped abrasive grain 4000 may include a fourth edge 4026 between the fourth side face 4016 and the first side face 4010.

As shown, each end face 4002, 4004 the shaped abrasive grain 4000 may be generally diamond-shaped. Each side face 4010, 4012, 4014, 4016 may be generally rectangular in shape. Further, the cross-section of the shaped abrasive grain 4000 in a plane parallel to the end faces 4002, 4004 is generally diamond-shaped. As shown, the shaped abrasive grain 4000 may also include a hole 4030 formed along a central longitudinal axis 4032. The hole 4030 may pass through the center of the shaped abrasive grain 4000. Alternatively, the hole 4030 may be offset from the center of the shaped abrasive grain 4000 in any direction.

FIG. 42 and FIG. 43 illustrate a twentieth embodiment of a shaped abrasive grain that is generally designated 4200. As shown, the shaped abrasive grain 4200 may include a body 4201 that includes a generally circular first end face 4202 and a generally circular second end face 4204. In a particular aspect, depending on the orientation, the first end face 4202 may be a base surface and the second end face 4204 may be an upper surface. In a particular aspect, a diameter of the second end face 4204 may be larger than a diameter of the first end face 4202.

As shown, the shaped abrasive grain 4200 may include continuous side face 4206 between the first end face 4202 and the second end face 4204. Accordingly, the shaped abrasive grain 4200 is generally frusto-conically shaped. FIG. 42 and FIG. 43 further indicate that the shaped abrasive grain 4200 may include a generally cylindrical hole 4208 formed along a central longitudinal axis 4210.

Figure 44:
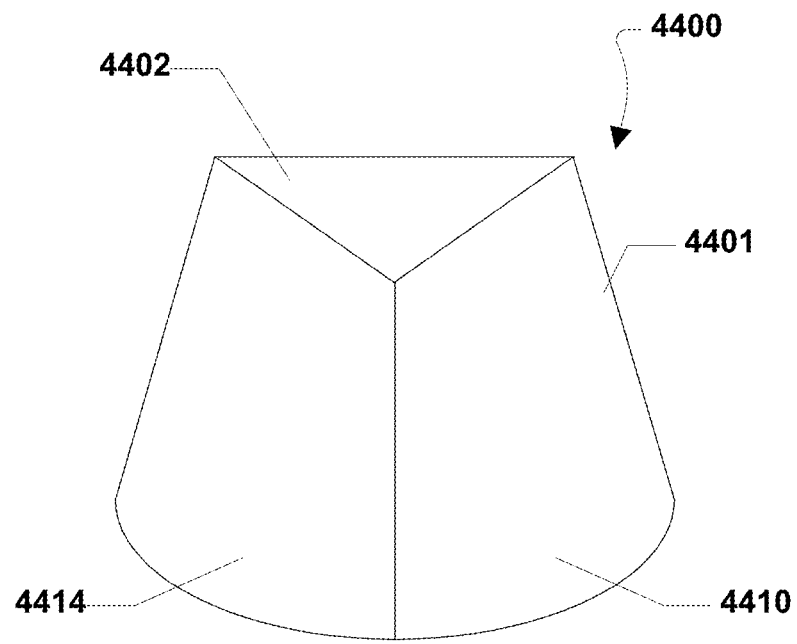
FIG. 44 is a perspective view of a twenty-first embodiment of a shaped abrasive grain.
Figures 45, 46:
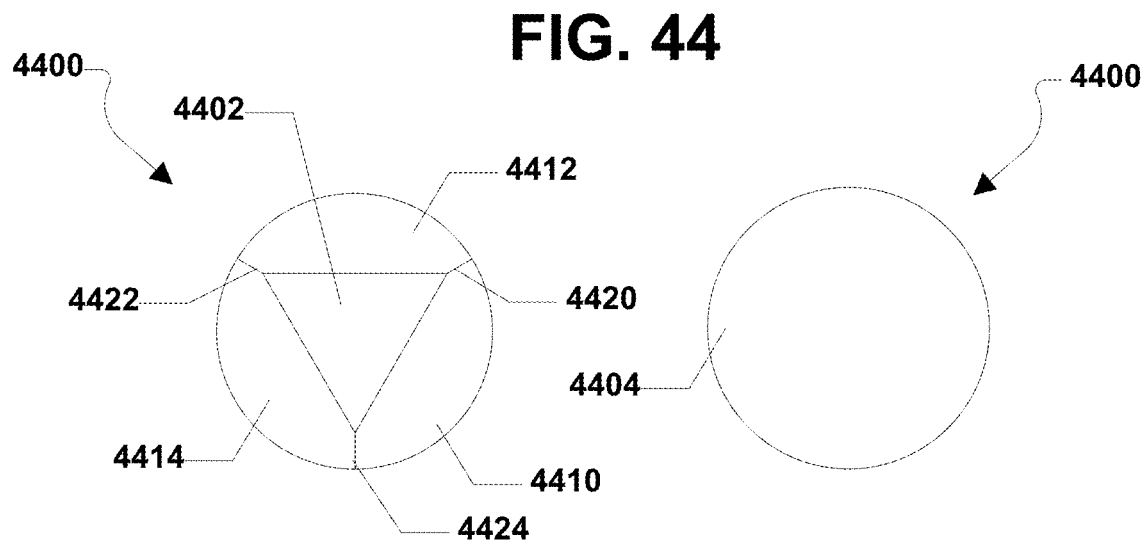
FIG. 45 is a plan view of a first end face of the twenty-first embodiment of a shaped abrasive grain.
FIG. 46 is a plan view of a second end face of the twenty-first embodiment of a shaped abrasive grain.

Referring now to FIG. 44 through FIG. 46, a twenty-first embodiment of a shaped abrasive grain is shown and is generally designated 4400. The shaped abrasive grain 4400 may include a body 4401 that may include a generally triangular first end face 4402 and a generally circular second end face 4404. In a particular aspect, depending on the orientation, the first end face 4402 may be an upper surface and the second end face 4404 may be a base surface.

Further, the shaped abrasive grain 4400 may include a first side face 4410 extending between the first end face 4402 and the second end face 4404. A second side face 4412 may extend between the first end face 4402 and the second end face 4404 adjacent to the first side face 4410. As shown, the shaped abrasive grain 4400 may also include a third side face 4414 extending between the first end face 4402 and the second end face 4404 adjacent to the second side face 4412 and the first side face 4410.

As depicted in FIG. 44 and FIG. 45, the shaped abrasive grain 4400 may also include a first edge 4420 between the first side face 4410 and the second side face 4412. The shaped abrasive grain 4400 may also include a second edge 4422 between the second side face 4412 and the third side face 4414. Further, the shaped abrasive grain 4400 may include a third edge 4424 between the third side face 4414 and the first side face 4412.

Referring now to FIG. 47 through FIG. 49, a twenty-second embodiment of a shaped abrasive grain is shown and is generally designated 4700. The shaped abrasive grain 4700 may include a body 4701 having a generally square first end face 4702 and a generally circular second end face 4704. In a particular aspect, depending on the orientation, the first end face 4702 may be an upper surface and the second end face 4704 may be a base surface.

Further, the shaped abrasive grain 4700 may include a first side face 4710 extending between the first end face 4702 and the second end face 4704. A second side face 4712 may extend between the first end face 4702 and the second end face 4704 adjacent to the first side face 4710. As shown, the shaped abrasive grain 4700 may also include a third side face 4714 extending between the first end face 4702 and the second end face 4704 adjacent to the second side face 4712. The shaped abrasive grain 4700 may also include a fourth side face 4716 adjacent to the third side face 4714 and the first side face 4710.

As depicted in FIG. 47 and FIG. 48, the shaped abrasive grain 4700 may also include a first edge 4720 between the first side face 4710 and the second side face 4712. The shaped abrasive grain 4700 may also include a second edge 4722 between the second side face 4712 and the third side face 4714. Further, the shaped abrasive grain 4700 may include a third edge 4724 between the third side face 4714 and the fourth side face 4716. Also, the shaped abrasive grain 4700 may include a fourth edge 4726 between the fourth side face 4716 and the first side face 4710.

Figure 50:
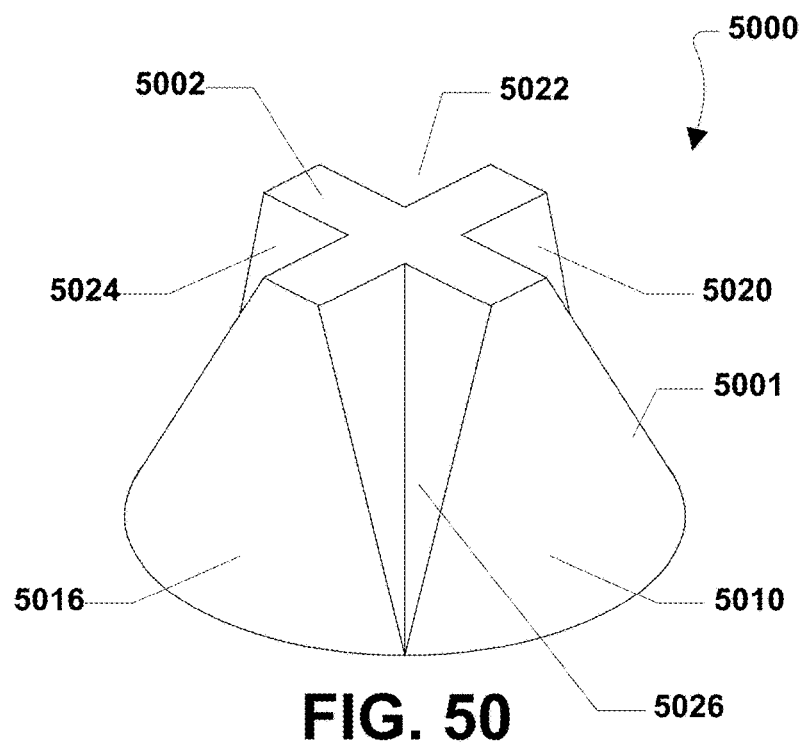
FIG. 50 is a perspective view of a twenty-third embodiment of a shaped abrasive grain.
Figures 51, 52:
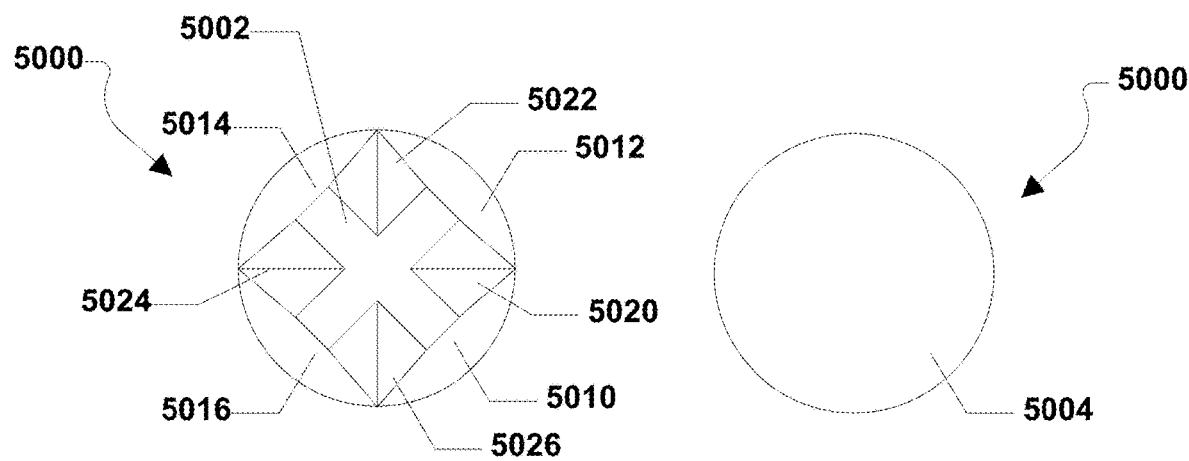
FIG. 51 is a plan view of a first end face of the twenty-third embodiment of a shaped abrasive grain.
FIG. 52 is a plan view of a second end face of the twenty-third embodiment of a shaped abrasive grain.

FIG. 50 through FIG. 52 show a twenty-third embodiment of a shaped abrasive grain that is generally designated 5000. The shaped abrasive grain 5000 may include a body 5001 having a generally plus (+) shaped first end face 5002 and a generally circular second end face 5004. In a particular aspect, depending on the orientation, the first end face 5002 may be an upper surface and the second end face 5004 may be a base surface.

Further, the shaped abrasive grain 5000 may include a first side face 5010 extending between the first end face 5002 and the second end face 5004. A second side face 5012 may extend between the first end face 5002 and the second end face 5004 adjacent to the first side face 5010. As shown, the shaped abrasive grain 5000 may also include a third side face 5014 extending between the first end face 5002 and the second end face 5004 adjacent to the second side face 5012. The shaped abrasive grain 5000 may also include a fourth side face 5016 adjacent to the third side face 5014 and the first side face 5010.

As depicted in FIG. 50 and FIG. 51, the shaped abrasive grain 5000 may also include a first void 5020 between the first side face 5010 and the second side face 5012. The shaped abrasive grain 5000 may also include a second void 5022 between the second side face 5012 and the third side face 5014. Further, the shaped abrasive grain 5000 may include a third void 5024 between the third side face 5014 and the fourth side face 5016. Also, the shaped abrasive grain 5000 may include a fourth void 5026 between the fourth side face 5016 and the first side face 5010.

Figure 53:
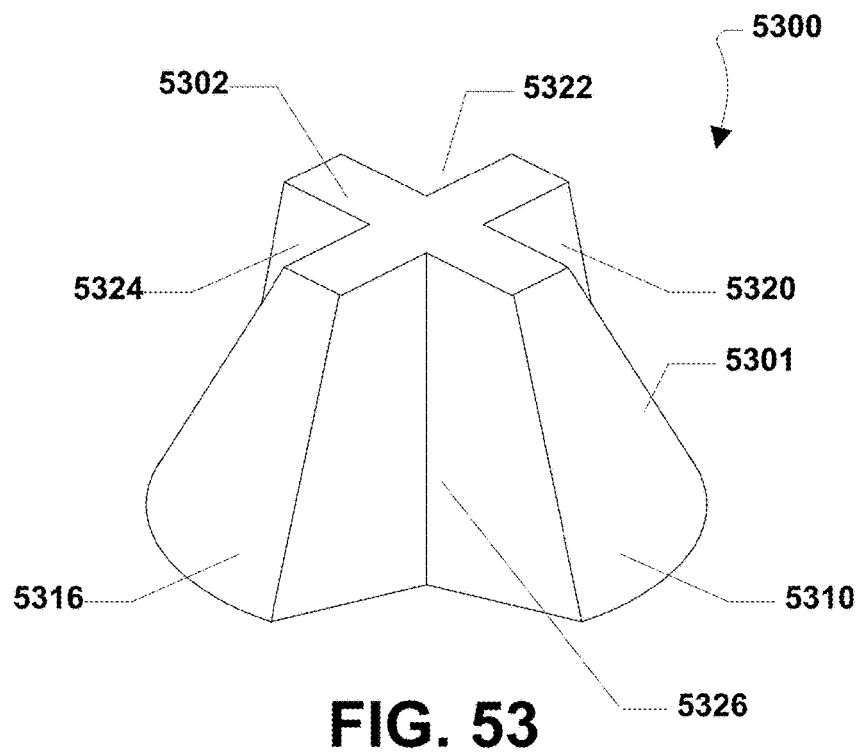
FIG. 53 is a perspective view of a twenty-fourth embodiment of a shaped abrasive grain.
Figures 54, 55:
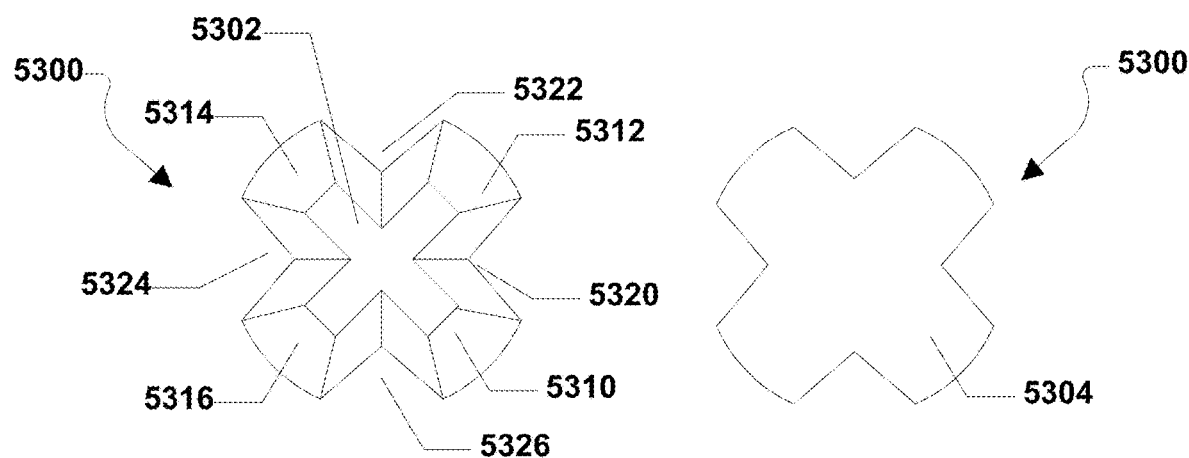
FIG. 54 is a plan view of a first end face of the twenty-fourth embodiment of a shaped abrasive grain.
FIG. 55 is a plan view of a second end face of the twenty-fourth embodiment of a shaped abrasive grain.

FIG. 53 through FIG. 55 show a twenty-fourth embodiment of a shaped abrasive grain that is generally designated 5300. The shaped abrasive grain 5300 may include a body 5301 having a generally plus (+) shaped first end face 5302 and a generally rounded plus (+) shaped end face 5304. In a particular aspect, depending on the orientation, the first end face 5302 may be an upper surface and the second end face 5304 may be a base surface.

As shown, the shaped abrasive grain 5300 may include a first side face 5310 extending between the first end face 5302 and the second end face 5304. A second side face 5312 may extend between the first end face 5302 and the second end face 5304 adjacent to the first side face 5310. As shown, the shaped abrasive grain 5300 may also include a third side face 5314 extending between the first end face 5302 and the second end face 5304 adjacent to the second side face 5312. The shaped abrasive grain 5300 may also include a fourth side face 5316 adjacent to the third side face 5314 and the first side face 5310.

As depicted in FIG. 53 through FIG. 55, the shaped abrasive grain 5300 may also include a first void 5320 between the first side face 5310 and the second side face 5312. The shaped abrasive grain 5300 may also include a second void 5322 between the second side face 5312 and the third side face 5314. Further, the shaped abrasive grain 5300 may include a third void 5324 between the third side face 5314 and the fourth side face 5316. Also, the shaped abrasive grain 5300 may include a fourth void 5326 between the fourth side face 5316 and the first side face 5310.

Referring now to FIG. 56 through FIG. 58, a twenty-fifth embodiment of a shaped abrasive grain is shown and is generally designated 5600. The shaped abrasive grain 5600 may include a body 5601 having a generally circular first end face 5602 and a generally triangular second end face 5604. The second end face 5604 is relatively larger than the first end face 5602. In a particular aspect, depending on the orientation, the first end face 5602 may be an upper surface and the second end face 5604 may be a base surface.

As depicted, the shaped abrasive grain 5600 may include a first side face 5610 extending between the first end face 5602 and the second end face 5604. A second side face 5612 may extend between the first end face 5602 and the second end face 5604 adjacent to the first side face 5610. As shown, the shaped abrasive grain 5600 may also include a third side face 5614 extending between the first end face 5602 and the second end face 5604 adjacent to the second side face 5612 and the first side face 5610.

As shown in FIG. 56 through FIG. 58, the shaped abrasive grain 5600 may also include a first edge 5620 between the first side face 5610 and the second side face 5612. The shaped abrasive grain 5600 may also include a second edge 5622 between the second side face 5612 and the third side face 5614. Further, the shaped abrasive grain 5600 may include a third edge 5624 between the third side face 5614 and the first side face 5612.

Referring to FIG. 59 through FIG. 61, a twenty-sixth embodiment of a shaped abrasive grain is shown and is generally designated 5900. The shaped abrasive grain 5900 may include a body 5901 having a generally circular first end face 5902 and a generally square second end face 5904. In a particular aspect, the second end face 5904 is relatively larger than the first end face 5902. In a particular aspect, depending on the orientation, the first end face 5902 may be an upper surface and the second end face 5904 may be a base surface.

Further, the shaped abrasive grain 5900 may include a first side face 5910 extending between the first end face 5902 and the second end face 5904. A second side face 5912 may extend between the first end face 5902 and the second end face 5904 adjacent to the first side face 5910. As shown, the shaped abrasive grain 5900 may also include a third side face 5914 extending between the first end face 5902 and the second end face 5904 adjacent to the second side face 5912. The shaped abrasive grain 5900 may also include a fourth side face 5916 adjacent to the third side face 5914 and the first side face 5910.

As depicted in FIG. 59 through FIG. 61, the shaped abrasive grain 5900 may also include a first edge 5920 between the first side face 5910 and the second side face 5912. The shaped abrasive grain 5900 may also include a second edge 5922 between the second side face 5912 and the third side face 5914. Further, the shaped abrasive grain 5900 may include a third edge 5924 between the third side face 5914 and the fourth side face 5916. Also, the shaped abrasive grain 5900 may include a fourth edge 5926 between the fourth side face 5916 and the first side face 5910.

One or more of the shaped abrasive grains described herein are configured to land in an upright orientation when deposited onto a backing. Further, one or more of the embodiments described herein may provide a relatively high aspect ratio associated with a particular length:height ratio, height:width ratio, length:width ratio, width:height ratio, height:length ratio, width:length ratio, or a combination thereof. A high aspect ratio enables the manufacture of a coated abrasive structure having an open coat, i.e., the distance between adjacent shaped abrasive grains may be increased. Further, the open coat provides greater space for chip clearance and may lower power consumption by making a better cut, or grind.

Moreover, in bonded abrasive and thin wheel applications shaped abrasive grains having high aspect ratios with sharp edges allows the manufacture of grinding wheels having greater porosity. Greater porosity provides more space for swarf and chip clearance and may enable more coolant to flow through the grinding wheel to provide greater efficiency.

Figure 62A:
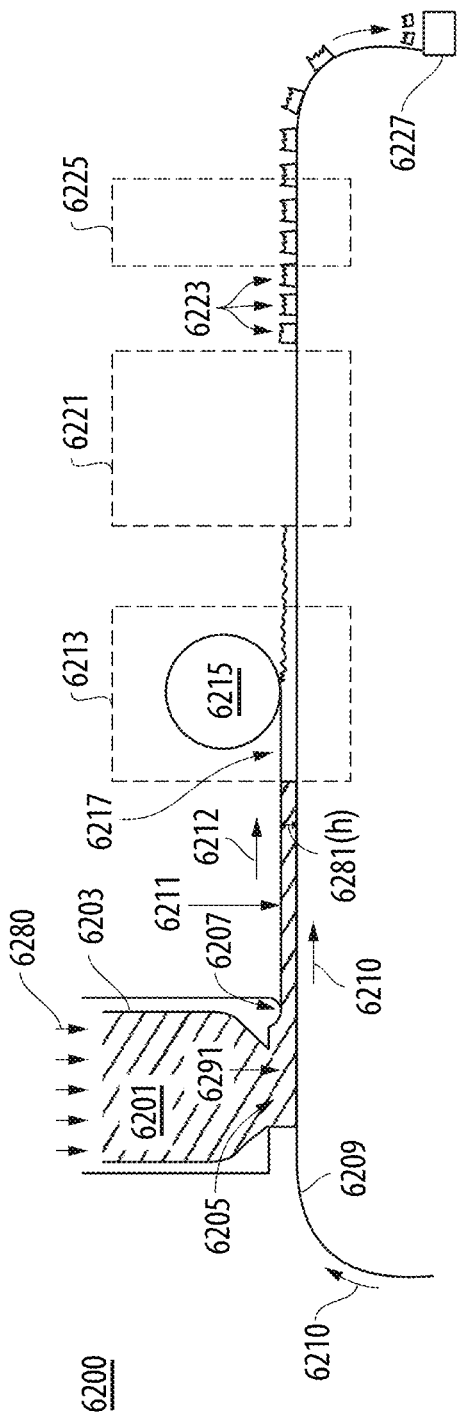
FIGS. 62A and B include illustrations of a system for forming shaped abrasive particles in accordance with an embodiment.

FIGS. 62A and B include illustrations of a system for forming shaped abrasive particles in accordance with an embodiment. The process of forming shaped abrasive particles can be initiated by forming a mixture 6201 including a ceramic material and a liquid. In particular, the mixture 6201 can be a gel formed of a ceramic powder material and a liquid, wherein the gel can be characterized as a shape-stable material having the ability to hold a given shape even in the green (i.e., unfired) state. In accordance with an embodiment, the gel can include a powder material that is an integrated network of discrete particles.

The mixture 6201 can be formed to have a particular content of solid material, such as the ceramic powder material. For example, in one embodiment, the mixture 6201 can have a solids content of at least about 25 wt %, such as at least about 35 wt %, at least about 38 wt %, or even at least about 42 wt % for the total weight of the mixture 6201. Still, in at least one non-limiting embodiment, the solid content of the mixture 6201 can be not greater than about 75 wt %, such as not greater than about 70 wt %, not greater than about 65 wt %, or even not greater than about 55 wt %. It will be appreciated that the content of the solids materials in the mixture 6201 can be within a range between any of the minimum and maximum percentages noted above.

According to one embodiment, the ceramic powder material can include an oxide, a nitride, a carbide, a boride, an oxycarbide, an oxynitride, and a combination thereof. In particular instances, the ceramic material can include alumina. More specifically, the ceramic material may include a boehmite material, which may be a precursor of alpha alumina. The term "boehmite" is generally used herein to denote alumina hydrates including mineral boehmite, typically being Al2O3·H2O and having a water content on the order of 15%, as well as psuedoboehmite, having a water content higher than 15%, such as 20-38% by weight. It is noted that boehmite (including psuedoboehmite) has a particular and identifiable crystal structure, and accordingly unique X-ray diffraction pattern, and as such, is distinguished from other aluminous materials including other hydrated aluminas such as ATH (aluminum trihydroxide) a common precursor material used herein for the fabrication of boehmite particulate materials.

Furthermore, the mixture 6201 can be formed to have a particular content of liquid material. Some suitable liquids may include organic materials, such as water. In accordance with one embodiment, the mixture 6201 can be formed to have a liquid content less than the solids content of the mixture 6201. In more particular instances, the mixture 6201 can have a liquid content of at least about 25 wt % for the total weight of the mixture 6201. In other instances, the amount of liquid within the mixture 6201 can be greater, such as at least about 35 wt %, at least about 45 wt %, at least about 50 wt %, or even at least about 58 wt %. Still, in at least one non-limiting embodiment, the liquid content of the mixture can be not greater than about 75 wt %, such as not greater than about 70 wt %, not greater than about 65 wt %, not greater than about 60 wt %, or even not greater than about 55 wt %. It will be appreciated that the content of the liquid in the mixture 6201 can be within a range between any of the minimum and maximum percentages noted above.

Furthermore, to facilitate processing and forming shaped abrasive particles according to embodiments herein, the mixture 6201 can have a particular storage modulus. For example, the mixture 6201 can have a storage modulus of at least about $1\times10^4$ Pa, such as at least about $4\times10^4$ Pa, or even at least about $5\times10^4$ Pa. However, in at least one non-limiting embodiment, the mixture 6201 may have a storage modulus of not greater than about $1\times10^7$ Pa, such as not greater than about $1\times10^6$ Pa. It will be appreciated that the storage modulus of the mixture 6201 can be within a range between any of the minimum and maximum values noted above. The storage modulus can be measured via a parallel plate system using ARES or AR-G2 rotational rheometers, with Peltier plate temperature control systems. For testing, the mixture 6201 can be extruded within a gap between two plates that are set to be approximately 8 mm apart from each other. After extruding the get into the gap, the distance between the two plates defining the gap is reduced to 2 mm until the mixture 6201 completely fills the gap between the plates. After wiping away excess mixture, the gap is decreased by 0.1 mm and the test is initiated. The test is an oscillation strain sweep test conducted with instrument settings of a strain range between 0.1% to 100%, at 6.28 rad/s (1 Hz), using 25-mm parallel plate and recording 10 points per decade. Within 1 hour after the test completes, lower the gap again by 0.1 mm and repeat the test. The test can be repeated at least 6 times. The first test may differ from the second and third tests. Only the results from the second and third tests for each specimen should be reported.

Furthermore, to facilitate processing and forming shaped abrasive particles according to embodiments herein, the mixture 6201 can have a particular viscosity. For example, the mixture 6201 can have a viscosity of at least about $4\times10^3$ Pa s, at least about $5\times10^3$ Pa s, at least about $6\times10^3$ Pa s, at least about $8\times10^3$ Pa s, at least about $10\times10^3$ Pa s, at least about $20\times10^3$ Pa s, at least about $30\times10^3$ Pa s, at least about $40\times10^3$ Pa s, at least about $50\times10^3$ Pa s, at least about $60\times10^3$ Pa s, or even at least about $65\times10^3$ Pa s. In at least one non-limiting embodiment, the mixture 6201 may have a viscosity of not greater than about $1\times10^6$ Pa s, not greater than about $5\times10^5$ Pa s, not greater than about $3\times10^5$ Pa s, or even not greater than about $2\times10^5$ Pa s. It will be appreciated that the viscosity of the mixture 6201 can be within a range between any of the minimum and maximum values noted above. The viscosity can be calculated by dividing the storage modulus value by 6.28 s−1.

Moreover, the mixture 6201 can be formed to have a particular content of organic materials, including for example, organic additives that can be distinct from the liquid, to facilitate processing and formation of shaped abrasive particles according to the embodiments herein. Some suitable organic additives can include stabilizers, binders, such as fructose, sucrose, lactose, glucose, UV curable resins, and the like.

Notably, the embodiments herein may utilize a mixture 6201 that is distinct from slurries used in conventional tape casting operations. For example, the content of organic materials within the mixture 6201, particularly, any of the organic additives noted above may be a minor amount as compared to other components within the mixture 6201. In at least one embodiment, the mixture 6201 can be formed to have not greater than about 30 wt % organic material for the total weight of the mixture 6201. In other instances, the amount of organic materials may be less, such as not greater than about 15 wt %, not greater than about 10 wt %, or even not greater than about 5 wt %. Still, in at least one non-limiting embodiment, the amount of organic materials within the mixture 6201 can be at least about 0.1 wt %, such as at least about 0.5 wt % for the total weight of the mixture 6201. It will be appreciated that the amount of organic materials in the mixture 6201 can be within a range between any of the minimum and maximum values noted above.

Moreover, the mixture 6201 can be formed to have a particular content of acid or base distinct from the liquid, to facilitate processing and formation of shaped abrasive particles according to the embodiments herein. Some suitable acids or bases can include nitric acid, sulfuric acid, citric acid, chloric acid, tartaric acid, phosphoric acid, ammonium nitrate, ammonium citrate. According to one particular embodiment, the mixture 6201 can have a pH of less than about 5, and more particularly, within a range between about 2 and about 4, using a nitric acid additive.

Figure 62B:
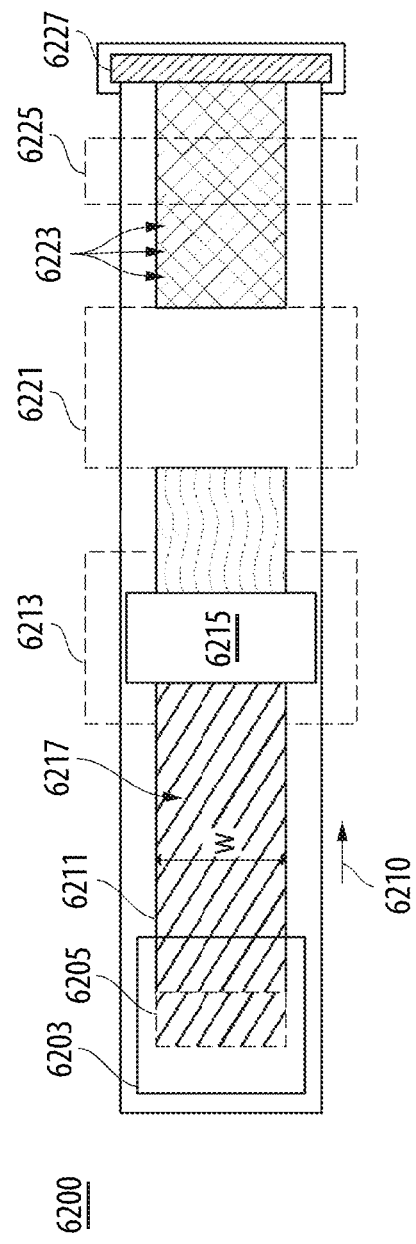

Referencing FIG. 62, the system 6200 can include a die 6203. As illustrated, the mixture 6201 can be provided within the interior of the die 6203 and configured to be extruded through a die opening 6205 positioned at one end of the die 6203. As further illustrated, forming can include applying a force 6280 (that may be translated into a pressure) on the mixture 6201 to facilitate moving the mixture 6201 through the die opening 6205. In accordance with an embodiment, a particular pressure may be utilized during extrusion. For example, the pressure can be at least about 10 kPa, such as at least about 500 kPa. Still, in at least one non-limiting embodiment, the pressure utilized during extrusion can be not greater than about 4 MPa. It will be appreciated that the pressure used to extrude the mixture 6201 can be within a range between any of the minimum and maximum values noted above.

In certain systems, the die 6203 can include a die opening 6205 having a particular shape. It will be appreciated that the die opening 6205 may be shaped to impart a particular shape to the mixture 6201 during extrusion. In accordance with an embodiment, the die opening 6205 can have a rectangular shape. Furthermore, the mixture 6201 extruded through the die opening 6205 can have essentially the same cross-sectional shape as the die opening 6205. As further illustrated, the mixture 6201 may be extruded in the form of a sheet 6211 and onto a belt 6209 underlying the die 6203. In specific instances, the mixture 6201 can be extruded in the form of a sheet 6211 directly onto the belt 6209, which may facilitate continuous processing.

According to one particular embodiment, the belt can be formed to have a film overlying a substrate, wherein the film can be a discrete and separate layer of material configured to facilitate processing and forming of shaped abrasive particles. The process can include providing the mixture 6201 directly onto the film of the belt to form the sheet 6211. In certain instances, the film can include a polymer material, such as polyester. In at least one particular embodiment, the film can consist essentially of polyester.

In some embodiments, the belt 6209 can be translated while moving the mixture 6201 through the die opening 6205. As illustrated in the system 6200, the mixture 6201 may be extruded in a direction 6291. The direction of translation 6210 of the belt 6209 can be angled relative to the direction of extrusion 6291 of the mixture. While the angle between the direction of translation 6210 and the direction of extrusion 6291 are illustrated as substantially orthogonal in the system 6200, other angles are contemplated, including for example, an acute angle or an obtuse angle. The belt 6209 may be translated at a particular rate to facilitate processing. For example, the belt 6209 may be translated at a rate of at least about 3 cm/s, such as at least about 4 cm/s, at least about 6 cm/s, at least about 8 cm/s, or even at least about 10 cm/s. Still, in at least one non-limiting embodiment, the belt 6209 may be translated in a direction 6210 at a rate of not greater than about 5 m/s, such as not greater than about 1 m/s, or even not greater than about 0.5 m/s. It will be appreciated that the belt 6209 may be translated at a rate within a range between any of the minimum and maximum values noted above.

For certain processes according to embodiments herein, the rate of translation of the belt 6209 as compared to the rate of extrusion of the mixture 6201 in the direction 6291 may be controlled to facilitate proper processing. For example, the rate of translation of the belt 6209 can be essentially the same as the rate of extrusion to ensure formation of a suitable sheet 6211.

After the mixture 6201 is extruded through the die opening 6205, the mixture 6201 may be translated along the belt 6209 under a knife edge 6207 attached to a surface of the die 6203. The knife edge 6207 may facilitate forming a sheet 6211. More particularly, the opening defined between the surface of the knife edge 6207 and belt 6209 may define particular dimensions of the extruded mixture 6201. For certain embodiments, the mixture 6201 may be extruded in the form of a sheet 6211 having a generally rectangular cross-sectional shape as viewed in a plane defined by a height and width of the sheet 6211. While the extrudate is illustrated as a sheet, other shapes can be extruded, including for example cylindrical shapes and the like.

The process of forming the sheet 6211 from the mixture 6201 can include control of particular features and process parameters to facilitate suitable formation of shaped abrasive particles having one or more features as provided in the embodiments herein. For example, in certain instances, the process of forming a sheet 6211 from the mixture 6201 can include forming a sheet 6211 having a particular height 6281 controlled in part by a distance between the knife edge 6207 and a surface of the belt 6209. Moreover, it is noted that the height 6281 of the sheet 6211 can be controlled by varying a distance between the knife edge 6207 and the surface of the belt 6209. Additionally, forming the mixture 6201 into the sheet 6211 can include controlling the dimensions of the sheet 6211 based in part upon the viscosity of the mixture 6201. In particular, forming the sheet 6211 can include adjusting the height 6281 of the sheet 6211 based on the viscosity of the mixture 6201.

The sheet 6211 can have particular dimensions, including for example a length (l), a width (w), and a height (h). In accordance with an embodiment, the sheet 6211 may have a length that extends in the direction of the translating belt 6209, which can be greater than the width, wherein the width of the sheet 6211 is a dimension extending in a direction perpendicular to the length of the belt 6209 and to the length of the sheet. The sheet 6211 can have a height 6281, wherein the length and width are greater than the height 6281 of the sheet 6211.

Notably, the height 6281 of the sheet 6211 can be the dimension extending vertically from the surface of the belt 6209. In accordance with an embodiment, the sheet 6211 can be formed to have a particular dimension of height 6281, wherein the height may be an average height of the sheet 6211 derived from multiple measurements. For example, the height 6281 of the sheet 6211 can be at least about 0.1 mm, such as at least about 0.5 mm. In other instances, the height

6281 of the sheet 6211 can be greater, such as at least about 0.8 mm, at least about 1 mm, at least about 1.2 mm, at least about 1.6 mm, or even at least about 2 mm. Still, in one non-limiting embodiment, the height 6281 of the sheet 6211 may be not greater than about 10 mm, not greater than about 5 mm, or even not greater than about 2 mm. It will be appreciated that the sheet 6211 may have an average height within a range between any of the minimum and maximum values noted above.

According to one embodiment, the sheet 6211 can have a length (l), a width (w), and a height (h), wherein the length≥width≥height. Moreover, the sheet 6211 can have a secondary aspect ratio of length:height of at least about 10, such as at least about 100, at least about 1000, or even at least about 1000.

After extruding the mixture 6201 from the die 6203, the sheet 6211 may be translated in a direction 6212 along the surface of the belt 6209. Translation of the sheet 6211 along the belt 6209 may facilitate further processing to form precursor-shaped abrasive particles. For example, the sheet 6211 may undergo a shaping process within the shaping zone 6213. In particular instances, the process of shaping can include shaping a surface of the sheet 6211, including for example, an upper major surface 6217 of the sheet 6211, which may be completed using a shaping article 6215. In other embodiments, other major surfaces of the sheet may undergo shaping, including for example, the bottom surface or side surfaces. For certain processes, shaping can include altering a contour of the sheet through one or more processes, such as, embossing, rolling, cutting, engraving, patterning, stretching, twisting, and a combination thereof.

In accordance with an embodiment, the process of forming a shaped abrasive particle can further include translation of the sheet along the belt 6209 through a forming zone 6221. In accordance with an embodiment, the process of forming a shaped abrasive particle can include sectioning the sheet 6211 to form precursor shaped abrasive particles 6223. For example, in certain instances, forming can include perforating a portion of the sheet 6211. In other instances, the process of forming can include patterning the sheet 6211 to form a patterned sheet and extracting shapes from the patterned sheet.

Particular processes of forming can include cutting, pressing, punching, crushing, rolling, twisting, bending, drying, and a combination thereof. In one embodiment, the process of forming can include sectioning of the sheet 6211. Sectioning of the sheet 6211 can include the use of at least one mechanical object, which may be in the form of a gas, liquid, or solid material. The process of sectioning can include at least one or a combination of cutting, pressing, punching, crushing, rolling, twisting, bending, and drying. Moreover, it will be appreciated that sectioning can include perforating or creating a partial opening through a portion of the sheet 6211, which may not extend through the entire height of the sheet 6211. In one embodiment, sectioning of the sheet 6211 can include use of a mechanical object including one or a plurality of a blade, a wire, a disc, and a combination thereof.

The process of sectioning can create different types of shaped abrasive particles in a single sectioning process. Different types of shaped abrasive particles can be formed from the same processes of the embodiments herein. Different types of shaped abrasive particles include a first type of shaped abrasive particle having a first two-dimensional shape and a second type of shaped abrasive particle having a different two-dimensional shape as compared to the first two-dimensional shape. Furthermore, different types of shaped abrasive particles may differ from each other in size. For example, different types of shaped abrasive particles may have different volumes as compared to each other. A single process which is capable of forming different types of shaped abrasive particles may be particularly suited for producing certain types of abrasive articles.

Sectioning can include moving the mechanical object through a portion of a sheet 6211 and creating an opening within the sheet 6211. In particular, the sheet can be formed to have an opening extending into the volume of the sheet and defined by certain surfaces. The opening can define a cut extending through at least a fraction of the entire height of sheet. It will be appreciated that the opening does not necessarily need to extend through the full height of the sheet. In certain instances, the method of sectioning can include maintaining the opening in the sheet. Maintaining the opening after sectioning the sheet has been sectioned by a mechanical object may facilitate suitable formation of shaped abrasive particles and features of shaped abrasive particles and features of a batch of shaped abrasive particles. Maintaining the opening can include at least partially drying at least one surface of the sheet defining the opening. The process of at least partially drying can include directing a drying material at the opening. A drying material may include a liquid, a solid, or even a gas. According to one particular embodiment, the drying material can include air. Controlled drying may facilitate the formation of shaped abrasive particles according to embodiments herein.

In certain instances, the process of sectioning can be conducted prior to sufficient drying of the sheet. For example, sectioning can be conducted prior to volatilization of not greater than about 20% of the liquid from the sheet as compared to the original liquid content of the sheet during initial formation of the sheet. In other embodiments, the amount of volatilization allowed to occur before or during sectioning can be less, such as, not greater than about 15%, not greater than about 12%, not greater than about 10%, not greater than about 8%, or even not greater than about 4% of the original liquid content of the sheet.

Referring again to FIGS. 62A and 62B, after forming precursor-shaped abrasive particles 6223, the particles may be translated through a post-forming zone 6225. Various processes may be conducted in the post-forming zone 6225, including for example, heating, curing, vibration, impregnation, doping, and a combination thereof.

In one embodiment, the post-forming zone 6225 includes a heating process, wherein the precursor-shaped abrasive particles 6223 may be dried. Drying may include removal of a particular content of material, including volatiles, such as water. In accordance with an embodiment, the drying process can be conducted at a drying temperature of not greater than 300° C. such as not greater than 280° C. or even not greater than about 250° C. Still, in one non-limiting embodiment, the drying process may be conducted at a drying temperature of at least 50° C. It will be appreciated that the drying temperature may be within a range between any of the minimum and maximum temperatures noted above.

Furthermore, the precursor-shaped abrasive particles 6223 may be translated through a post-forming zone at a particular rate, such as at least about 0.2 feet/min and not greater than about 8 feet/min. Furthermore, the drying process may be conducted for a particular duration. For example, the drying process may be not greater than about six hours.

After the precursor-shaped abrasive particles 6223 are translated through the post-forming zone 6225, the particles may be removed from the belt 6209. The precursor-shaped abrasive particles 6223 may be collected in a bin 6227 for further processing.

In accordance with an embodiment, the process of forming shaped abrasive particles may further comprise a sintering process. The sintering process can be conducted after collecting the precursor-shaped abrasive particles 6223 from the belt 6209. Sintering of the precursor-shaped abrasive particles 6223 may be utilized to densify the particles, which are generally in a green state. In a particular instance, the sintering process can facilitate the formation of a high-temperature phase of the ceramic material. For example, in one embodiment, the precursor-shaped abrasive particles 6223 may be sintered such that a high-temperature phase of alumina, such as alpha alumina is formed. In one instance, a shaped abrasive particle can comprise at least about 90 wt % alpha alumina for the total weight of the particle. In other instances, the content of alpha alumina may be greater, such that the shaped abrasive particle may consist essentially of alpha alumina.

Figure 63:
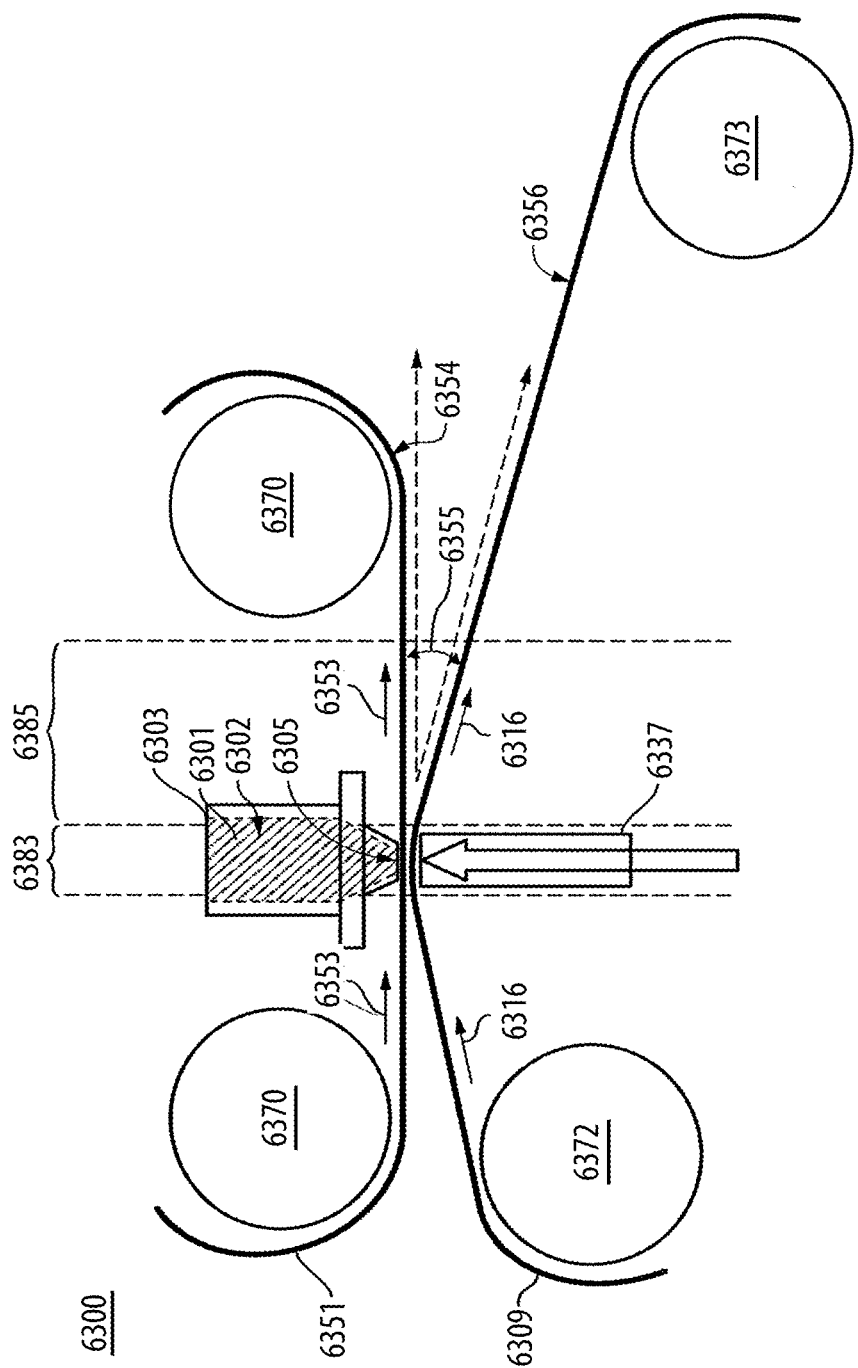
FIG. 63 includes an illustration of a system for forming a shaped abrasive particle in accordance with an embodiment.

FIG. 63 includes an illustration of a system for forming a shaped abrasive particle in accordance with an embodiment. In particular, the system 6300 can generally include a screen printing process of forming shaped abrasive particles. However, as noted herein, certain portions of the system may be modified to conduct a molding process. As illustrated, the system 6300 can include a screen 6351 configured to be translated between rollers 6370 and 6371. It will be appreciated that the screen 6351 can be translated over a greater number of rollers or other devices if so desired. As illustrated, the system 6300 can include a belt 6309 configured to be translated in a direction 6316 over rollers 6372 and 6373. It will be appreciated that the belt 6309 may be translated over a greater number of rollers or other devices if so desired.

As illustrated, the system 6300 can further include a die 6303 configured to conduct extrusion of a mixture 6301 contained within a reservoir 6302 of the die 6303. The process of forming shaped abrasive particles can be initiated by forming a mixture 6301 including a ceramic material and a liquid as described herein.

The mixture 6301 can be provided within the interior of the die 6303 and configured to be extruded through a die opening 6305 positioned at one end of the die 6303. As further illustrated, extruding can include applying a force (or a pressure) on the mixture 6301 to facilitate extruding the mixture 6301 through the die opening 6305. In accordance with an embodiment, a particular pressure may be utilized during extrusion. For example, the pressure can be at least about 10 kPa, such as at least about 500 kPa. Still, in at least one non-limiting embodiment, the pressure utilized during extrusion can be not greater than about 4 MPa. It will be appreciated that the pressure used to extrude the mixture 6301 can be within a range between any of the minimum and maximum values noted above.

In particular instances, the mixture 6301 can be extruded through a die opening 6305 at the end of the die 6303 proximate to the screen 6351. The screen 6351 may be translated in a direction 6353 at a particular rate to facilitate suitable processing. Notably, the screen 6351 can be translated through the application zone 6383 including the die opening 6305 to facilitate the formation of precursor-shaped abrasive particles. The screen 6351 may be translated through the application zone at a rate of at least about 3 cm/s, such as at least about 4 cm/s, at least about 6 cm/s, at least about 8 cm/s, or even at least about 10 cm/s. Still, in at least one non-limiting embodiment, the screen 6351 may be translated in a direction 6353 at a rate of not greater than about 5 m/s, such as not greater than about 1 m/s, or even not greater than about 0.5 m/s. It will be appreciated that the screen 6351 may be translated at a rate within a range between any of the minimum and maximum values noted above.

Additionally, the belt 6309 can be translated in a direction 6316 at a particular rate to facilitate suitable processing. For example, the belt 6309 can be translated at a rate of at least about 3 cm/s, such as at least about 4 cm/s, at least about 6 cm/s, at least about 8 cm/s, or even at least about 10 cm/s. Still, in at least one non-limiting embodiment, the belt 6309 may be translated in a direction 6316 at a rate of not greater than about 5 m/s, such as not greater than about 1 m/s, or even not greater than about 0.5 m/s. It will be appreciated that the belt 6309 may be translated at a rate within a range between any of the minimum and maximum values noted above.

In accordance with a particular embodiment, the screen 6351 may be translated at a particular rate as compared to the rate of translation of the belt 6309. For example, within the application zone 6383, the screen 6351 may be translated at substantially the same rate of translation of the belt 6309. That is, the difference in rate of translation between the screen and the belt may be not greater than about 5%, such as not greater than about 3%, or even not greater than about 1% based on the rate of the translation of the screen 6351.

As illustrated, the system 6300 can include an application zone 6383, including the die opening 6305. Within the application zone 6383, the mixture 6301 may be extruded from the die 6303 and directly onto the screen 6351. More particularly, a portion of the mixture 6301 may be extruded from the die opening 6305, and further extruded through one or more openings in the screen 6351 and onto the underlying belt 6309.

Figure 64:
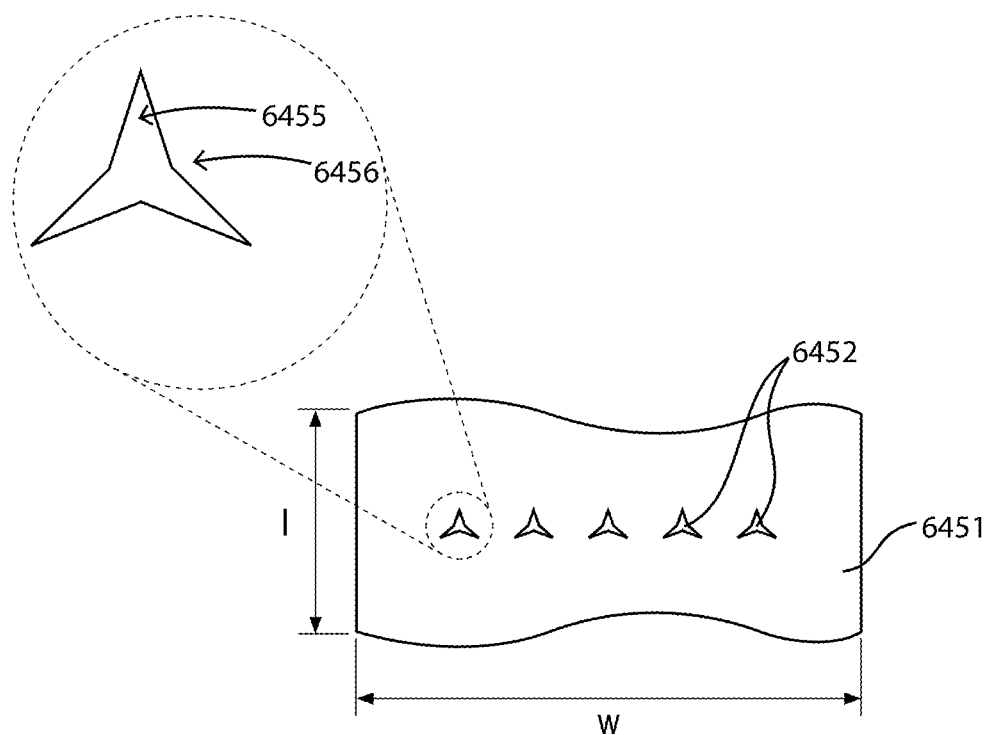
FIG. 64 includes an illustration of a portion of a system for forming a shaped abrasive particle in accordance with an embodiment.

Referring briefly to FIG. 64, a portion of a screen 6451 is illustrated. As shown, the screen 6451 can include an opening 6452, and more particularly, a plurality of openings 6452. The openings can extend through the volume of the screen 6451, to facilitate passable of the mixture 6301 through the openings and onto the belt 6309. In accordance with an embodiment, the openings 6452 can have a two-dimensional shape as viewed in a plane defined by the length (l) and width (w) of the screen. While the openings 6452 are illustrated as having a three-pointed star two-dimensional shape, other shapes are contemplated. For example, the openings 6452 can have a two-dimensional shape such as polygons, ellipsoids, numerals, Greek alphabet letters, Latin alphabet letters, Russian alphabet characters, complex shapes including a combination of polygonal shapes, and a combination thereof. In particular instances, the openings 6452 may have two-dimensional polygonal shapes such as, a triangle, a rectangle, a quadrilateral, a pentagon, a hexagon, a heptagon, an octagon, a nonagon, a decagon, and a combination thereof. Moreover, a screen 6451 can be formed to include a combination of openings 6452 having a plurality of different two-dimensional shapes.

Certain aspects of processing were found to facilitate the formation of shaped abrasive particles according to embodiments herein. Notably, the orientation of the openings relative to the die head was found to have an effect on the shape of the shaped abrasive particles. In particular, it was noted, that when the openings are aligned as illustrated in FIG. 64, wherein a point 6455 of the opening is first filled with the mixture 6301 the shaped abrasive particles are suitably formed having the features described herein. In other orientations, wherein for example, a side 6456 of the opening would be first filled, as opposed to a point (e.g., 6455) of the opening 6452, it was noted that the shaped abrasive particles had certain less suitable features.

Referring again to FIG. 63, after forcing the mixture 6301 through the die opening 6305 and a portion of the mixture 6301 through the openings 6352 in the screen 6351, precursor-shaped abrasive particles 6353 may be printed on a belt 6309 disposed under the screen 6351. According to a particular embodiment, the precursor-shaped abrasive particles 6353 can have a shape substantially replicating the shape of the openings 6352.

After extruding the mixture 6301 into the openings 6352 of the screen 6351, the belt 6309 and screen 6351 may be translated to a release zone 6385, wherein the belt 6309 and screen 6351 can be separated to facilitate the formation of precursor shaped abrasive particles. In accordance with an embodiment, the screen 6351 and belt 6309 may be separated from each other within the release zone 6385 at a particular release angle 6355. In accordance with specific embodiment, the release angle 6355 can be a measure of the angle between a lower surface 6354 of the screen 6351 and an upper surface 6356 of the belt 6309.

Notably, the mixture 6301 can be forced through the screen 6351 in rapid fashion, such that the average residence time of the mixture 6301 within the openings 152 can be less than about 2 minutes, less than about 1 minute, less than about 40 second, or even less than about 20 seconds. In particular non-limiting embodiments, the mixture 6301 may be substantially unaltered during printing as it travels through the screen openings 6352, thus experiencing no change in the amount of components, and may experience no appreciable drying in the openings 6352 of the screen 6351.

In an alternative embodiment, the process of forming can include a molding process. The molding process may utilize some of the same components of the system 6300, however, the screen can be replaced with a molding blank having openings within a substrate material for molding the mixture 6301. Notably, unlike a screen, the molding blank can have openings that extend partially through the entire thickness of the blank, such that the openings are not apertures extending from one major surface to the opposite major surface of the blank. Instead, the mold openings can have a bottom surface within the interior volume, which are intended to form a major surface of the precursor-shaped abrasive particle formed therein. Moreover, a molding system may not necessarily utilize a belt underlying the molding blank.

The forming process may also utilize a particular drying process to facilitate formation of shaped abrasive particles having features of the embodiments herein. In particular, the drying process may include drying under conditions including humidity, temperature, and atmospheric pressure and composition suitable for limiting distortions to the shaped abrasive particles.

It was found that unlike the formation of shaped abrasive particles having typical polygonal shapes, the process of forming complex shapes, particularly using replication processes, required control of one or more process parameters, including drying conditions, amount and type of lubricant, pressure applied to the mixture during extrusion, material of the blank or belt, and the like. In particular instances, it was found that a belt or blank of stainless steel or polycarbonate polymer could be used. Moreover, it was found that the use of a natural oil material (e.g., canola oil) as a lubricant on the openings of the blank or belt may facilitate improved forming of shaped abrasive particles.

The body of the shaped abrasive particles may include additives, such as dopants, which may be in the form of elements or compounds (e.g., oxides). Certain suitable additives can include alkali elements, alkaline earth elements, rare-earth elements, hafnium (Hf), zirconium (Zr), niobium (Nb), tantalum (Ta), molybdenum (Mo), and a combination thereof. In particular instances, the additive can include an element such as lithium (Li), sodium (Na), potassium (K), magnesium (Mg), calcium (Ca), strontium (Sr), barium (Ba), scandium (Sc), yttrium (Y), lanthanum (La), cesium (Ce), praseodymium (Pr), niobium (Nb), hafnium (Hf), zirconium (Zr), tantalum (Ta), molybdenum (Mo), vanadium (V), chromium (Cr), cobalt (Co), iron (Fe), germanium (Ge), manganese (Mn), nickel (Ni), titanium (Ti), zinc (Zn), and a combination thereof.

The body of a shaped abrasive article may include a specific content of additive (e.g., dopant). For example, the body of a shaped abrasive particle may include not greater than about 12 wt % additive for the total weight of the body. In still other embodiments, the amount of additive may be less, such as not greater than about 11 wt %, not greater than about 10 wt %, not greater than about 9 wt %, not greater than about 8 wt %, not greater than about 7 wt %, not greater than about 6 wt %, or even not greater than about 5 wt %. Still, the amount of additive in at least one non-limiting embodiment can be at least about 0.5 wt %, such as at least about 1 wt %, at least about 1.3 wt %, at least about 1.8 wt %, at least about 2 wt %, at least about 2.3 wt %, at least about 2.8 wt %, or even at least about 3 wt %. It will be appreciated that the amount of additive within a body of a shaped abrasive particle may be within a range between any of the minimum and maximum percentages noted above.

Figure 65A:
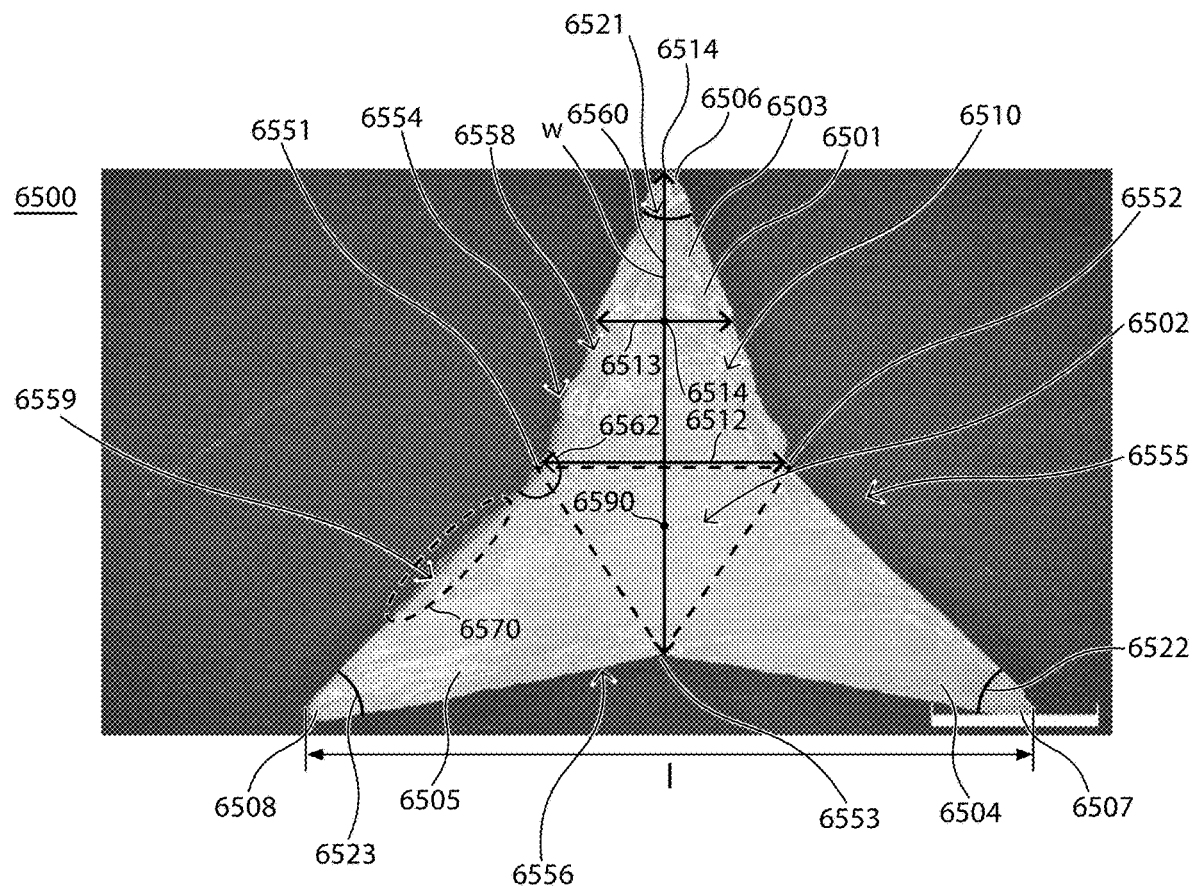
FIG. 65A includes an image of a shaped abrasive particle according to an embodiment.
Figure 65B:
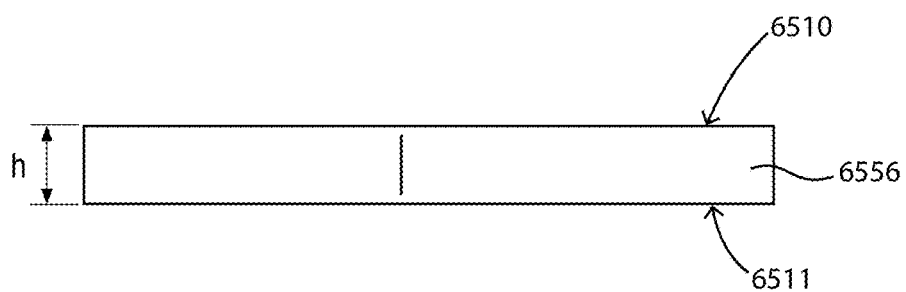
FIG. 65B includes an illustration of a side view of the shaped abrasive particle of FIG. 65A.

FIG. 65A includes a top view image of a shaped abrasive particle formed according to a particular embodiment. As illustrated, the shaped abrasive particle 6500 can define a star-shaped body, as viewed in two dimensions. In particular, the shaped abrasive particle 6500 can include a body 6501 having a central portion 6502 and a first arm 6503, a second arm 6504, and a third arm 6505 extending from the central portion 6502. The body 6501 can have a length (l) measured as the longest dimension along a side of the particle and a width (w), measured as the longest dimension of the particle between a midpoint 6553 of a side through the midpoint 6590 of the body 6501 to a first tip 6506 of the first arm 6503. The width can extend in a direction perpendicular to the dimension of the length. The body 6501 can have a height (h), extending in a direction perpendicular to the upper surface 6510 of the body 6501 defining the third side surface 6556 between the upper surface and the base surface 6511 as illustrated in FIG. 65B, which is a side view illustration of the image of the particle of FIG. 65A.

The shaped abrasive particle 6500 can have a body 6501 in the form of a three-pointed star defined by the first arm 6503, second arm 6504, and the third arm 6505 extending from the central portion 6502. According to one particular embodiment, at least one of the arms, including for example, the first arm 6503, can have a midpoint width 6513 that is less than a central portion width 6512. The central portion 6502 can be defined as a region between the midpoints 6551, 6552, and 6553 of the first side surface 6554, second side surface 6555, and third side surface 6556, respectively. The central portion width 6512 of the first arm 6503 can be the width of the dimension between the midpoints 6551 and 6552. The midpoint width 6513 can be the width of the line at a midpoint between the line of the central portion width 6510 and the tip 6506 of the first arm 6503 along a first axis 6560. In certain instances, the midpoint width 6513 can be not greater than about 90% of the central portion width 6512, such as not greater than about 80%, not greater than about 70%, not greater than about 65%, or even not greater than about 60%. Still, the midpoint width 6513 can be at least about 10%, such as at least about 20%, at least about 30%, or even at least about 40% of the central portion width 6510. It will be appreciated that the midpoint width 6513 can have a width relative to the central portion width 6512 within a range between any of the above minimum and maximum percentages.

Moreover, the body 6501 can have at least one arm, such as the first arm 6503, having a tip width 6514 at the tip 6506 of the first arm 6503 that is less than a midpoint width 6513. In such instances wherein the tip 6506 is sharply formed, the tip width 6514 may be considered 0. In instances wherein the tip 6506 has a radius of curvature, the tip width 6514 may be considered the diameter of the circle defined by the radius of curvature. According to one embodiment, the tip width 6514 can be not greater than about 90% of the midpoint width 6513, such as not greater than about 80%, not greater than about 70%, not greater than about 60%, not greater than about 50%, not greater than about 40%, not greater than about 30%, not greater than about 20%, or even not greater than about 10%. Still, in certain non-limiting embodiments, the tip width 6514 can be at least about 1%, such as at least about 2%, at least about 3%, at least about 5%, or even at least about 10% of the midpoint width 6513. It will be appreciated that the tip width 6514 can have a width relative to the midpoint width 6513 within a range between any of the above minimum and maximum percentages.

As further illustrated, the body 6501 can have a first arm 6503 including a first tip 6506 defining a first tip angle 6521 between the first side surface 6554 and the second side surface 6555. According to an embodiment, the first tip angle can be less than about 60 degrees, such as not greater than about 55 degrees, not greater than about 50 degrees, not greater than about 45 degrees, or even not greater than about 40 degrees. Still, the first tip angle can be at least about 5 degrees, such as at least about 8 degrees, at least about 10 degrees, at least about 15 degrees, at least about 20 degrees, at least about 25 degrees, or even at least about 30 degrees. The first tip angle can be within a range between any of the minimum and maximum values noted above.

The body 6501 can include a second arm 6504 having a second tip 6507 defining a second tip angle 6522 between the second side surface 6555 and third side surface 6556. The second tip angle can be substantially the same as the first tip angle, such as within 5% of the angle numerical value. Alternatively, the second tip angle can be substantially different relative to the first tip angle.

The body 6501 can include a third arm 6505 having a third tip 6508 defining a third tip angle 6523 between the first side surface 6554 and third side surface 6556. The third tip angle can be substantially the same as the first tip angle or second tip angle, such as within 5% of the angle numerical value. Alternatively, the third tip angle can be substantially different relative to the first tip angle or the second tip angle.

The body 6501 can have a total angle, which is a sum of the value of the first tip angle, second tip angle, and third tip angle which can be less than about 180 degrees. In other embodiments, the total angle can be not greater than about 175 degrees, such as not greater than about 170 degrees, not greater than about 165 degrees, not greater than about 150 degrees, such as not greater than about 140 degrees, not greater than about 130 degrees, not greater than about 125 degrees, or even not greater than about 120 degrees. Still, in one non-limiting embodiment, the body 6501 can have a total angle of at least about 60 degrees, such as at least about 70 degrees, at least about 80 degrees, at least about 90 degrees, such as at least about 95 degrees, at least about 100 degrees, or even at least about 105 degrees. It will be appreciated that the total sum angle can be within a range between any of the minimum and maximum values noted above.

Figure 65C:
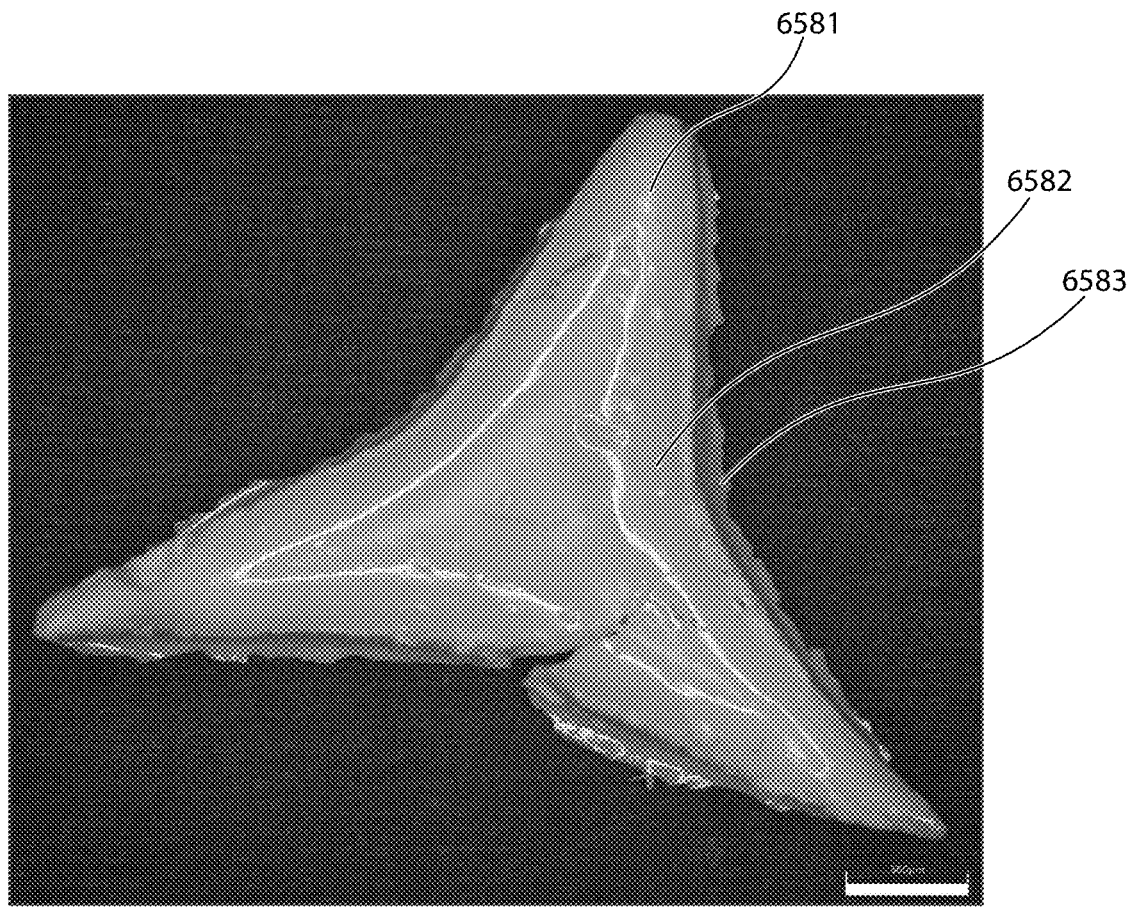
FIG. 65C includes an image of a shaped abrasive particle according to an embodiment.

As noted herein, the body 6501 can have a first side surface 6554 extending between the first arm 6506 and the third arm 6508. In certain instances, the first side surface 6554 can have an arcuate contour. For example, turning briefly to FIG. 65C, a top view image of a shaped abrasive particle according to an embodiment is provided. Notably, the shaped abrasive particle of FIG. 65C can include a three-pointed star having a body 6581 and an arcuate side surface 6582 extending between two points. In particular instances, the side surface 6582 can have a concave contour defining a curved portion extending inward toward the central portion 6583 of the body 6581.

Referring again to FIG. 65A, the body 6501 can have a first side surface 6554 having a first side section 6558 and a second side section 6559. The first side section 6558 can extend between the first tip 6506 and the midpoint 6551 and the second side section 6559 can extend between the third tip 6508 and the midpoint 6551. The first side section 6558 and second side section 6559 can define an interior angle 6562 that can be obtuse. For example, the interior angle 6562 can be greater than about 90 degrees, such as greater than about 95 degrees, greater than about 100 degrees, greater than about 110 degree, or even greater than about 120 degrees. Still, in one non-limiting embodiment, the interior angle 6562 can be not greater than about 320 degrees, such as not greater than about 300 degrees, or even not greater than about 270 degrees. It will be appreciated that the interior angle can be within a range between any of the minimum and maximum values noted above.

The first side section 6558 can extend for a significant portion of the length of the first side surface 6554. For example, the first side section 6558 can extend for at least about 20%, such as at least about 25%, at least about 30%, at least about 35%, or even at least about 40% of a total length of the first side surface 6554. Still, in one non-limiting embodiment, the first side section 6558 can have a length (ls1) between the midpoint 6551 and the first tip 6506 of not greater than about 80%, such as not greater than about 75%, not greater than about 70%, or even not greater than about 65% of the total length of the side surface 6554. It will be appreciated that the length of the first side section 6558 can be within a range between any of the minimum and maximum percentages noted above.

The second side section 6559 can extend for a significant portion of the length of the first side surface 6554. For example, the second side section 6559 can extend for at least about 20%, such as at least about 25%, at least about 30%, at least about 35%, or even at least about 40% of a total length of the first side surface 6554. Still, in one non-limiting embodiment, the second side section 6559 can have a length (ls2) between the midpoint 6551 and the third tip 6508 of not greater than about 80%, such as not greater than about 75%, not greater than about 70%, or even not greater than about 65% of the total length of the side surface 6554 as a straight line between the first tip 6506 and the third tip 6508. It will be appreciated that the length of the second side section 6559 can be within a range between any of the minimum and maximum percentages noted above.

The body 6501 can further include a fractured region 6570 on at least a portion of one side surface. For example, the body 6501 can have a fractured region 6570 on a portion of the side surface 6554 between the midpoint 6551 and the third tip 6508. The fracture region 6570 can be intersecting at least a portion of an edge defining the base surface 6511. Alternatively, or additionally, the fracture region 6570 can be intersecting at least a portion of an edge defining the upper surface 6510. The fractured region can be characterized by having a surface roughness greater than a surface roughness of at least the upper surface 6510 or the base surface 6511 of the body 6501. The fractured region 6570 can define a portion of the body extending from the base surface 6511. In certain instances, the fractured region 6570 can be characterized by irregularly shaped protrusions and grooves extending from the base surface 6511 along the first side surface 6554. In certain instances, the fractured region 6570 can appear as and define a serrated edge. A fracture region 6583 is also illustrated on the side surface 6582 of the shaped abrasive particle of FIG. 65C.

In certain instances, the fracture region 6570 can be preferentially located at or near the tips of the arms of the body. The fractured region 6570 can extend from the bottom surface 1703 and extend vertically for a fraction of the entire height of the side surface or even for the entire height of the side surface.

While the foregoing body 6501 of the three-pointed star has been shown to have an upper surface 6510 having a two-dimensional shape, as viewed in the plane of the length and width of the body, that is substantially the same as the two-dimensional shape of the base surface 6511 of the body 6501, other shapes are contemplated. For example, in one embodiment, the cross-sectional shape of the body at the base surface can define a base surface shape from the group consisting of a three-pointed star, a four-pointed star, a cross-shape, a polygon, ellipsoids, numerals, Greek alphabet characters, Latin alphabet characters, Russian alphabet characters, complex shapes having a combination of polygonal shapes, and a combination thereof. Moreover, the cross-sectional shape of the body at the upper surface can define an upper surface shape, which can be different than the base surface shape and selected from the group of a three-pointed star, a four-pointed star, a cross-shape, a polygon, ellipsoids, numerals, Greek alphabet characters, Latin alphabet characters, Russian alphabet characters, complex shapes having a combination of polygonal shapes, and a combination thereof.

In particular instances, the upper surface shape can have an arcuate form of the base surface shape. For example, the upper surface shape can define an arcuate three-pointed two-dimensional shape, wherein the arcuate three-pointed two-dimensional shape defines arms having rounded ends. In particular, the arms as defined at the base surface can have a smaller radius of curvature at the tip as compared to the radius of curvature of the corresponding tip at the upper surface.

As described in other embodiments herein, it will be appreciated that at least one of the arms of the body 6501 may be formed to have a twist, such that the arm twists around a central axis. For example, the first arm 6503 may twist around the axis 6560. Moreover, the body 6501 can be formed such that at least one arm extends in an arcuate path from the central region.

Figure 66A:
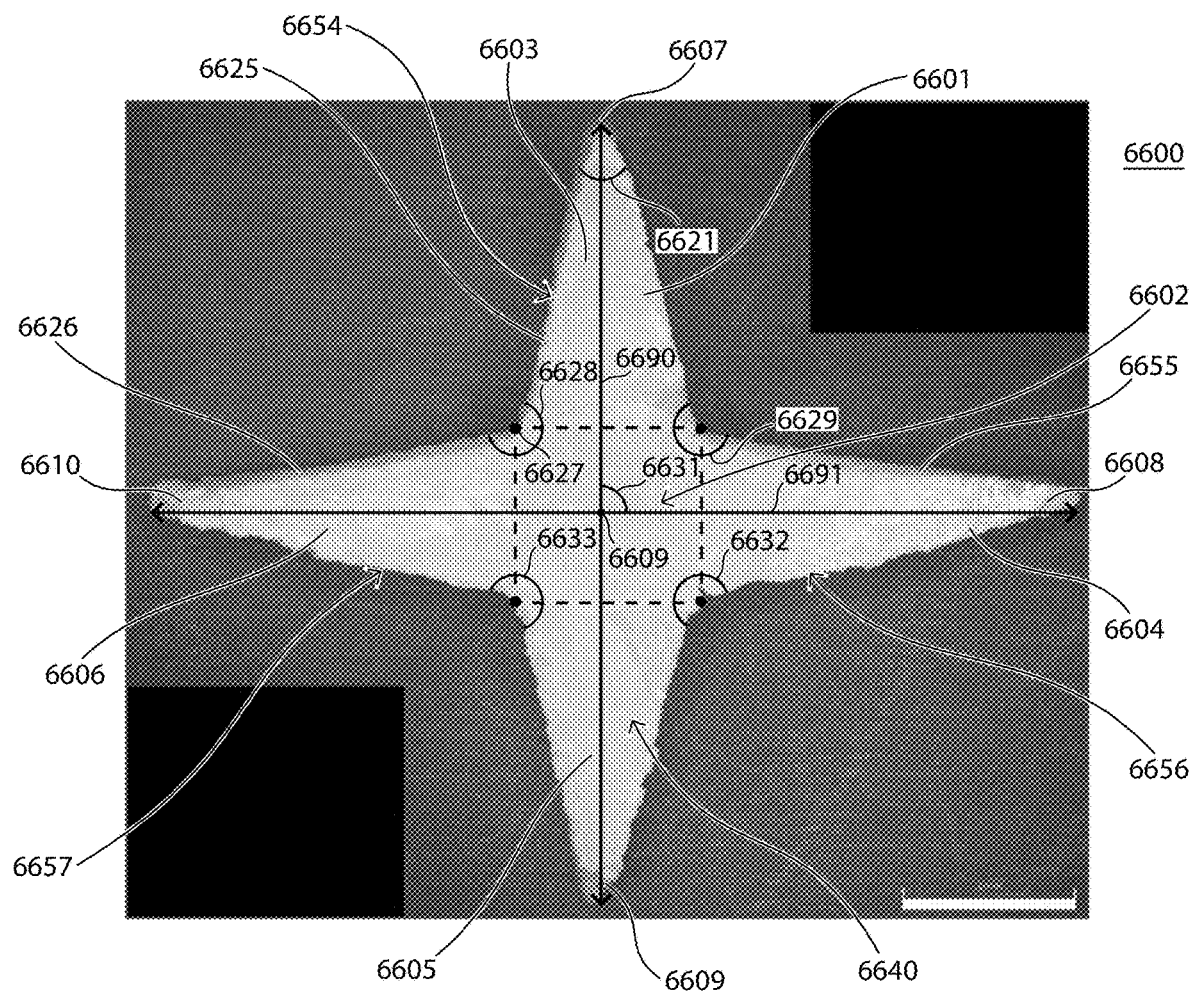
FIG. 66A includes an image of a shaped abrasive particle according to an embodiment.
Figure 66B:
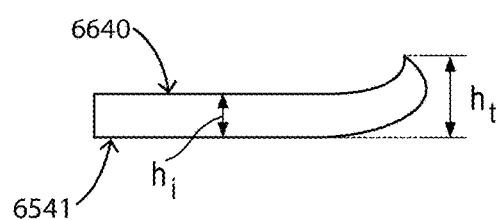
FIG. 66B includes an illustration of a side view of the shaped abrasive particle of FIG. 66A.

FIG. 66A includes a top view image of a shaped abrasive particle formed according to a particular embodiment. As illustrated, the shaped abrasive particle 6600 can define a star-shaped body, as viewed in a plane defined by the two dimensions of length and width. In particular, the shaped abrasive particle 6600 can include a body 6601 having a central portion 6602 and a first arm 6603, a second arm 6604, a third arm 6605, and a fourth arm 6606 extending from the central portion 6602. The body 6601 can have a length (l), measured as the longest dimension along a side of the particle and a width (w), and measured as the longest dimension of the particle between two points of opposite arms and through the midpoint 6609 of the body 6601. The width can extend in a direction perpendicular to the dimension of the length. The body 6601 can have a height (h), extending in a direction perpendicular to the upper surface 6610 of the body 6601 defining the third side surface 6656 between the upper surface and the base surface 6611 as illustrated in FIG. 66B. Notably, the body 6601 can have more than one height as will be described in more detail herein.

The shaped abrasive particle 6600 can have a body 6601 in the form of a four-pointed star defined by the first arm 6603, a second arm 6604, a third arm 6605, and the fourth arm 6606 extending from the central portion 6602. The body 6601 can have any of the features described in the embodiments herein. For example, according to one particular embodiment, at least one of the arms, including for example, the first arm 6603, can have a midpoint width that is less than a central portion width, as described in accordance with the embodiment of FIG. 65A. Moreover, the body 6601 can have at least one arm, such as the first arm 6603, having a tip width at the tip of the first arm that is less than a midpoint width as described in accordance with the embodiment of FIG. 65A.

In one aspect, the body 6601 can have a first arm 6603 including a first tip 6607 defining a first tip angle 6621 between the first side surface 6654 and the second side surface 6655. According to an embodiment, the first tip angle can be less than about 60 degrees, such as not greater than about 55 degrees, not greater than about 50 degrees, not greater than about 45 degrees, or even not greater than about 40 degrees. Still, the first tip angle 6621 can be at least about 5 degrees, such as at least about 8 degrees, at least about 10 degrees, at least about 15 degrees, or even at least about 20 degrees. The first tip angle 6621 can be within a range between any of the minimum and maximum values noted above. Likewise, any of the other tips, including the second tip 6608 of the second arm 6604, the third tip 6609 of the third arm 6605, or fourth tip 6610 of the fourth arm 6606 can have a tip angle having the same features described in accordance with the first tip angle 6621 above.

According to one embodiment the second tip 6608 can define a second tip angle that is substantially the same as the first tip angle 6621, such as within 5% of the angle numerical value. Alternatively, the second tip angle can be substantially different relative to the first tip angle 6621. The third tip 6609 can define a third tip angle that is substantially the same as the first tip angle 6621, such as within 5% of the angle numerical value. Alternatively, the third tip angle can be substantially different relative to the first tip angle 6621. The fourth tip 6610 can define a fourth tip angle that is substantially the same as the first tip angle 6621, such as within 5% of the angle numerical value. Alternatively, the fourth tip angle can be substantially different relative to the first tip angle 6621.

According to one embodiment, the body 6601 can include a first arm 6603, second arm 6604, third arm 6605, and fourth arm 6606 that are substantially evenly spaced apart with respect to each other. As illustrated, the arms 6603-6606 can be spaced substantially evenly around the central portion 6602. In one particular embodiment, the arms 6603-6606 can be spaced apart from each other at substantially orthogonal angles relative to each other. In other embodiments, the first arm 6603 and second arm 6604 can be spaced apart from each other based on the spacing angle 6631 defined by the angle between the axis 6690 extending between opposite tips 6609 and 6607 and through the midpoint 6609 relative to the axis 6691 extending between tips 6608 and 6610 and through the midpoint 6609. The first arm 6603 and second arm 6604 can be spaced apart from each other as define by the spacing angle 6631 by at least about 45 degrees, such as at least about 60 degrees, or even at least about 70 degrees. Still, in other embodiments, the spacing angle 6631 can be not greater than about 120 degrees, such as not greater than about 110 degrees, or even approximately 90 degrees. The spacing angle 6631 can be within a range between any of the minimum and maximum values noted above.

In certain instances, the body 6601 can be formed such that at least one side surface, such as the first side surface 6654 can have an arcuate contour. In more particular embodiments, at least one side surface can have a concave curvature for at least a portion of the length of the entire side surface.

In still another embodiment, at least one side surface of the body 6601, such as the first side surface 6654, can have a first section 6625 and a second section 6626, which can be joined together at a first side surface midpoint 6627 and defining a first interior angle 6628. According to one embodiment, the first interior angle can be greater than about 90 degrees, such as greater than about 95 degrees, greater than about 100 degrees, greater than about 130 degrees, greater than about 160 degrees, greater than about 180 degrees, or even greater than about 210 degrees. Still, in one non-limiting embodiment, the first interior angle can be not greater than about 320 degrees, not greater than about 300 degrees, or even not greater than about 270 degrees. The first interior angle can be within a range between any of the minimum and maximum values noted above. Moreover, the body can include a second interior angle 6629 at the second side surface 6655, a third interior angle 6632 at the third side surface 6656, and a fourth interior angle 6633 at the fourth side surface 6657. Each of the interior angles can have the features described with respect to the first interior angle 6628. Moreover, each and any of the second side surface 6655, the third side surface 6656, and the fourth side surface 6657 can have any of the features of the first side surface 6654.

The body 6601 can have a first arm 6603 and the third arm 6605 extending in opposite directions from the central portion 6602 of the body 6601 relative to each other. Moreover, the second arm 6604 and the fourth arm 6606 can extend in opposite directions relative to each other. According to one embodiment, the second arm 6604 can have a length, as measured between from the boundary of the central portion 6602 to the tip 6608 along the axis 6691 that can be substantially the same as a length of the fourth arm 6606. In yet another instance, the second arm 6604 can have a length that is substantially different than (e.g., less than or greater than) a length of the first arm 6603 or third arm 6605.

While the foregoing body 6601 of the four-pointed star has been shown to have an upper surface 6640 having a two-dimensional shape, as viewed in the plane of the length and width of the body, that is substantially the same as the two-dimensional shape of the base surface 6641 of the body 6501, other shapes are contemplated. For example, in one embodiment, the cross-sectional shape of the body at the base surface can define a base surface shape from the group consisting of a three-pointed star, a four-pointed star, a cross-shape, a polygon, ellipsoids, numerals, Greek alphabet characters, Latin alphabet characters, Russian alphabet characters, complex shapes having a combination of polygonal shapes, and a combination thereof. Moreover, the cross-sectional shape of the body at the upper surface can define an upper surface shape, which can be different than the base surface shape and selected from the group of a three-pointed star, a four-pointed star, a cross-shape, a polygon, ellipsoids, numerals, Greek alphabet characters, Latin alphabet characters, Russian alphabet characters, complex shapes having a combination of polygonal shapes, and a combination thereof.

In particular instances, the upper surface shape can have an arcuate form of the base surface shape. For example, the upper surface shape can define an arcuate four-pointed two-dimensional shape, wherein the arcuate four-pointed two-dimensional shape defines arms having rounded ends. In particular, the arms as defined at the base surface can have a smaller radius of curvature at the tip as compared to the radius of curvature of the corresponding tip at the upper surface.

According to one particular aspect, the body can be formed to have limited deformation or warping of the body. For example, the body can have a curling factor (ht/hi) of not greater than about 10, wherein the curling factor is defined as a ratio between the greatest height of the body at one tip of an arm (ht) as compared to a smallest dimension of height of the body at the interior (hi) (e.g., within the central portion 6602). For example, turning to a side-view illustration of a shaped abrasive particle of FIG. 66B, the body 6601 can have an interior height, which represents the smallest height of the particle as viewed from the side. The greatest height (ht) of the body is represented by the distance between the bottom surface (or plane of the bottom surface) and the highest point of the body 6601 as viewed from the side, which can be tip of a curled up arm. The shaped abrasive particles of the embodiments herein demonstrate limited warping, having a curling factor of not greater than about 5, not greater than about 3, not greater than about 2, not greater than about 1.8, not greater than about 1.7, not greater than about 1.6, not greater than about 1.5, not greater than about 1.3, not greater than about 1.2, not greater than about 1.14, or even not greater than about 1.10. Suitable computer programs, such as ImageJ software, may be used to conduct an accurate analysis from images of the shaped abrasive particles to measure curling factor.

Figure 67:
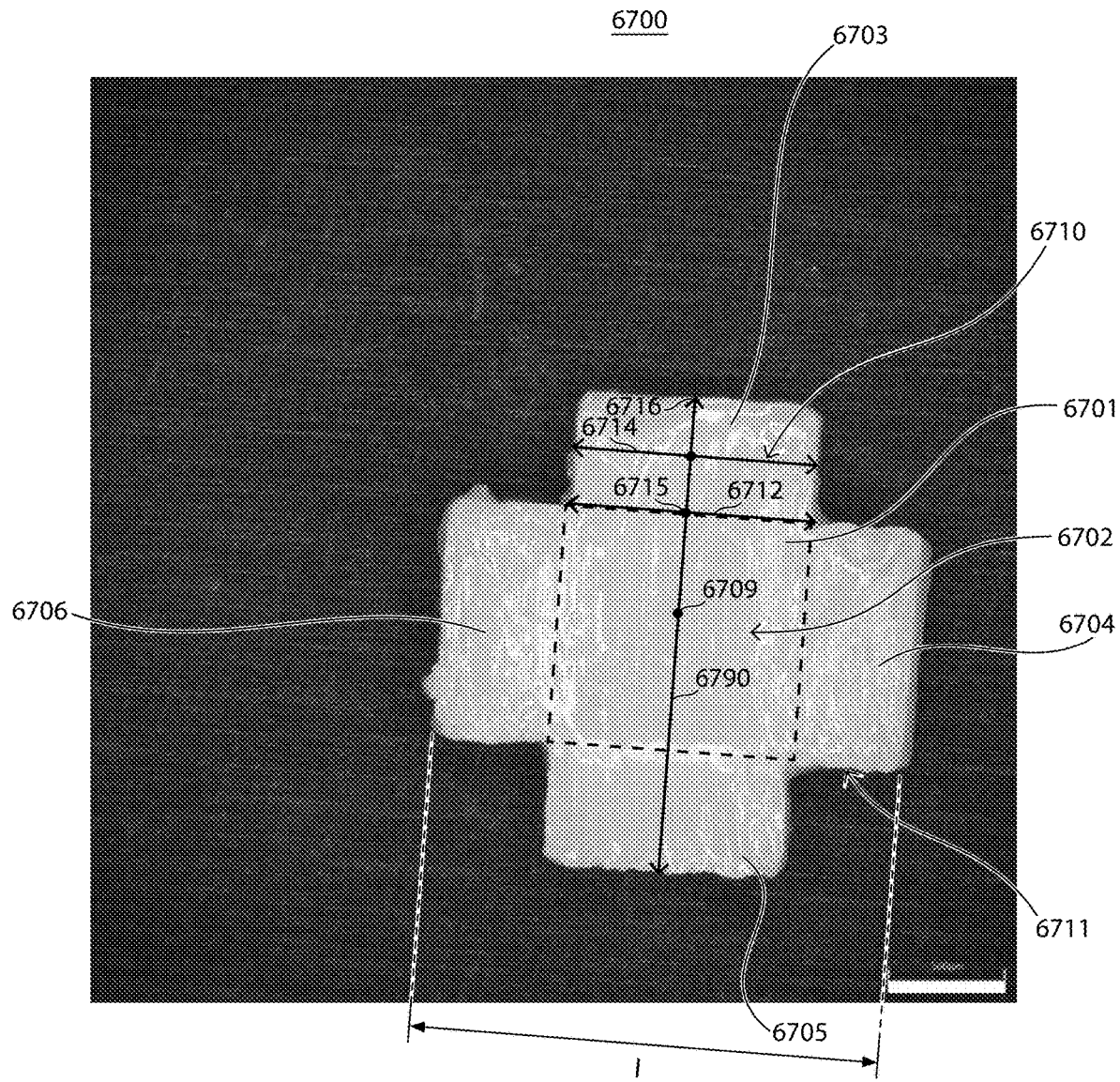
FIG. 67 includes a top view image of a shaped abrasive particle formed according to a particular embodiment.

FIG. 67 includes a top view image of a shaped abrasive particle formed according to a particular embodiment. As illustrated, the shaped abrasive particle 6700 can define a cross-shaped body, as viewed in a plane defined by the two dimensions of length and width. In particular, the shaped abrasive particle 6700 can include a body 6701 having a central portion 6702 and a first arm 6703, a second arm 6704, a third arm 6705, and a fourth arm 6706 extending from the central portion 6702. The body 6701 can have a length (l), measured as the longest dimension along a side of the particle and a width (w), and measured as the longest dimension of the particle between two points of opposite arms and through the midpoint 6709 of the body 6701. The width can extend in a direction perpendicular to the dimension of the length. The body 6701 can have a height (h), extending in a direction perpendicular to the upper surface 6710 of the body 6701 defining a side surface between the upper surface 6710 and the base surface 6711. The body 6701 can have any one or a combination of features described in any of the embodiments herein.

The body 6701 can have at least one arm, such as the first arm 6703 having a midpoint width 6714 that is substantially the same as a central portion width 6712 of the first arm 6703. Moreover, the length of the arm between points 6715 and 6716 on the axis 6790 defining the width of the body 6701 can be less than the width of the first arm 6703. In particular instances, the length can be not greater than about 90% of the width, such as not greater than about 80%, not greater than about 70%, not greater than about 60%. Still, in one non-limiting embodiment, the length of the first arm 6703 can be at least about 10%, such as at least about 20% of the width of the first arm 6703. The length can have a dimension relative to the width within a range between any of the minimum and maximum percentages noted above. Reference to the width of the first arm 6703 can be reference to the central portion width 6712, or midpoint width 6714. Any of the arms of the body 6701 can have the same features of the first arm 6703.

Figure 68:
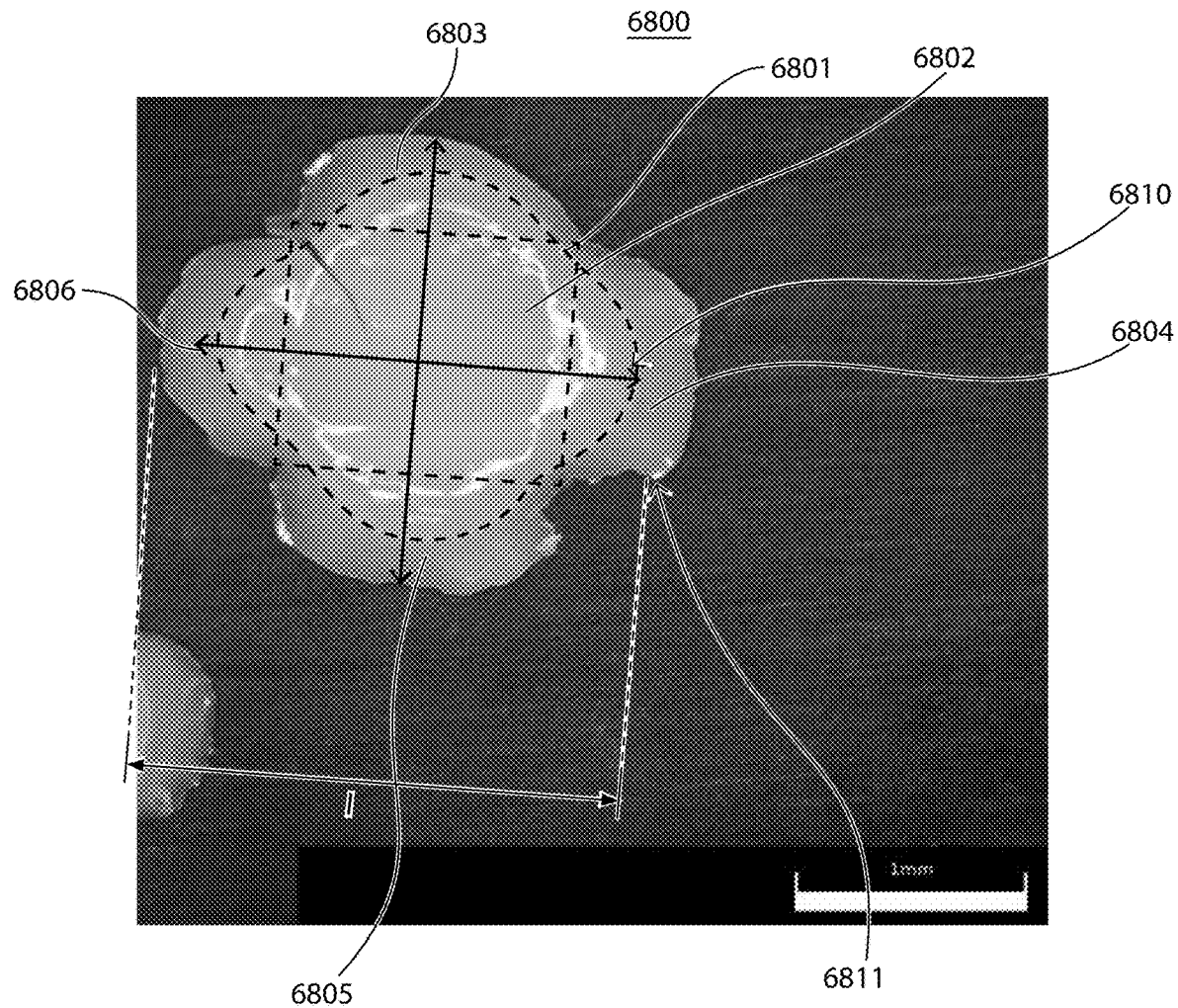
FIG. 68 includes a top view image of a shaped abrasive particle according to an embodiment.

FIG. 68 includes a top view image of a shaped abrasive particle according to an embodiment. As shown, the shaped abrasive particle 6800 can define a generally cross-shaped body, as viewed in a plane defined by the two dimensions of length and width. In particular, the shaped abrasive particle 6800 can include a body 6801 having a central portion 6802 and a first arm 6803, a second arm 6804, a third arm 6805, and a fourth arm 6806 extending from the central portion 6802. The body 6801 can have a length (l), measured as the longest dimension along a side of the particle and a width (w), and measured as the longest dimension of the particle between two points of opposite arms and through the midpoint 6809 of the body 6801. The width can extend in a direction perpendicular to the dimension of the length. The body 6801 can have a height (h), extending in a direction perpendicular to the upper surface 6810 of the body 6801 defining a side surface between the upper surface 6810 and the base surface 6811. The body 6801 can have any one or a combination of features described in any of the embodiments herein.

In the particular embodiment of FIG. 68, the body can have a particular combination of two-dimensional shapes of the base surface 6811 and the upper surface 6810. For example, the body can have a two-dimensional shape (i.e., cross-sectional shape) of the body at the base surface defining a base surface shape, and a two-dimensional shape of the body at the upper surface defining an upper surface shape, and in particular, the base surface shape can be a generally cross-shaped the upper surface shape can be a rounded quadrilateral shape. The rounded quadrilateral shape can be defined by an upper surface 6810 (edges shown by the dotted line) that has four sides joined by rounded corners, wherein the corners generally correspond to the arms of the cross-shape defined by the base surface. Notably, the upper surface may not define arm portions separated by a side surface having at least two side surface sections angled with respect to each other, which are shown by the cross-shaped contour of the base surface shape.

Figure 69A:
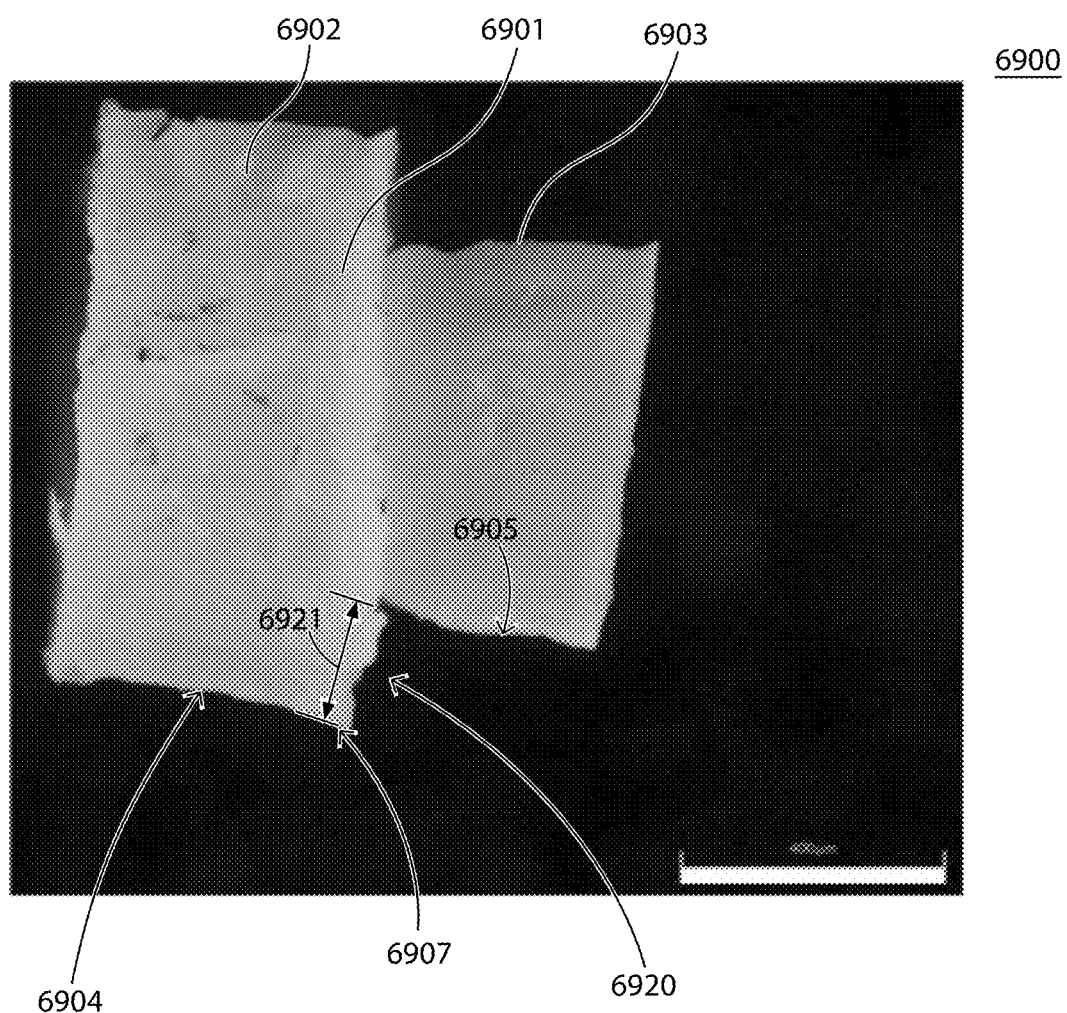
FIG. 69A includes a side view image of a shaped abrasive particle according to an embodiment.

FIG. 69A includes an illustration of a side view of a shaped abrasive particle according to an embodiment. As illustrated, the shaped abrasive particle 6900 can include a body 6901 including a first layer 6902 and a second layer 6903 overlying the first layer 6902. According to an embodiment, the body 6901 can have layers 6902 and 6903 that are arranged in a stepped configuration relative to each other. A stepped configuration can be characterized by at least one plateau region 6920 on an upper surface 6910 of the first layer 6902 between a side surface 6904 of the first layer 6902 and a side surface 6905 of the second layer 6903. The size and shape of the plateau region 6920 may be controlled or predetermined by one or more processing parameters and may facilitate an improved deployment of the abrasive particles into an abrasive article and performance of the abrasive article.

Figure 69B:
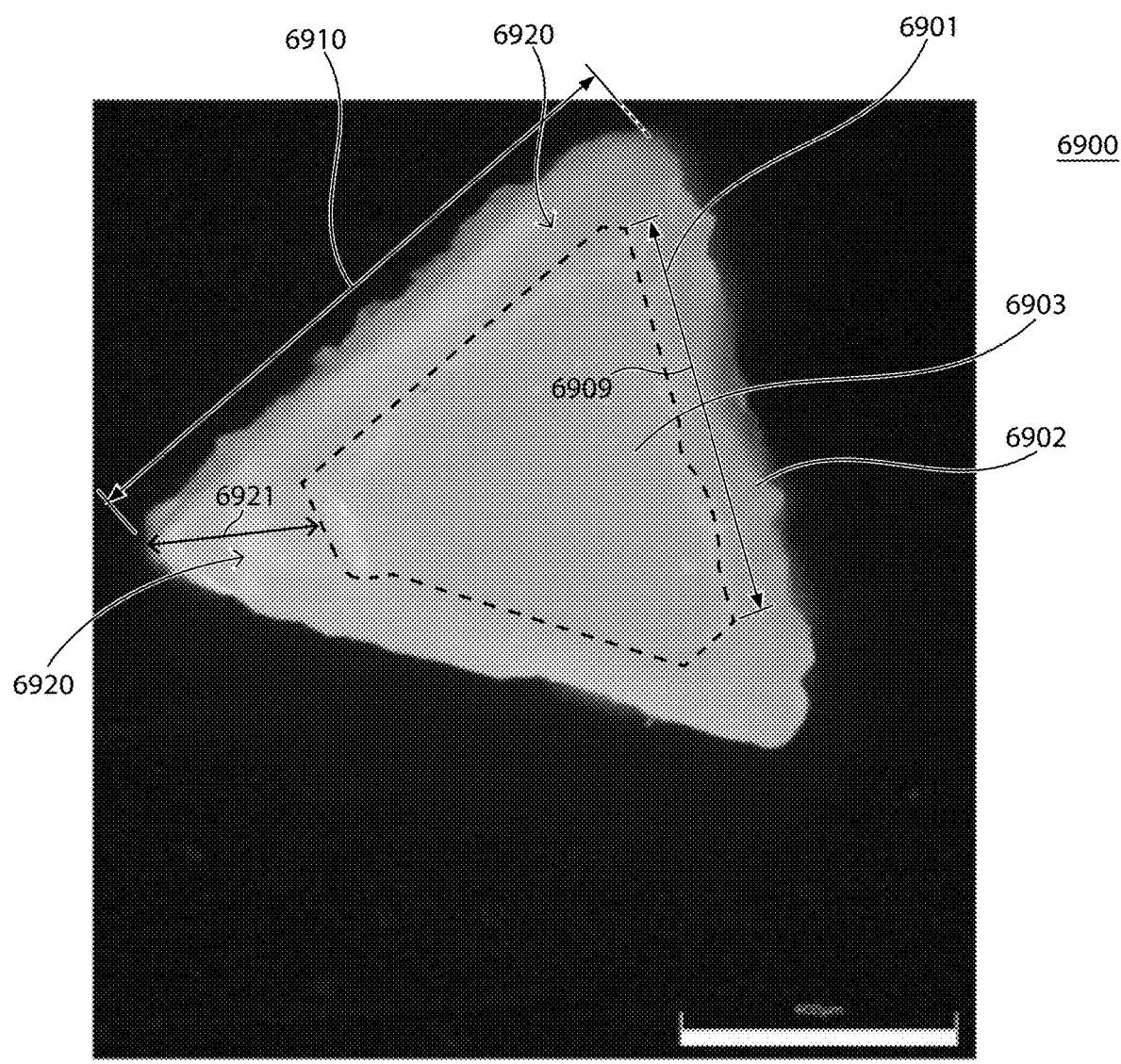
FIG. 69B includes a top view image of a shaped abrasive particle according to an embodiment.

In one embodiment, the plateau region 6902 can have a lateral distance 6921, which can be defined as the greatest distance between an edge 6907 between the upper surface 6910 of the first layer 6902 and a side surface 6904 of the first layer to the side surface 6905 of the second layer. Analysis of the lateral distance 6921 may be facilitated by a top-view image of the body 6901, such as shown in FIG. 69B. As illustrated, the lateral distance 6921 can be the greatest distance of the plateau region 6902. In one embodiment, the lateral distance 6921 may have a length that is less than the length 6910 of the first layer 6902 (i.e., larger layer). In particular, the lateral distance 6921 can be not greater than about 90%, such as not greater than about 80%, not greater than about 70%, not greater than about 60%, not greater than about 50%, not greater than about 40%, not greater than about 30%, or even not greater than about 20% of the length 6910 of the first layer 6902 of the body 6901. Still, in one non-limiting embodiment, the lateral distance 6921 can have a length that is at least about 2%, at least about 5%, at least about 8%, at least about 10%, at least about 20%, at least about 25%, at least about 30%, or even at least about 50% of the length of the first layer 6902 of the body 6901. It will be appreciated that the lateral distance 6921 can have a length within a range between any of the minimum and maximum percentages noted above.

The second layer 6903 can have a particular length 6909, which is the longest dimension of a side, such as shown in FIG. 69B, relative to a length 6910 of the first layer 6902 that may facilitate improved deployment of the abrasive particles into an abrasive article and/or performance of the abrasive article. For example, the length 6909 of the second layer 6903 can be not greater than about 90%, such as not greater than about 80%, not greater than about 70%, not greater than about 60%, not greater than about 50%, not greater than about 40%, not greater than about 30%, or even not greater than about 20% of the length 6910 of the first layer 6902 of the body 6901. Still, in one non-limiting embodiment, the second layer 6903 can have a length 69909 that can be at least about 2%, at least about 10%, at least about 20%, at least about 30%, at least about 40%, at least about 50%, at least about 60%, or even at least about 70% of the length 6910 of the first layer 6902 of the body 6901. It will be appreciated that the length 6909 of the second layer 6903 relative to the length 6910 of the first layer 6902 can be within a range between any of the minimum and maximum percentages noted above.

The foregoing shaped abrasive particle of FIGS. 69A and 69B can be formed using multiple sheets of material, multiple screens, and/or multiple molding blanks. For example, one process can include the use of a first screen, which is completely or partially filled with a first mixture, and provision of a second screen, which can be different in size, shape or orientation with respect to the first screen, and provision of a second mixture within the openings of the second screen. The second screen can be placed over the first screen or over precursor-shaped abrasive particles formed from the first screen. The second mixture can be provided on the precursor-shaped abrasive particles of the first mixture to form precursor-shaped abrasive particles having the stepped and layered configuration. Notably, the openings of the second screen can be smaller than the openings of the first screen. It will be appreciated that the first screen and second screen can have, but need not necessarily utilize, different size openings, different two-dimensional shapes of openings, and a combination thereof.

Moreover, in certain instances, the first screen and second screen can be used at the same time as a composite screen to shape the mixture. In such instances, the first screen and second screen may be affixed to each other to facilitate proper and continuous alignment between the openings of the first screen and second screen. The second screen can be oriented on the first screen to facilitate alignment between the openings in the first screen and openings in the second screens to facilitate suitable delivery of the mixture into the openings of the first screen and second screen.

Still, the first screen and second screen may be used in separate processes. For example, wherein the first mixture is provided in the first screen at a first time and the second mixture is provided in the second screen at a second time. More particularly, the first mixture can be provided in the openings of the first screen, and after the first mixture has been formed in the openings of the first screen, the second mixture can be provided on the first mixture. Such a process may be conducted while the first mixture is contained in the first openings of the first screen. In another instance, the first mixture may be removed from the openings of the first screen to create precursor-shaped abrasive particles of the first mixture. Thereafter, the precursor shaped abrasive particles of the first mixture can be oriented with respect to openings of the second screen, and the second mixture can be placed in the openings of the second screen and onto the precursor shaped abrasive particles of the first mixture to facilitate formation of composite precursor shaped abrasive particles including the first mixture and the second mixture. The same process may be used with one mold and one screen. Moreover, the same process may be completed using first and second molds to form the first and second layers, respectively.

It will be appreciated that any of the characteristics of the embodiments herein can be attributed to a batch of shaped abrasive particles. A batch of shaped abrasive particles can include, but need not necessarily include, a group of shaped abrasive particles made through the same forming process. In yet another instance, a batch of shaped abrasive particles can be a group of shaped abrasive particles of an abrasive article, such as a fixed abrasive article, and more particularly, a coated abrasive article, which may be independent of a particular forming method, but having one or more defining features present in a particular population of the particles. For example, a batch of particles may include an amount of shaped abrasive particles suitable for forming a commercial grade abrasive product, such as at least about 20 lbs. of particles.

Moreover, any of the features of the embodiments herein (e.g., aspect ratio, multiple portions, number of arms, midpoint width to central portion width, two-dimensional shape, curling factor, etc.) can be a characteristic of a single particle, a median value from a sampling of particles of a batch, or an average value derived from analysis of a sampling of particles from a batch. Unless stated explicitly, reference herein to the characteristics can be considered reference to a median value that is a based on a statistically significant value derived from a random sampling of a suitable number of particles of a batch. Notably, for certain embodiments herein, the sample size can include at least 10, and more typically, at least 40 randomly selected particles from a batch of particles.

Any of the features described in the embodiments herein can represent features that are present in at least a portion of a batch of shaped abrasive particles. The portion may be a minority portion (e.g., less than 50% and any whole number integer between 1% and 49%) of the total number of particles in a batch, a majority portion (e.g., 50% or greater and any whole number integer between 50% and 99%) of the total number of particles of the batch, or even essentially all of the particles of a batch (e.g., between 99% and 100%). The provision of one or more features of any shaped abrasive particle of a batch may facilitate alternative or improved deployment of the particles in an abrasive article and may further facilitate improved performance or use of the abrasive article.

A batch of particulate material can include a first portion including a first type of shaped abrasive particle and a second portion including a second type of shaped abrasive particle. The content of the first portion and second portion within the batch may be controlled at least in part based upon certain processing parameters. Provision of a batch having a first portion and a second portion may facilitate alternative or improved deployment of the particles in an abrasive article and may further facilitate improved performance or use of the abrasive article.

The first portion may include a plurality of shaped abrasive particles, wherein each of the particles of the first portion can have substantially the same features, including for example, but not limited to, the same two-dimensional shape of a major surface. The batch may include various contents of the first portion. For example, the first portion may be present in a minority amount or majority amount. In particular instances, the first portion may be present in an amount of at least about 1%, such as at least about 5%, at least about 10%, at least about 20%, at least about 30%, at least about 40%, at least about 50%, at least about 60%, or even at least about 70% for the total content of portions within the batch. Still, in another embodiment, the batch may include not greater than about 99%, such as not greater than about 90%, not greater than about 80%, not greater than about 70%, not greater than about 60%, not greater than about 50%, not greater than about 40%, not greater than about 30%, not greater than about 20%, not greater than about 10%, not greater than about 8%, not greater than about 6%, or even not greater than about 4% of the total portions within the batch. The batch can include a content of the first portion within a range between any of the minimum and maximum percentages noted above.

The second portion of the batch can include a plurality of shaped abrasive particles, wherein each of the shaped abrasive particles of the second portion can have substantially the same feature, including for example, but not limited to, the same two-dimensional shape of a major surface. The second portion can have one or more features of the embodiments herein, which can be distinct compared to the plurality of shaped abrasive particles of the first portion. In certain instances, the batch may include a lesser content of the second portion relative to the first portion, and more particularly, may include a minority content of the second portion relative to the total content of particles in the batch. For example, the batch may contain a particular content of the second portion, including for example, not greater than about 40%, such as not greater than about 30%, not greater than about 20%, not greater than about 10%, not greater than about 8%, not greater than about 6%, or even not greater than about 4%. Still, in at least on non-limiting embodiment, the batch may contain at least about 0.5%, such as at least about 1%, at least about 2%, at least about 3%, at least about 4%, at least about 10%, at least about 15%, or even at least about 20% of the second portion for the total content of portions within the batch. It will be appreciated that the batch can contain a content of the second portion within a range between any of the minimum and maximum percentages noted above.

Still, in an alternative embodiment, the batch may include a greater content of the second portion relative to the first portion, and more particularly, can include a majority content of the second portion for the total content of particles in the batch. For example, in at least one embodiment, the batch may contain at least about 55%, such as at least about 60% of the second portion for the total portions of the batch.

It will be appreciated that the batch can include other portions, including for example a third portion, comprising a plurality of shaped abrasive particles having a third feature that can be distinct from the features of the particles of the first and second portions. The batch may include various contents of the third portion relative to the second portion and first portion. The third portion may be present in a minority amount or majority amount. In particular instances, the third portion may be present in an amount of not greater than about 40%, such as not greater than about 30%, not greater than about 20%, not greater than about 10%, not greater than about 8%, not greater than about 6%, or even not greater than about 4% of the total portions within the batch. Still, in other embodiments the batch may include a minimum content of the third portion, such as at least about 1%, such as at least about 5%, at least about 10%, at least about 20%, at least about 30%, at least about 40%, or even at least about 50%. The batch can include a content of the third portion within a range between any of the minimum and maximum percentages noted above. Moreover, the batch may include a content of diluent, randomly shaped abrasive particles, which may be present in an amount the same as any of the portions of the embodiments herein.

EXAMPLES

Example 1

A mixture in the form of a gel is obtained having approximately 42% solids loading of boehmite commercially available as Catapal B from Sasol Corp. combined with 58 wt % water containing a minority content of nitric acid and organic additives. The gel has a viscosity of approximately $3 \times 10^3$ to $4 \times 10^4$ Pa. and a storage modulus of $3 \times 10^4$ to $2 \times 10^5$ Pa.

The gel is extruded from a die using a pressure of up to 80 psi (552 kPa) onto a mold blank of polycarbonate and into a plurality of openings, wherein each of the openings are in the shape of a three-pointed star. The surfaces of the openings within the mold blank have been coated with canola oil. The openings define three-pointed star two-dimensional shapes having a length of approximately 5-7 mm, a width of 3-5 mm, and a depth of approximately 0.8 mm. The openings have tip angles of approximately 35 degrees, and an interior angle between the three arms of approximately 225 degrees.

The gel is extruded into the openings and the gel is then dried for approximately 24-48 hours in air under atmospheric conditions and within the mold to form precursor-shaped abrasive particles. The precursor-shaped abrasive particles were calcined in a box furnace at approximately 600° C. for 1 hour and then, the precursors shaped abrasive particles were sintered in a tube furnace up to 1320° C. for 3 to 20 minutes. FIG. 65A is an image of a representative particle formed Example 1. The body has a curling factor of less than 5.

Example 2

The process of Example 1 was used with the exception that the mold blank utilized openings defining a four-point star-shaped two-dimensional shape having a length of approximately 7-9 mm, a width of 7-9 mm, and a depth of approximately 0.8 mm. The openings have tip angles of approximately 25 degrees, and an interior angle between the three arms of approximately 250 degrees. FIG. 66A is an image of a representative particle formed from Example 2. The body has a curling factor of less than 5.

Example 3

The process of Example 1 was used with the exception that the mold blank utilized openings defining a cross-shaped two-dimensional shape having a length of approximately 5-6 mm, a width of 5-6 mm, and a depth of approximately 0.8 mm. The arms have a width of approximately 2 mm and a length of approximately 1 mm. FIG. 67 is an image of a representative particle formed from Example 3. The body has a curling factor of less than 5.

The present application represents a departure from the state of the art. While the industry has recognized that shaped abrasive particles may be formed through processes such as molding and screen printing, the processes of the embodiments herein are distinct from such processes. Moreover, the resulting shaped abrasive particles have one or a combination of distinct features from particles formed according to conventional approaches. The shaped abrasive particles of the embodiments herein can have a particular combination of features distinct from other conventional particles including, but not limited to, aspect ratio, composition, additives, two-dimensional shape, three-dimensional shape, stepped configuration, curling factor, tip angles, interior angles, and the like. Notably, the embodiments herein include a combination of features facilitating the formation of batches of shaped abrasive particle having particular features. And in fact, one or more such features facilitate alternative deployment of the particles in abrasive articles, and further, may facilitate improved performance in the context of fixed abrasives, such as bonded abrasives or coated abrasives.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A shaped abrasive particle comprising:
   an elongated body having a length defining the longest dimension of the elongated body, a width, and a height;
   wherein the length is greater than the width and the length is greater than the height;
   wherein the elongated body comprises a first end face, a second end face, and a side surface extending between the first end face and the second end face;
   wherein the body comprises a twist along an axis of the body; and
   wherein the body comprises at least 90 wt. % alumina.

2. The shaped abrasive particle of claim 1, wherein the twist angle is at least about 2 degrees.

3. The shaped abrasive particle of claim 1, wherein the shaped abrasive particle is part of a fixed abrasive article.

4. The shaped abrasive particle of claim 1, wherein the body comprises diamond.

5. The shaped abrasive particle of claim 1, wherein the first end face and second end face have a polygonal shape.

6. The shaped abrasive particle of claim 5, wherein the polygonal shape is selected from the group consisting of a triangle, a rectangle, a quadrilateral, a pentagon, a hexagon, a heptagon, an octagon, a nonagon, a decagon, and a combination thereof.

7. The shaped abrasive particle of claim 1, wherein the body is overlying a backing and comprises an upright orientation probability of at least about 50%.

8. The shaped abrasive particle of claim 1, wherein the twist comprises a twist along a longitudinal axis defining the length of the body.

9. The shaped abrasive particle of claim 1, wherein the twist comprises a twist along a lateral axis defining the width of the body.

10. The shaped abrasive particle of claim 9, wherein the twist along the lateral axis defines a lateral twist angle between two ends of the body of at least about 1 degree.

11. The shaped abrasive particle of claim 1, wherein the twist comprises a twist along a vertical axis defining the height of the body.

12. The shaped abrasive particle of claim 1, wherein the body comprises an odd number of major surfaces.

13. The shaped abrasive particle of claim 1, wherein the body comprises an odd number of side surfaces.

14. The shaped abrasive particle of claim 1, wherein the body comprises a first concave edge channel between the first side face and the second side face.

15. The shaped abrasive particle of claim 1, wherein the body comprises a first V-shaped edge channel between the first side face and the second side face.

16. The shaped abrasive particle of claim 1, wherein a cross-section of the shaped abrasive particle in a plane parallel to the first and second end face is generally triangular.

17. The shaped abrasive particle of claim 1, wherein the body comprises a center of mass and a geometric midpoint and wherein the center of mass is displaced from the geometric midpoint by a distance (Dh) of at least about 0.05(h) along a vertical axis of the body defining the height.

18. The shaped abrasive particle of claim 17, wherein the center of mass is closer to an end face of the body than the geometric midpoint.

19. The shaped abrasive particle of claim 1, wherein the body consists of alumina.

20. The shaped abrasive particle of claim 1, wherein a cross-section of the shaped abrasive particle in a plane parallel to the first and second end face is generally triangular.

* * * * *